(12) United States Patent
Mitchell et al.

(10) Patent No.: US 11,610,702 B2
(45) Date of Patent: Mar. 21, 2023

(54) TEMPORARY HOLDER FOR TRANSFERRING END OF WIRE BETWEEN END EFFECTORS

(71) Applicant: The Boeing Company, Chicago, IL (US)

(72) Inventors: Bradley J. Mitchell, Snohomish, WA (US); Damien O. Martin, Everett, WA (US); Lars E. Blacken, Bothell, WA (US); Jeffrey A. McCaskey, Everett, WA (US)

(73) Assignee: The Boeing Company, Chicago, IL (US)

( * ) Notice: Subject to any disclaimer, the term of this patent is extended or adjusted under 35 U.S.C. 154(b) by 408 days.

(21) Appl. No.: 16/711,227

(22) Filed: Dec. 11, 2019

(65) Prior Publication Data
US 2021/0183541 A1    Jun. 17, 2021

(51) Int. Cl.
| | | |
|---|---|---|
| *H01B 13/012* | (2006.01) | |
| *B25J 9/00* | (2006.01) | |
| *B25J 11/00* | (2006.01) | |
| *B25J 15/00* | (2006.01) | |
| *H01R 43/05* | (2006.01) | |

(52) U.S. Cl.
CPC ...... *H01B 13/01245* (2013.01); *B25J 9/0087* (2013.01); *B25J 11/005* (2013.01); *B25J 15/0052* (2013.01); *H01B 13/01209* (2013.01); *H01R 43/05* (2013.01)

(58) Field of Classification Search
CPC ......... H01B 13/01245; H01B 13/01209; B25J 9/0087; B25J 11/005; B25J 15/0052; H01R 43/05
See application file for complete search history.

(56) References Cited

U.S. PATENT DOCUMENTS

| | | | | |
|---|---|---|---|---|
| 1,469,623 | A * | 10/1923 | Colombani | ............... B42F 1/08 24/552 |
| 2,243,741 | A * | 5/1941 | Rowe | ................... H01H 85/204 200/555 |
| 3,178,538 | A * | 4/1965 | Kradel | ................... H01H 85/20 439/842 |
| 4,324,025 | A * | 4/1982 | Apri | ......................... B42F 1/08 24/551 |

(Continued)

*Primary Examiner* — Peter Dungba Vo
*Assistant Examiner* — Jose K Abraham
(74) *Attorney, Agent, or Firm* — Ostrager Chong Flaherty & Broitman, P.C.

(57) ABSTRACT

Methods and apparatus for temporarily holding one end of a wire on a harness form board during automated transfer from one robot to another robot. The apparatus includes a wire holding device which is designed to facilitate the transfer of a wire end from a first end effector of a first robot to a second end effector of a second robot. The wire holding devices have different structures, but share the common feature that opening of the wire holding device (to enable wire insertion) involves applying a contact force which overcomes a spring force that urges the wire holding device to be closed. The end effectors are designed and their movements are controlled in a manner such that the moving end effector applies the contact force necessary to overcome the closure-inducing spring force being exerted.

18 Claims, 35 Drawing Sheets

(56) References Cited

U.S. PATENT DOCUMENTS

| | | | |
|---|---|---|---|
| 4,551,893 A * | 11/1985 | Ikeda | H01R 43/01 29/564.6 |
| 4,593,452 A | 6/1986 | Keahey et al. | |
| 4,598,469 A | 7/1986 | Weixel | |
| 4,603,476 A | 8/1986 | Tarbox | |
| 4,607,430 A | 8/1986 | Young | |
| 4,653,159 A | 3/1987 | Henderson et al. | |
| 4,658,503 A * | 4/1987 | Eaton | H01R 43/20 29/857 |
| 4,677,734 A | 7/1987 | Bloch et al. | |
| 4,692,974 A * | 9/1987 | Cross | |
| 4,715,100 A | 12/1987 | Cross | |
| 4,765,589 A | 8/1988 | Sauze | |
| 4,781,227 A | 11/1988 | Cross | |
| 4,979,544 A | 12/1990 | Swindlehurst | |
| 5,153,839 A | 10/1992 | Cross | |
| 6,196,779 B1 | 3/2001 | Falk | |
| 6,272,387 B1 | 8/2001 | Yoon | |
| 6,953,175 B1 * | 10/2005 | Carrera | H01B 13/01209 248/65 |
| 6,955,344 B2 * | 10/2005 | Brass | B25B 5/102 269/95 |
| 7,082,590 B2 | 7/2006 | Kragh et al. | |
| 8,534,651 B2 | 9/2013 | Scapa et al. | |
| 8,955,714 B1 | 2/2015 | Brzon et al. | |
| 9,687,946 B2 | 6/2017 | Cole et al. | |
| 10,109,974 B2 | 10/2018 | Helmick et al. | |
| 10,112,309 B2 | 10/2018 | Nakayama | |
| 2006/0259049 A1 * | 11/2006 | Harada | A61B 17/1285 606/151 |
| 2009/0228023 A1 * | 9/2009 | Cui | A61B 17/122 606/143 |
| 2017/0369271 A1 | 12/2017 | Mitchell et al. | |
| 2018/0138771 A1 | 5/2018 | Murphy et al. | |
| 2018/0169870 A1 * | 6/2018 | Nakayama | B25J 15/10 |
| 2018/0267498 A1 | 9/2018 | Helmick et al. | |

* cited by examiner

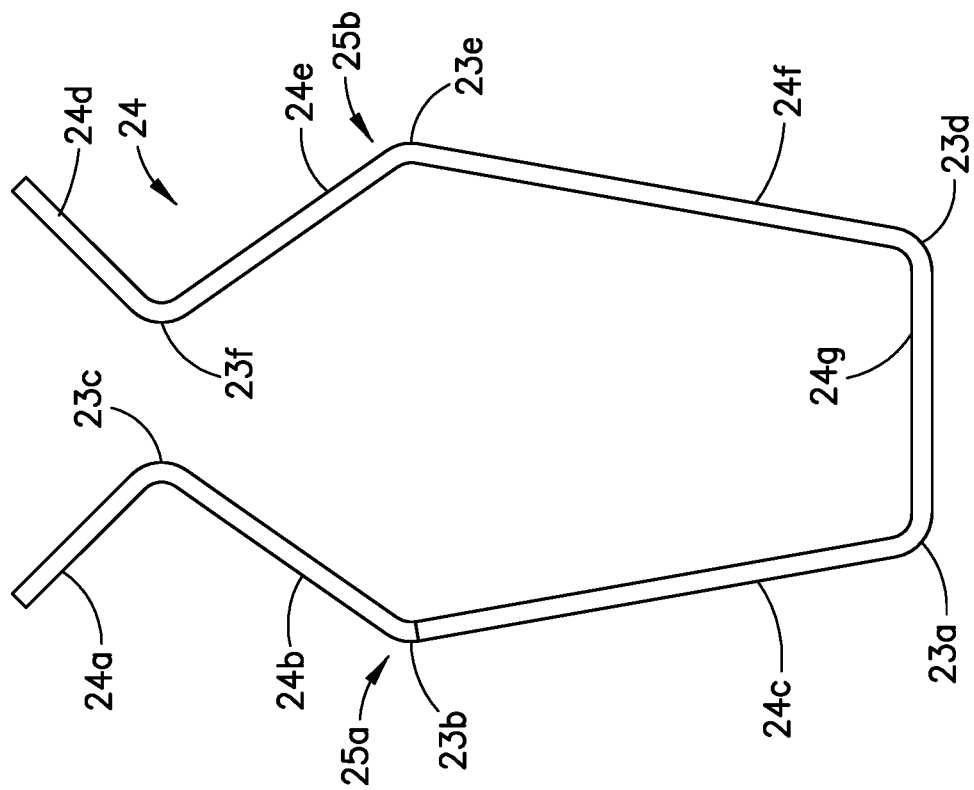
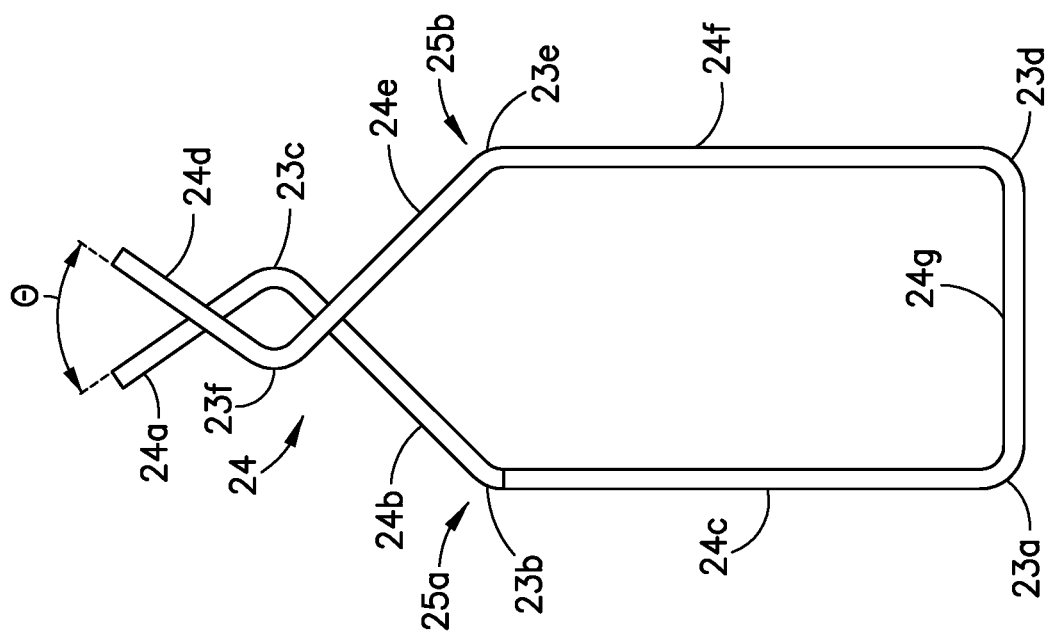

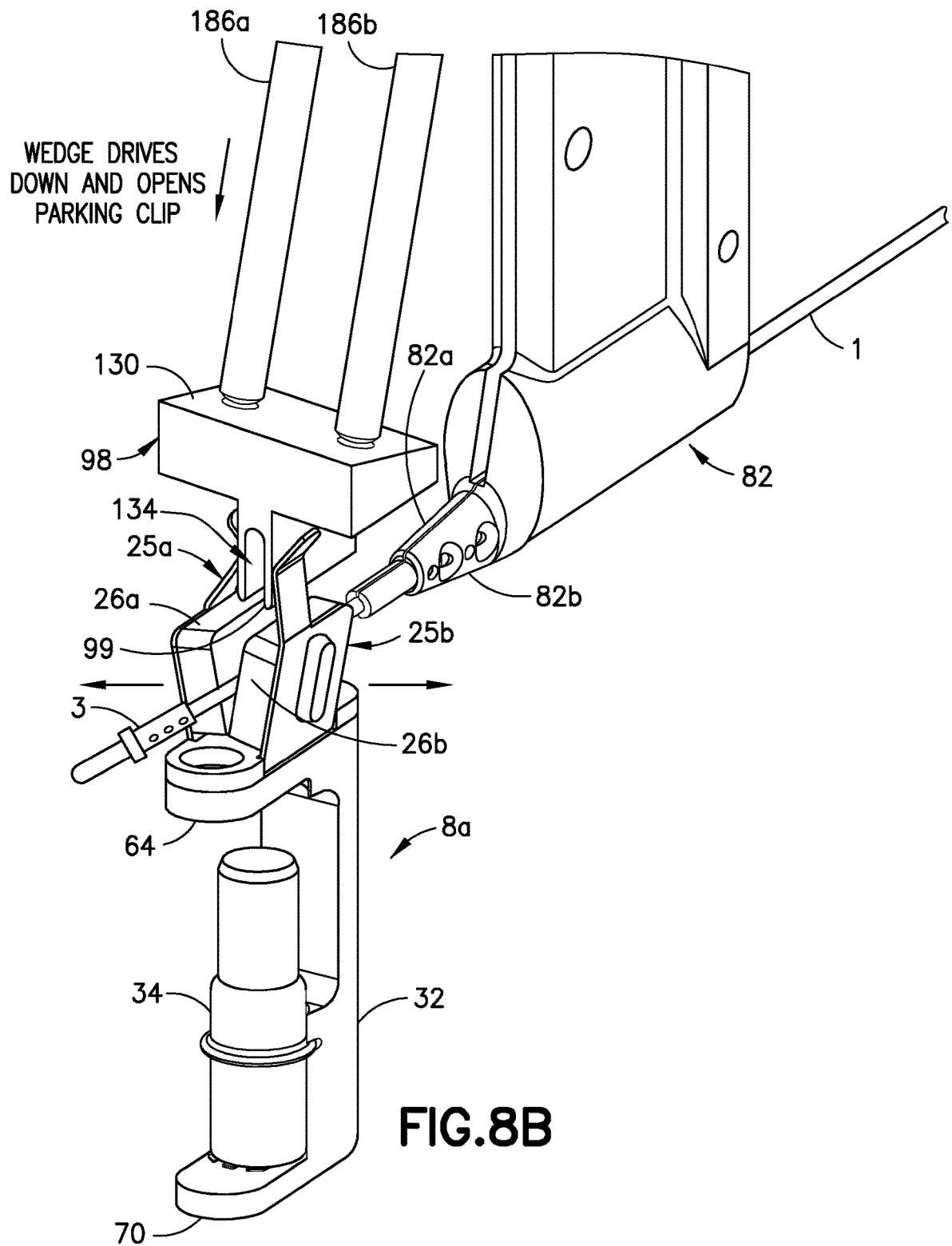

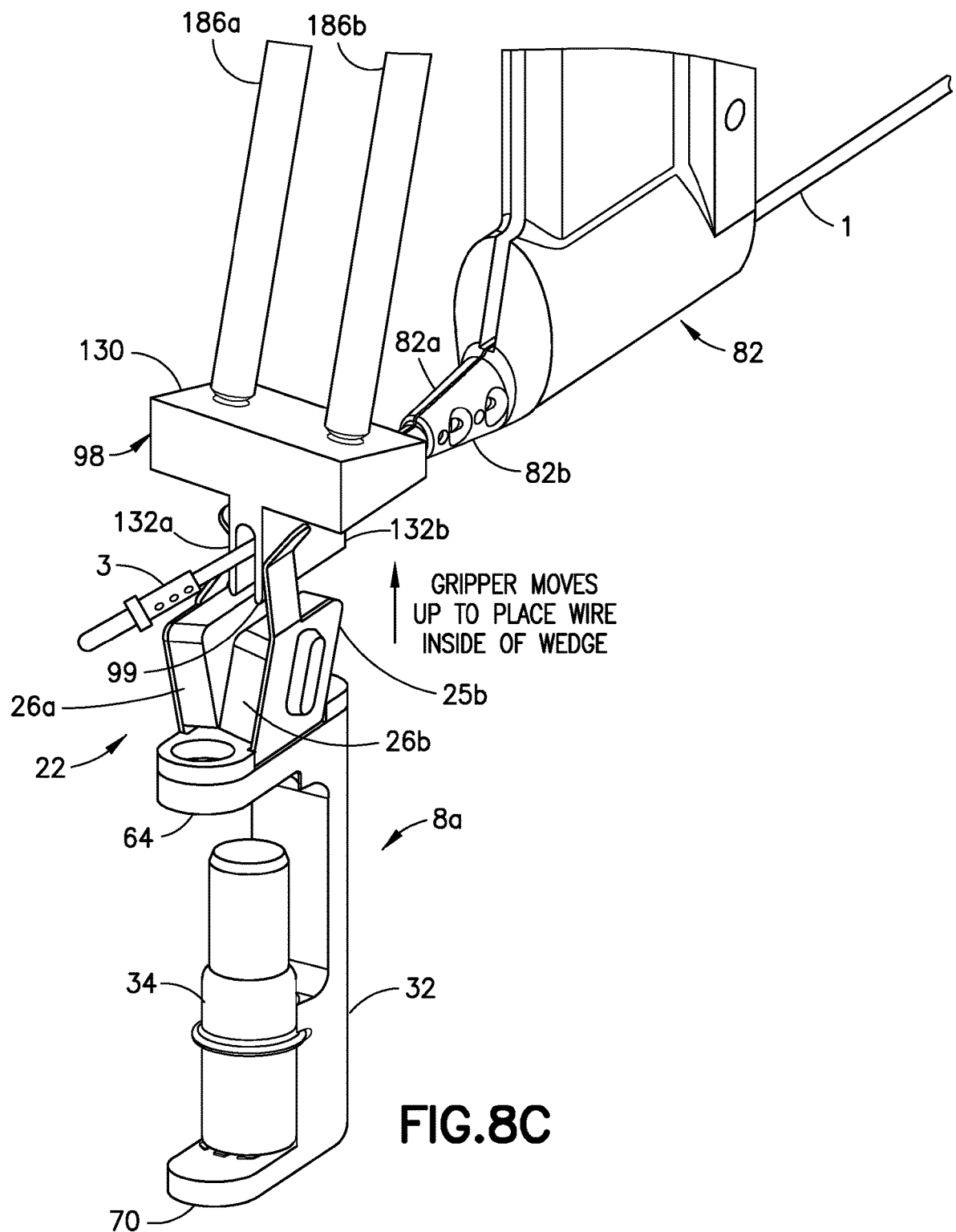

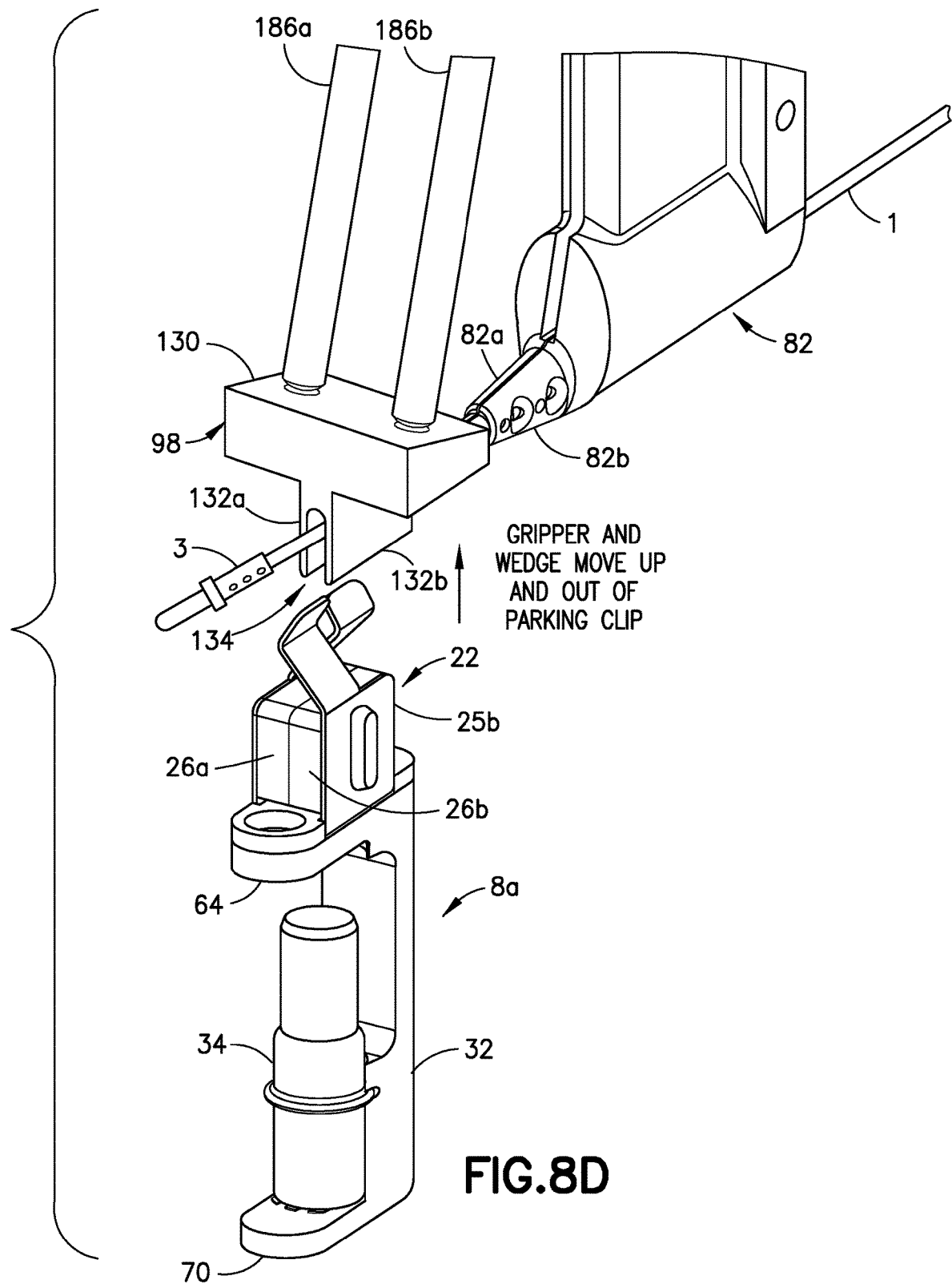

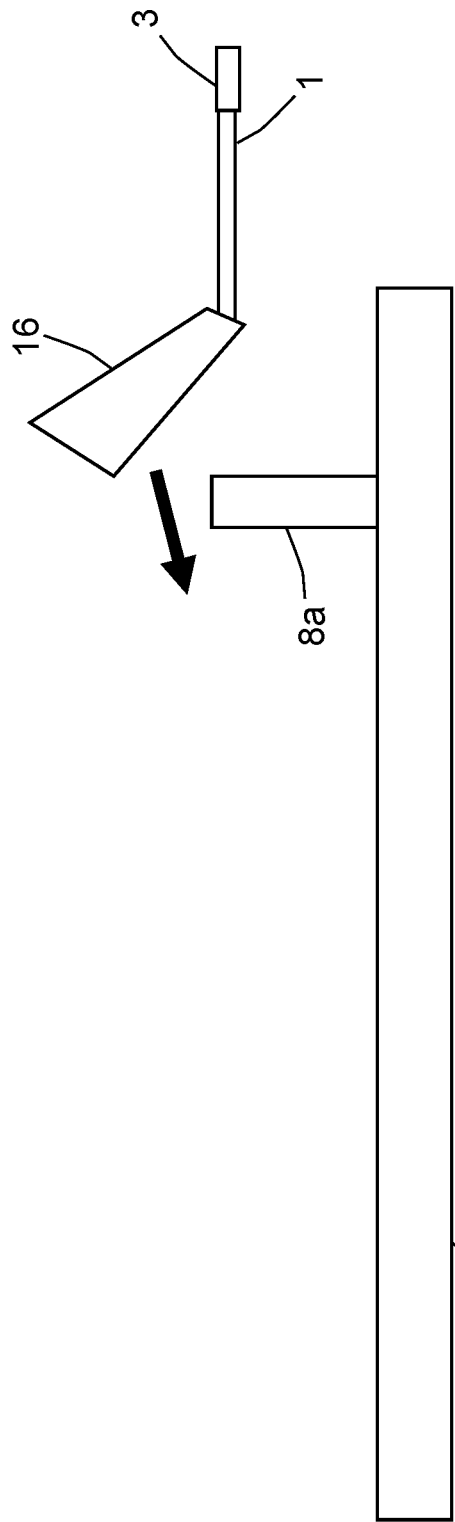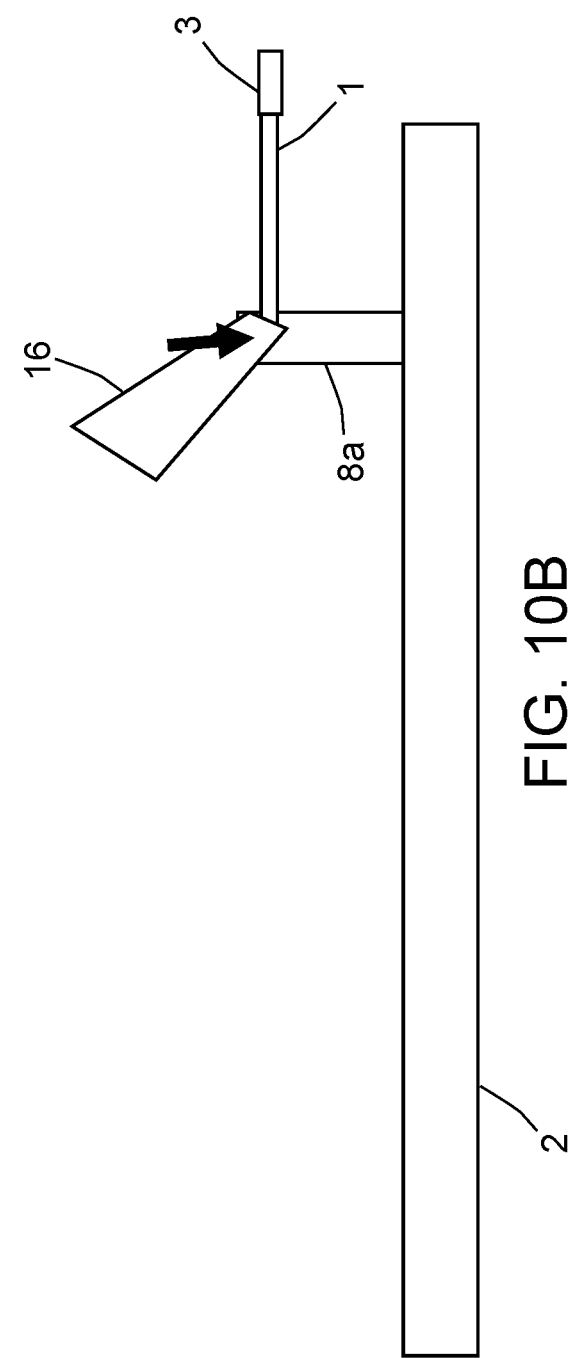

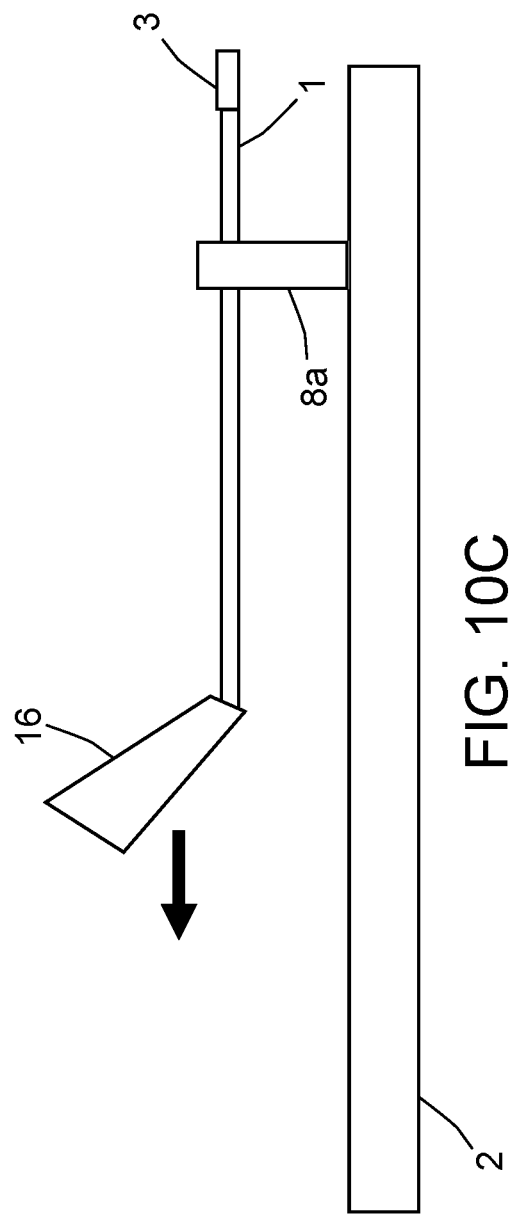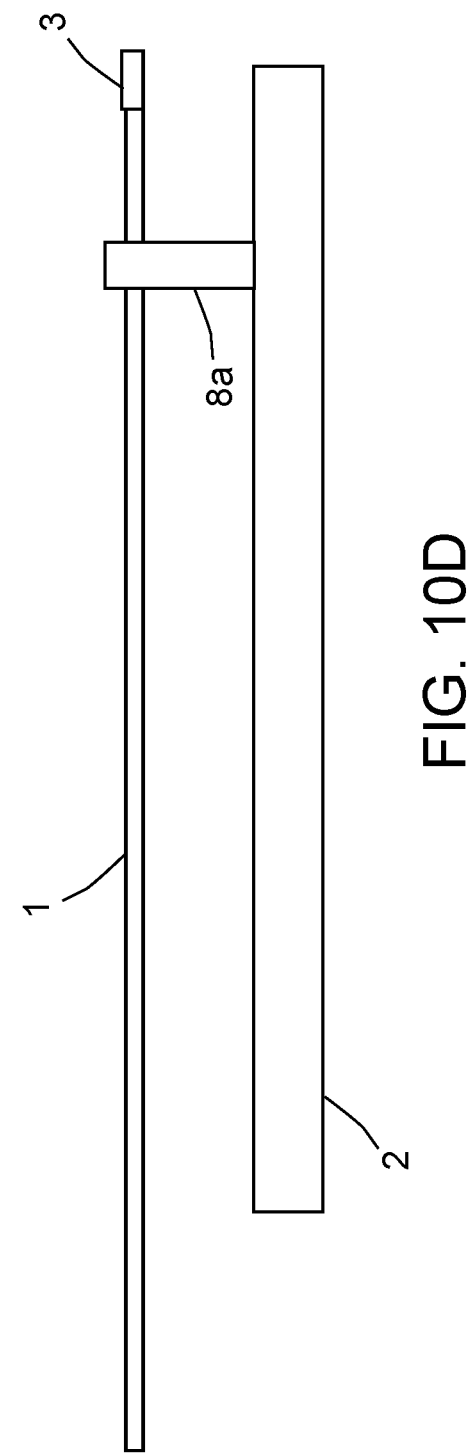

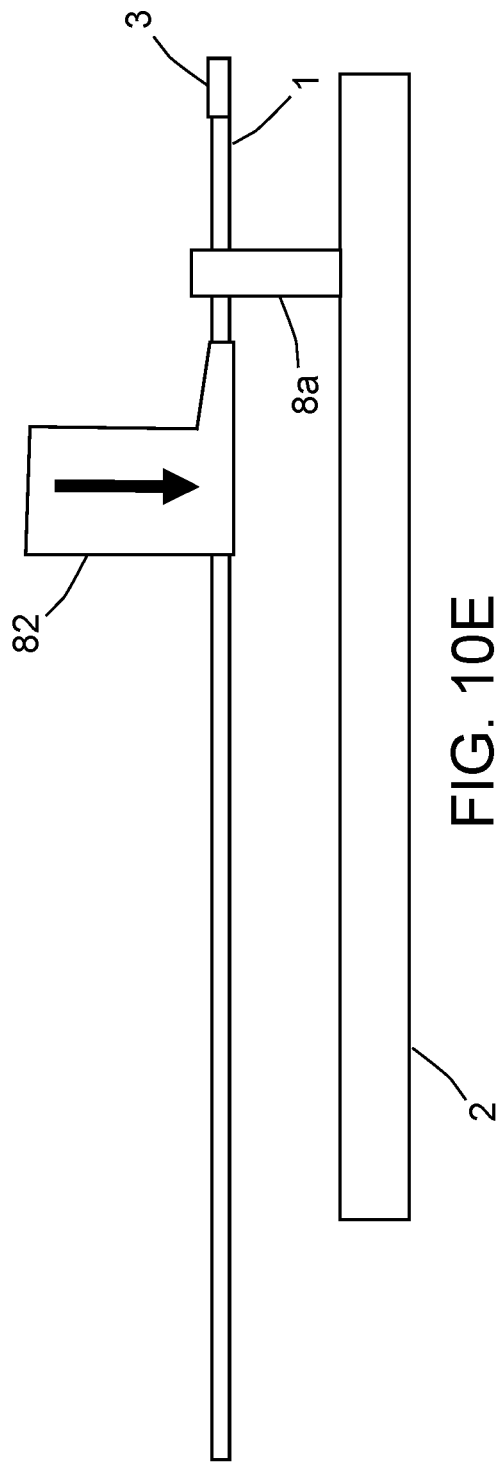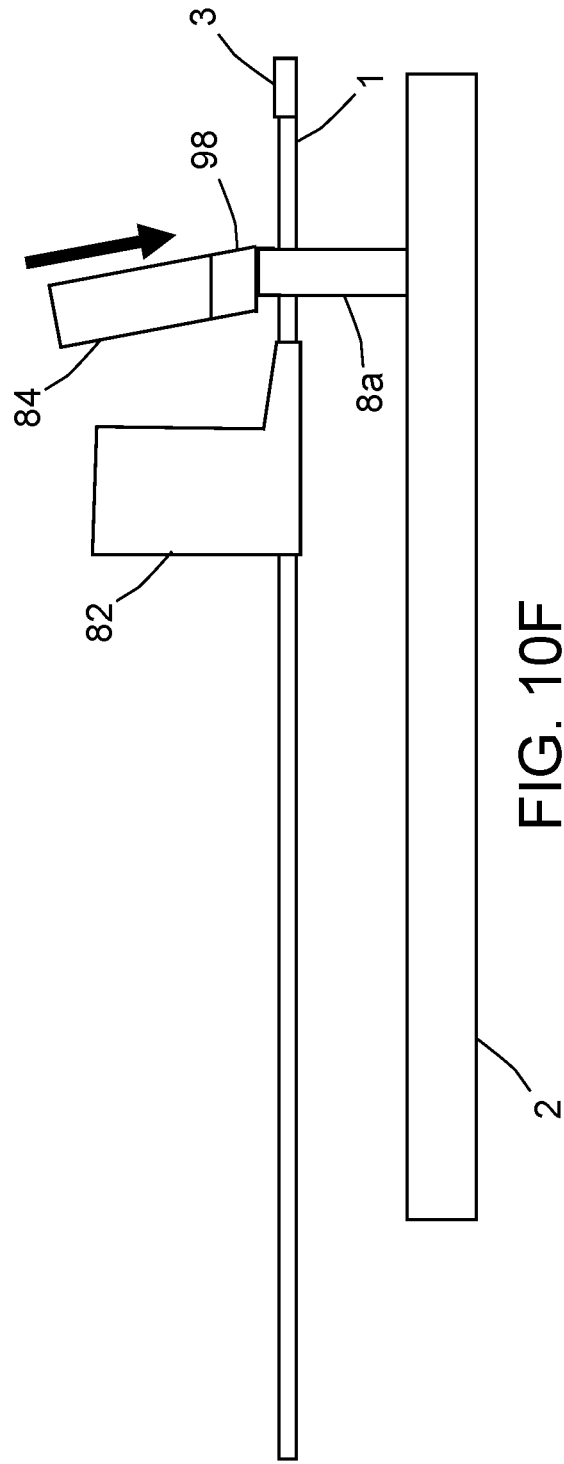

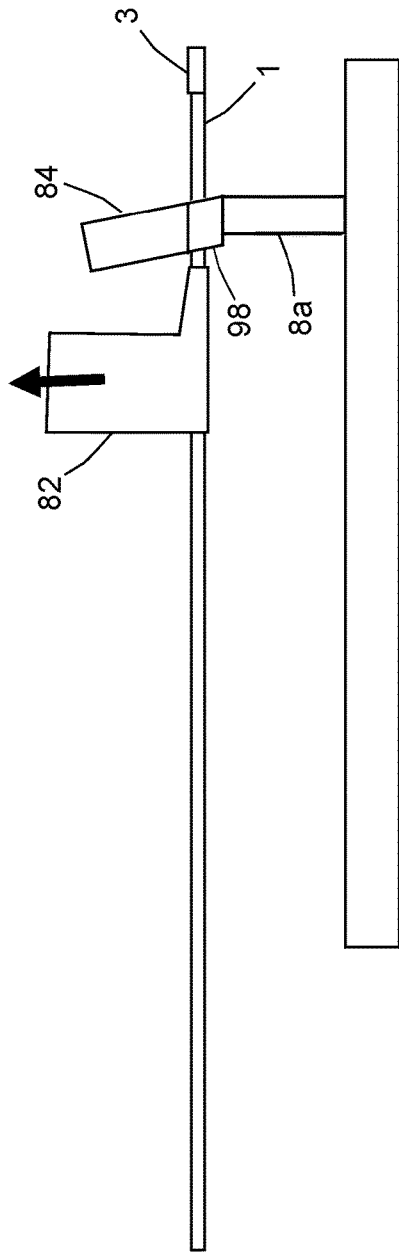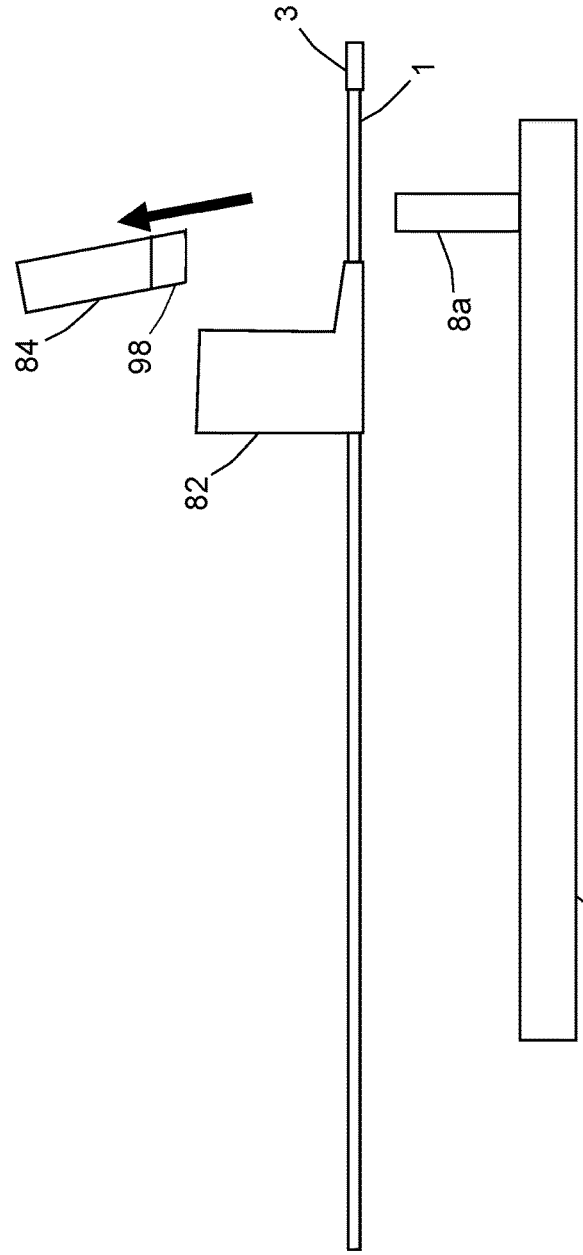

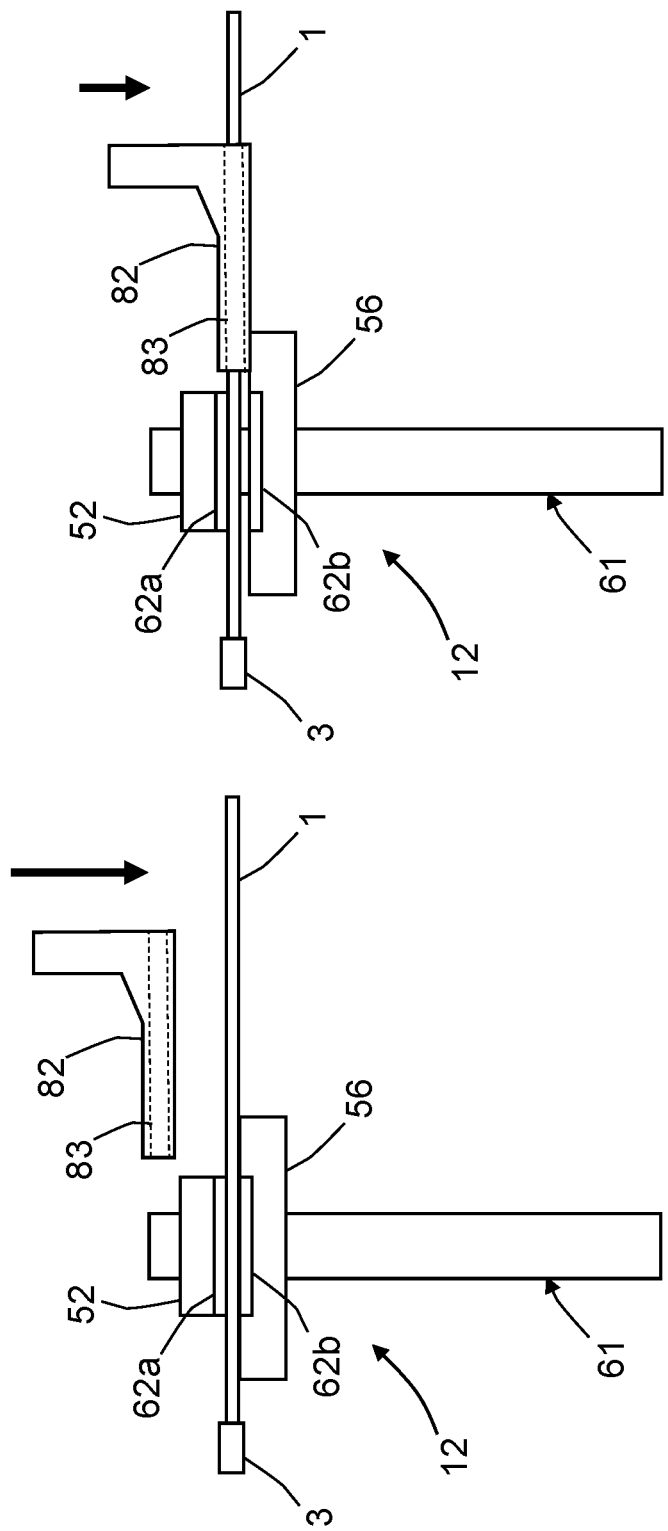

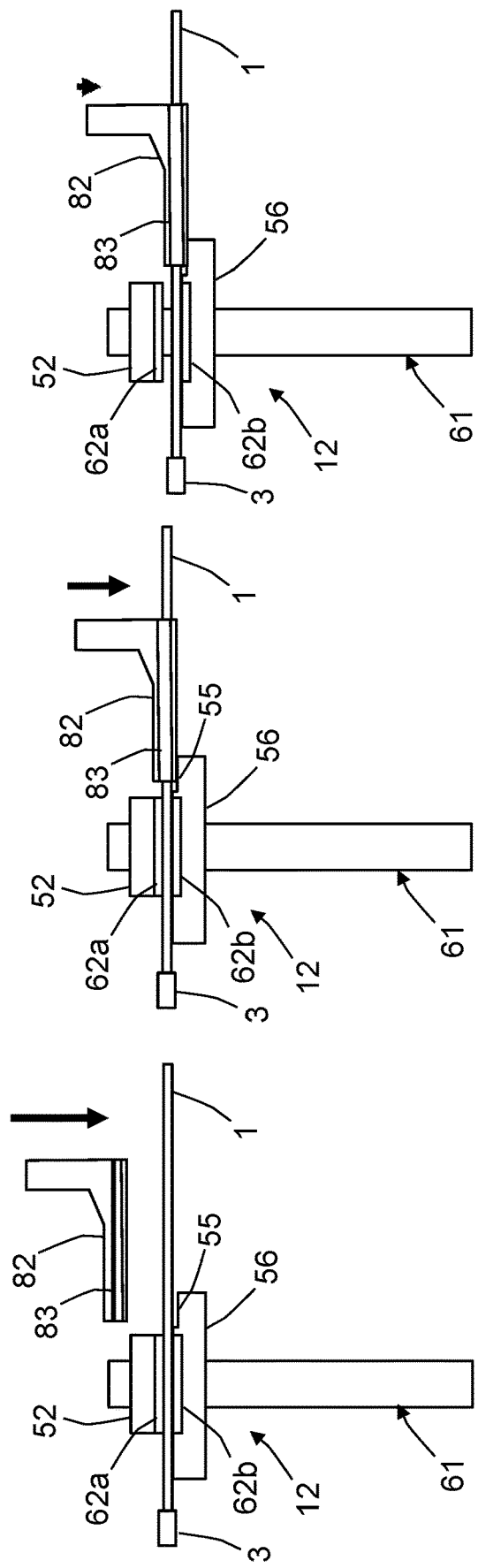

TEMPORARY HOLDER FOR TRANSFERRING END OF WIRE BETWEEN END EFFECTORS

BACKGROUND

The present disclosure relates to the field of wire harness fabrication, and in particular to the assembly of wire bundles of varying configurations on harness form boards (hereinafter "form boards"). The terms "wire bundle" and "wire harness" are used as synonyms herein.

Vehicles, such as large aircraft, have complex electrical and electromechanical systems distributed throughout the fuselage, hull, and other components of the vehicle. Such electrical and electromechanical systems require many bundles of wire, cables, connectors, and related fittings to connect the various electrical and electromechanical components of the vehicle. For example, a large aircraft may have over 1000 discrete wire bundles. Often these discrete wire bundles are grouped into assemblies known as wire bundle assembly groups, which may comprise as many as 40 wire bundles and 1000 wires. Wire bundles are typically assembled outside of the aircraft.

In accordance with a typical method for assembling wire bundles, form boards are used to stage a wire bundle into its installation configuration. Typically each wire bundle of a given configuration fabricated in a wire shop requires a customized form board for lay-up. The form board typically includes a plurality of fixed form board devices which together define the given wire bundle configuration. During wire bundle assembly, the constituent wires are routed along paths defined by the positions and orientations (hereinafter "locations") of the fixed form board devices. However, the precise position of a particular wire as that wire is passed through or around a form board device may vary in dependence on the particular bunch configuration of already routed wires within or in contact with the same form board device.

Robots are used to assemble electrical wire harnesses using wire segments cut to length and configured prior to bundling. For example, a robot having a wire-routing end effector may be used to route a wire through a multiplicity of form board devices to control the layout of the wire on a form board. In accordance with some wire routing programs, the first operation performed by the wire-routing end effector is to place a first end of the wire in a temporary holder which is affixed to the form board. Following release of the first end of the wire, the wire-routing end effector is moved away from the wire holding device and then a contact-insertion end effector is moved toward the wire holding device. The contact-insertion end effector then picks up the first end of the wire (which has an electrically conductive contact attached thereto) and inserts the electrically conductive contact into a grommet cavity in a nearby wire connector which is also affixed to the form board.

The above-described automated operations enable the transfer of the wire from the wire-routing end effector to the contact-insertion end effector. The success rate for the automated wire transfer process may be increased by improvements in the design of the device which temporarily holds the end of the wire during the transfer.

SUMMARY

The subject matter disclosed in some detail herein is directed to methods and apparatus for temporarily holding one end of a wire on a harness form board during automated transfer from a first end effector of a first robot to a second end effector of a second robot. The wire holding devices have different structures, but share the common feature that opening of the wire holding device (to enable wire insertion) involves applying a contact force which overcomes a spring force that urges the wire holding device to be closed. The end effectors are designed and their movements are controlled in a manner such that the moving end effector produces the contact forces necessary to overcome the closure-inducing spring forces being exerted.

In one leading automation scenario, a wire is dispensed from a wire-routing end effector across a form board. However, the first end of each wire needs to be transferred to a secondary end effector (e.g., a contact-insertion end effector) before performing most of this routing. A temporary wire-end holder is used to facilitate this transfer of the wire end from the wire-routing end effector to the secondary end effector.

One basic concept of the automated process involves the following operations. A first robot uses a wire-routing end effector to retrieve an individual wire or cable, which was pre-wound in a plastic containment spool called a "reelette". The first end of the wire is threaded through the routing beak of the wire-routing end effector with the first end protruding. Optionally, the first end of the wire has an electrically conductive contact crimped thereon. The wire-routing end effector then places the first end of the wire into a temporary wire-end holder located on the form board near its final position, and next performs one of the following tasks: (a) routing the full length of the wire on the form board; (b) routing the first few to dozens inches of the wire on the form board to provide access to the first end of the wire to a secondary end effector; or (c) moving a short distance away to provide access to the first end of the wire to a secondary end effector. The secondary end effector retrieves the first end of the wire from the wire holder, and then performs a task with the first end of the wire. Typical tasks performed by the secondary end effector include: (a) inserting the contact on the first end of the wire into a nearby connector pre-mounted in relationship to the form board; or (b) transferring the first end of the wire to a nearby secondary clip capable of holding one or more wire ends.

In accordance with some embodiments, the temporary wire-end holder (hereinafter "wire holder") includes two vertical surfaces spring loaded to bring them close together or nearly close together, such that they can naturally clamp onto and grip a wire. For example, the two vertical surfaces may be parts of a U-shaped spring steel clip or two walls or levers pushed together by springs. These vertical surfaces may be fully or partially coated with a softer and higher-friction material, such as a rubber coating, to enable the vertical surfaces to make a higher-friction grip of the wire. The vertical surfaces of the wire holder may be caused to move apart (i.e., open) by one of several means, including, for examples: (a) pressing down on an arched bottom of a U-shaped spring clip; (b) pressing down on horizontal wings common to the vertical surfaces, causing them to rotate on a pivot axis to open; or (c) Inserting a wedge into the top opening of a U-shaped spring clip to splay the vertical surfaces apart. The wire-routing end effector and secondary end effector may each have actuated devices to open/close the wire holder.

In accordance with other embodiments, the wire holder includes two horizontal surfaces spring loaded to bring them close together or nearly close together, such that they can naturally clamp onto and grip a wire. For example, one horizontal surface may be stationary while the other horizontal surface is vertically displaceable relative to the stationary horizontal surface. These horizontal surfaces may be fully or partially coated with a softer and higher-friction material, such as a rubber coating, to enable the vertical surfaces to make a higher-friction grip of the wire. The vertically displaceable horizontal surfaces of the wire holder may be caused to move away from the stationary horizontal surface by physical contact by a moving end effector.

In one example system, the primary end effector is a wire-routing end effector having a routing beak configured for dispensing and routing a wire along a path through form board devices mounted to a harness form board, whereas the secondary end effector is a contact-insertion end effector with a gripper configured for inserting an electrically conductive contact (hereinafter "contact") attached to the end of the wire into a grommet cavity of a wire connector or for placing an end of a wire in a multi-wire end holder (such as an elastic retainer). Each robot includes a manipulator arm (a.k.a. robotic arm), an end effector mounted to a distal end of the manipulator arm, and a robot controller which controls the motion path of the end effector. Each robot controller is a respective computer or processor configured with executable computer code stored in a non-transitory tangible computer-readable storage medium.

Although various embodiments of methods and apparatus for holding one end of a wire during automated transfer between end effectors are described in some detail later herein, one or more of those embodiments may be characterized by one or more of the following aspects.

One aspect of the subject matter disclosed in detail below is a method for holding a wire, the method comprising: (a) placing a second portion of a wire inside a channel of a routing beak of a wire-routing end effector mounted to a manipulator arm while a first portion of the wire having an end projects outside the channel from a tip of the routing beak; (b) moving the wire-routing end effector so that the routing beak contacts a first gripping pad support structure of a wire holding device fastened to a form board; (c) moving the wire-routing end effector so that a contact force is applied that causes the first gripping pad support structure to separate from a second gripping pad support structure and form a gap between first and second gripping pads of the wire holding device, wherein the first and second gripping pads are made of resilient polymeric material; (d) producing a spring force in opposition to the contact force as the first and second gripping pads separate; (e) moving the wire-routing end effector so that the first portion of the wire passes through the gap; and (f) moving the wire-routing end effector to allow the spring force to displace the first gripping pad support structure to move toward the second gripping pad support structure, whereby the gap is reduced to an extent that the first and second gripping pads of the wire holding device hold the first portion of the wire.

In accordance with one embodiment of the method described in the immediately preceding paragraph, the method further comprises: (g) opening a gripper of a secondary end effector mounted to a manipulator arm so that first and second gripper jaws of the gripper are separated by a distance greater than a width of the wire; (h) moving the secondary end effector so that the first and second gripper jaws of the gripper are disposed on opposite sides of the second portion of the wire; (i) moving the first and second gripper jaws toward one another to close the gripper on the second portion of the wire; (j) moving a wedge of the secondary end effector relative to the gripper from a retracted position where the wedge does not contact the first and second gripping pad support structures to an extended position, during which movement the wedge applies contact forces which cause the first and second gripping pads to separate; and (k) moving the gripper vertically upward to remove the first portion of the wire from the wire holding device while the wedge maintains the wire holding device open. The method further comprises moving the wedge to disengage from the first and second gripping pad support structures, thereby allowing the first and second gripping pads to close due to spring forces.

In accordance with one embodiment, step (j) comprises activating a pair of linear actuators so that the wedge is extended, during which extension the wedge exerts respective contact forces which separate the first and second gripping pads. The wedge comprises a base attached to the linear actuators and a pair of contact blades projecting from the base and applying the contact forces. In one proposed implementation, the contact blades have blunt linear edges which are mutually parallel and separated by a gap having a width greater than the diameter of the wire to be removed from the wire holder. When the wire is lifted out of the wire holder by the gripper, the uplifted wire is received in the recess between the contact blades. The contact blades form walls which prevent further contact by the wire holder with the wire as the wedge is removed.

Another aspect of the subject matter disclosed in detail below is a method for removing a wire from a wire holding device, the method comprising: (a) opening a gripper of an end effector mounted to a manipulator arm so that a pair of gripper jaws of the gripper are separated by a distance greater than a width of a wire having a first portion which is held by a pair of gripping pads attached to respective clip arms of a clip; (b) moving the end effector so that the gripper jaws are disposed on opposite sides of a second portion of the wire which is not being held by the gripping pads; (c) moving the gripper jaws toward one another to hold the second portion of the wire; (d) extending a pair of rods of the end effector until clip opening means attached to the rods contact the clip arms and then force the clip open; and (e) moving the gripper while the gripper jaws are holding the first portion of the wire and the clip is open to remove the first portion of the wire from the clip. In accordance with one embodiment, the clip opening means comprises a wedge, the clip arms are resilient, and the wedge cams the clip arms apart as the rods extend. In accordance with another embodiment, the clip opening means are a pair of pins, the clip arms are pivotable, and the pins push the clip arms to pivot as the rods extend.

A further aspect of the subject matter disclosed in detail below is a robotic apparatus comprising: a manipulator arm comprising a plurality of links including a distal link, a plurality of joints which couple the links to form a kinematic chain, and first motor means for driving movement of the plurality of links; an end effector coupled to the distal link of the manipulator arm, the end effector comprising: a frame, first and second gripper arms movably coupled to the frame for concurrent movements in opposite directions, first and second gripper jaws projecting from the first and second gripper arms respectively, the first and second gripper jaws being spreadable by a distance which varies as a function of respective movements of the first and second gripper arms in opposite directions, second motor means for driving movements of the first and second gripper arms, a linear actuator mounted to the frame, and clip opening means coupled to the linear actuator; and a robot controller configured to control operation of the first and second motor means and the linear actuator for controlling the movements of the first and second gripper arms and clip opening means.

Another aspect of the subject matter disclosed in detail below is a wire holding device comprising: a frame having a hole; a fastener fastened to the hole in the frame; a wire parking clip comprising a base portion, left and right clip arms respectively connected to opposite sides of the base, and first and second gripping pads respectively attached to the left and right clip arms in a mutually confronting relationship; and a mounting plate fastened to the upper arm of the frame to form a channel occupied by the base of the wire parking clip, wherein the left clip arm comprises first, second and third left arm portions and the right clip arm comprises first, second and third right arm portions, the third left and right arm portions being connected to the base and extending generally parallel to each other when the wire parking clip is in a closed state and being not parallel when the wire parking clip is in an open state, the second left and right arm portions being respectively connected to the third left and right arm portions and respectively disposed such that the second left and right arm portions cross at a first crossing at a first elevation above the base when viewed from a position in front of the wire parking clip in the closed state, and the first left and right arm portions being respectively connected to the second left and right arm portions and respectively disposed such that the first left and right arm portions cross at a second crossing at a second elevation above the base when viewed from in front of the wire parking clip in the closed state, the second elevation being higher than the first elevation; and wherein the first gripping pad is attached to the third left arm portion and the second gripping pad is attached to the third right arm portion.

Yet another aspect of the subject matter disclosed in detail below is a wire holding device comprising: a frame having a hole; a fastener fastened to the hole in the frame; a wire parking clip comprising a base portion, left and right clip arms respectively pivotably coupled to the base at first and second pivots, the left clip arm comprising a first upper portion that extends upward and a first lower portion that extends laterally, and the second left clip arm comprising a second upper portion that extends upward and a second lower portion that extends laterally, and first and second gripping pads respectively attached to the first and second upper portions of the first and second clip arms; and first and second springs disposed between the base and the first and second lower portions of the left and right clip arms respectively, wherein the first and second springs are arranged to exert respective spring forces which urge the first and second gripping pads into contact in the absence of counteracting forces, and wherein the left and right clip arms are pivotable in opposite directions to cause the first and second gripping pads to separate when the counteracting forces are applied.

A further aspect of the subject matter disclosed in detail below is a wire holding device comprising: a frame having upper and lower arms, wherein the upper arm has a hole and the lower arm has a hole; a fastener fastened to the hole in the lower arm; a rigid subassembly having an axis and comprising a flanged button head; a clamp body slidably coupled to the rigid subassembly for axial displacement relative to the flanged button head; and a compression spring configured and arranged to compress as the clamp body is displaced axially toward the upper arm of the frame. In accordance with one proposed implementation, the rigid subassembly further comprises: a standoff fastened to the hole in the upper arm of the frame, wherein the standoff has a threaded hole extending axially from an opening in one end of the standoff; a threaded shaft integrally formed with the flanged button head, wherein a first portion of the threaded shaft is threadably coupled to the threaded hole of the standoff; and a sleeve disposed between the standoff and flanged button head and circumscribing a second portion of the threaded shaft.

Yet another aspect of the subject matter disclosed in detail below is a method for holding a wire, the method comprising: (a) moving a wire-routing end effector mounted to a manipulator arm downward so that a routing beak of the wire-routing end effector pushes a spring-loaded clamp body away from a flanged button head while a first portion of a wire extends outside a channel of the routing beak from a tip of the routing beak and a second portion of the wire is disposed in the channel, thereby creating a gap between a first rubber pad attached to the flanged button head and a second rubber pad carried by the spring-loaded clamp body; (b) moving the wire-routing end effector laterally until the first portion of the wire passes through the gap; and (c) moving the wire-routing end effector upward so that the spring displaces the clamp body upward until the first portion of the wire is held by the first and second rubber pads.

Another aspect of the subject matter disclosed in detail below is a wire-routing end effector comprising: a frame; first and second gripper arms movably coupled to the frame for concurrent movements in opposite directions; first and second gripper jaws projecting from the first and second gripper arms respectively, the first and second gripper jaws being spreadable by a distance which varies as a function of respective movements of the first and second gripper arms in opposite directions; a motor for driving movements of the first and second gripper arms; a gear train for mechanically coupling the first and second gripper arms to the motor; first and second linear actuators mounted to the frame and having respective distal ends which move in tandem from a first position when the first and second linear actuators are fully retracted to a second position when the first and second linear actuators are fully extended; and first and second contact pins respectively attached to the distal ends of the first and second linear actuators, wherein the first and second contact pins are positioned forward of the tip of the routing beak and at a higher elevation than the tip of the routing beak position when the first and second linear actuators are fully extended.

Other aspects of methods and apparatus for holding one end of a wire on a form board during automated transfer between end effectors are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

FIG. 4A is a diagram representing an end view of the wire parking clip of the wire holding device when the wire holder is closed, as depicted in FIG. 3A.

FIG. 4B is a diagram representing an end view of the wire parking clip of the wire holding device when the wire holder is open, as depicted in FIG. 3B.

FIGS. 8A through 8D are diagrams representing three-dimensional views of the contact-insertion end effector depicted in FIG. 8 at successive stages of an automated process for removing the end of a wire from a wire holding device of the type depicted in FIG. 2.

FIGS. 10A through 10H are diagrams representing side views of a wire-routing system at successive stages of an automated process for transferring the end of a wire from a wire-routing end effector to a contact-insertion end effector (or other secondary end effector).

FIG. 16A is a diagram representing a side view of a downwardly moving wire gripper at a first instant in time prior to contacting a clamp body of a wire holder of the type depicted in FIG. 12 that is holding a wire.

FIG. 16B is a diagram representing a side view of the wire gripper depicted in FIG. 16A at a second instant in time subsequent to the wire gripper pushing the clamp body downward by an amount sufficient to release the wire.

FIG. 17A is a diagram representing a side view of a downwardly moving wire gripper at a first instant in time prior to contacting a clamp body having a recessed land area in accordance with an alternative embodiment.

FIG. 17B is a diagram representing a side view of the wire gripper depicted in FIG. 17A at a second instant in time when the wire gripper is in contact with the recessed land area but has not yet pushed the clamp body downward to release the wire.

FIG. 17C is a diagram representing a side view of the wire gripper depicted in FIGS. 17A and 17B at a third instant in time subsequent to the wire gripper pushing the clamp body downward by an amount sufficient to release the wire.

Reference will hereinafter be made to the drawings in which similar elements in different drawings bear the same reference numerals.

DETAILED DESCRIPTION

Figure 1:
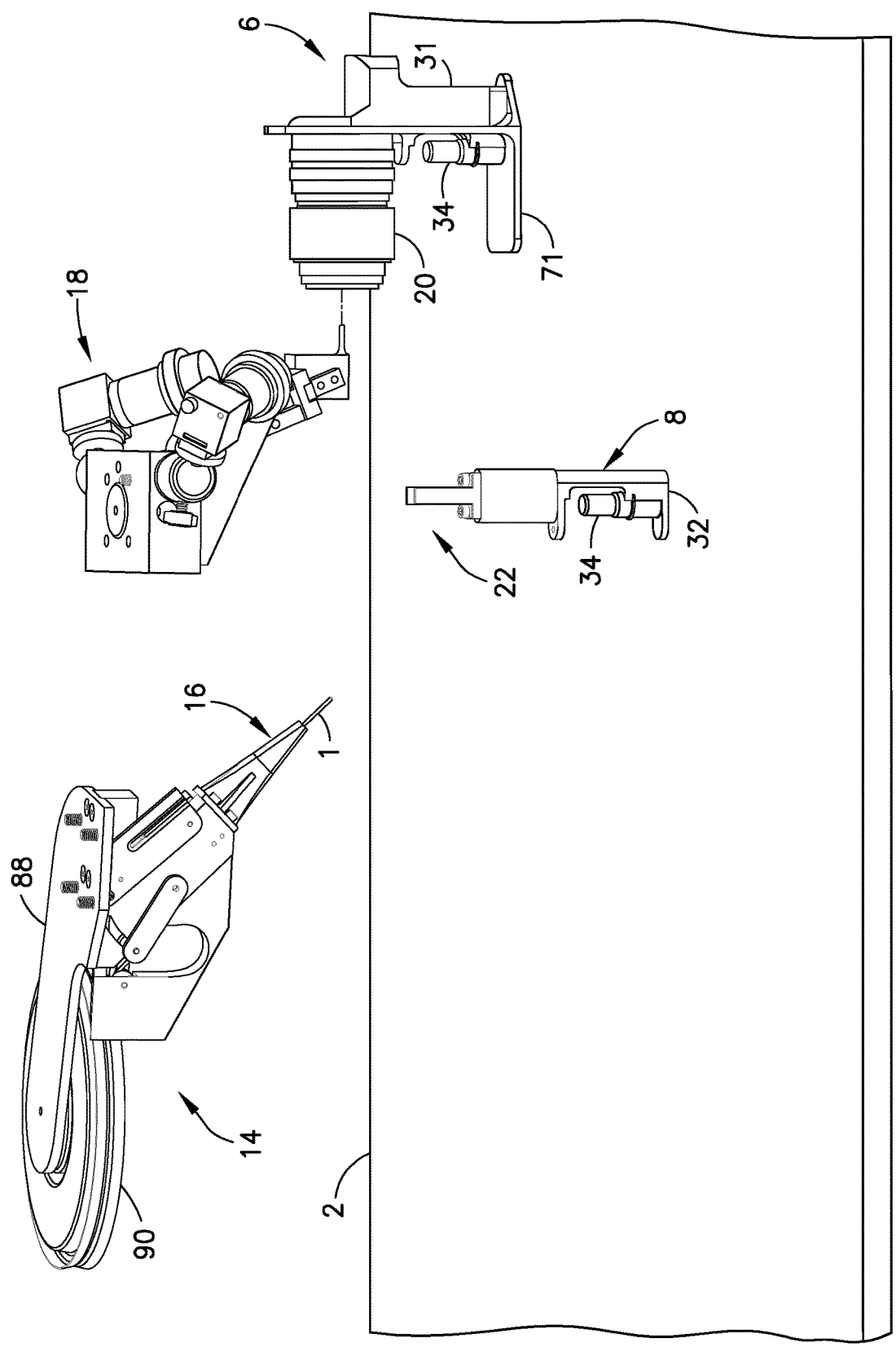
FIG. 1 is a diagram representing a three-dimensional view of a wire holding device and a wire connector support device attached to a form board, a wire-routing end effector configured to place a wire end in the wire holding device, and a contact-insertion end effector configured to remove the wire end from the wire holding device and insert the wire end into a grommet of a wire connector supported by the wire connector support device.

For the purpose of illustration, methods and apparatus for holding one end of a wire on a form board during transfer between end effectors Of a robotic system will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

In the aerospace industry, wires are typically assembled into wire bundles on a harness form boards. Some harnesses may have hundreds or thousands of wires. A typical wire bundle assembly process includes the following steps: (1) Individual wires are marked and cut with extra length. (2) The first end of each wire is prepared (strip off insulation, crimp contact). (3) "First-end" connectors are placed on a form board. (4) Each wire is robotically placed and routed onto the form board in a repeatable sequence, including (a) inserting the first end of the wire into a first-end connector; (b) routing the wire to its second-end destination on the form board; and (c) inserting the second end of the wire into a second-end connector. In one proposed implementation, step 4b is performed by a wire-routing end effector and steps 4a and 4c are performed by a contact-insertion end effector. In this example, the end of a wire having an electrically conductive contact to be inserted in a connector is transferred from the wire-routing end effector to the contact-insertion end effector by a process in which the wire-routing end effector first places the wire end in a wire holding device and then the contact-insertion end effector removes the wire end from the wire holding device and inserts the contact into the connector.

An automated wire routing process may be performed by a robotic system that includes multiple articulated robots. Each articulated robot may be implemented using, for example, without limitation, a jointed manipulator arm. Depending on the implementation, each articulated robot may be configured to provide movement and positioning of at least one tool center point corresponding to that robot with multiple degrees of freedom. As one illustrative example, each articulated robot may take the form of a manipulator arm capable of providing movement with up to six degrees of freedom or more.

In one illustrative example, the articulated robots of the robotic system may take a number of different forms, such as a wire-routing robot and a contact-insertion robot. Each articulated robot has a tool coordinate system. The tool coordinate system consists of two components: a tool frame of reference and a tool center point (TCP). The tool frame of reference includes three mutually perpendicular coordinate axes; the TCP is the origin of that frame of reference. When the robot is instructed to move at a certain speed, it is the speed of the TCP that is controlled. The tool coordinate system is programmable and can be "taught" to the robot controller for the particular end effector attached to the manipulator arm. In the case of the wire-routing end effector, each path of the TCP may be offset from the previous path during the assembly of a particular wire bundle. One way to achieve this is to program the robot controller with a respective set of motion instructions for each wire path. In the alternative, one motion instruction may be executed in a repetitive loop with incremental offsets being introduced after each pass.

FIG. 1 is a diagram representing a three-dimensional view of a wire holding device 8 and a wire connector support device 6 attached to a form board 2, a wire-routing end effector 14 configured to place an end of a wire 1 in the wire holding device 8, and a contact-insertion end effector 18 configured to remove the wire end from the wire holding device 8 and insert the wire end into a grommet of a wire connector 20 supported by the wire connector support device 6. The wire-routing end effector 14 will be described in some detail later with reference to FIGS. 6A-6D, 18A, 18B, and 19. The contact-insertion end effector 18 will be described in some detail later with reference to FIGS. 8A-8D.

As will described in more detail below, the wire holding device 8 includes a C-frame 32 and a temporary fastener 34 which is coupled to a lower arm of the C-frame 32. As used herein, the term "C-frame" means a relatively stiff channel-shaped bracket having mutually parallel upper and lower arms and does not mean a frame having a C-shaped profile. In accordance with the embodiments disclosed herein, the C-frame further includes a member that connects the upper arm to the lower arm. In addition, the wire holding device 8 includes a wire holder 22, which is fastened to the upper arm of the C-frame 32.

Still referring to FIG. 1, the wire connector support device 6 includes an L-frame 31 and a temporary fastener 34 which is coupled to a base plate 71 of the L-frame 31. The wire connector 20 includes a contact-receiving grommet (not shown in FIG. 1) having a multiplicity of spaced cavities. The contact-receiving grommet is typically made of dielectric material. For a particular wire bundle configuration, the respective contacts of wires to be terminated at wire connector 20 are inserted into respective cavities in the contact-receiving grommet by a contact-insertion end effector 18 attached to the end of a manipulator arm (not shown in FIG. 1).

The temporary fasteners 34 depicted in FIG. 1 are designed to fasten the L-frame 31 and C-frame 32 to a perforated sheet of the form board 2. In accordance with one proposed implementation, the form board 2 is made from a rectangular ⅛-inch-thick perforated sheet with ⅛-inch-diameter holes spaced approximately 3/16 inch (4.7625 mm) apart in a hexagonal pattern. Thus, the vertical spacing between rows is approximately 3/16 (inch)×sin 60°=0.1623798 inch or 4.124446 mm. The sheet is made of aluminum and optionally is coated with a high-friction material. The perforated sheet is bonded to the top face of a honeycomb core while a second sheet is bonded to the bottom face of the honeycomb core to form a stiff panel. The form board 2 is typically mounted to or forms part of a support frame (not shown in FIG. 1).

In accordance with some embodiments, after the end of the wire 1 has been placed in and is being held by the wire holder 22, the remainder of the wire is routed through a multiplicity of form board devices (not shown in FIG. 1) attached to the form board 2 using the wire-routing end effector 14. Execution of the wire routing plan depends on controlling the position of the TCP of the wire-routing end effector 14. The TCP path is designed to route the wire through selected form board devices attached to the form board 2. In a separate automated operation, the contact-insertion end effector 18 moves in proximity to the wire holding device 8, removes the wire 1 from the wire holder 22, and then inserts a contact that terminates the wire in the wire connector 20. The wire holder 22 may be differently constructed in accordance with various embodiments which will be described in some detail below.

Figure 2:
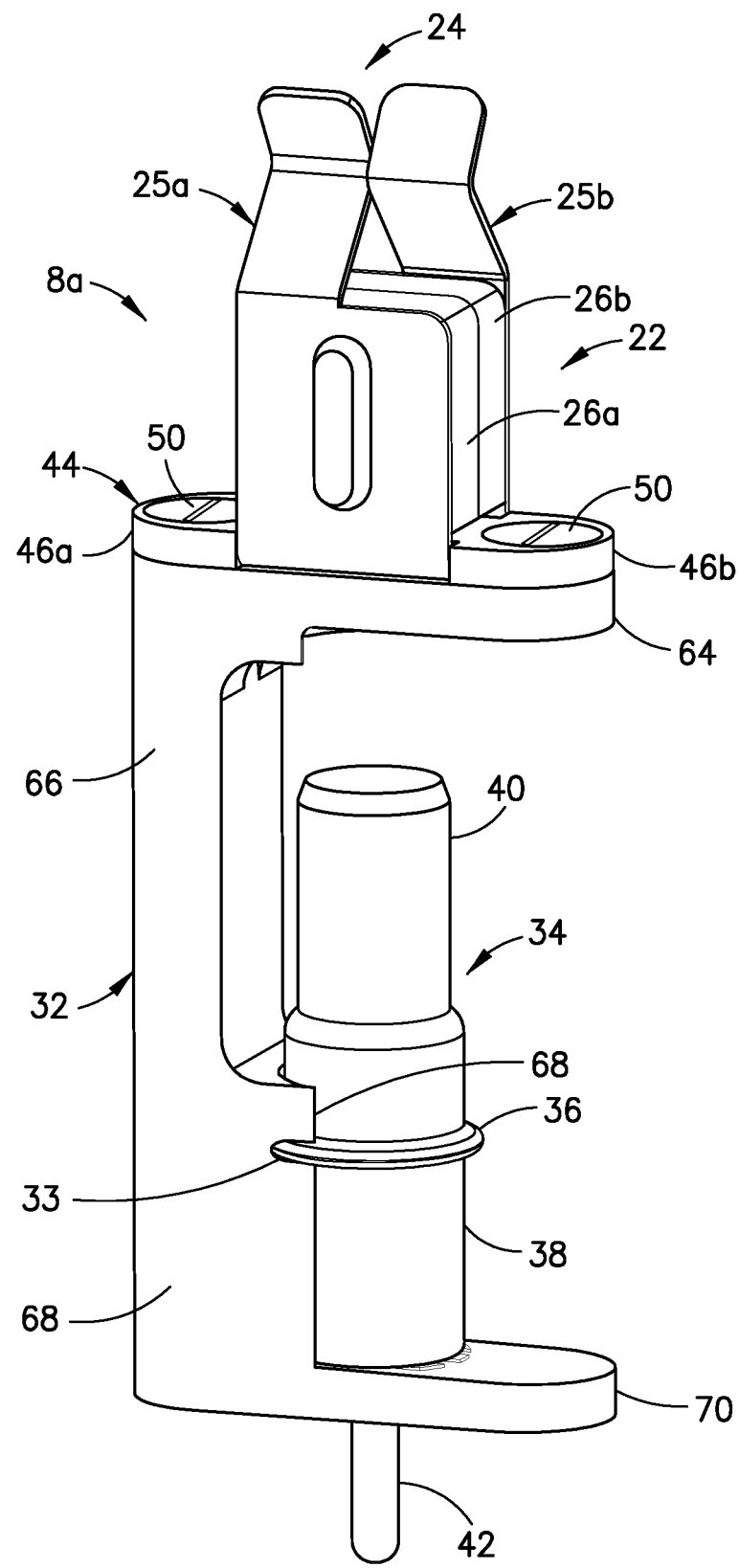
FIG. 2 is a diagram representing a three-dimensional view of a wire holding device comprising a wire parking clip with gripping pads, a C-frame and a temporary fastener in accordance with a first embodiment.

FIG. 2 is a diagram representing a three-dimensional view of a wire holding device 8a in accordance with a first embodiment that includes a C-frame 32 made of rigid material (e.g., aluminum), a temporary fastener 34 fastened to the C-frame 32, and a wire holder 22 supported by the C-frame 32. As used herein, the term "C-frame" means a relatively stiff channel-shaped bracket having mutually parallel upper and lower arms and does not mean a frame having a C-shaped profile. In accordance with the embodiments disclosed herein, the C-frame 32 further includes a member that connects the upper arm 64 to the lower arm 70.

The temporary fastener 34 is configured to initially fasten to the lower arm 70 of the C-frame 32 and later fasten the C-frame 32 to a form board 2 by interacting with a hole 10 formed in the perforated sheet 11 of the form board 2. The wire holder 22 is attached to the upper arm 64 of the C-frame 32. The C-frame 32 further includes a fastener retaining block 68 integrally formed with one end of the lower arm 70 and a vertical member 66 having one end integrally formed with one end of the upper arm 64 and another end integrally formed with the fastener retaining block 68.

The temporary fastener 34 includes a cylindrical housing 38 with an annular flange 35 extending around the housing 38. A plunger 40 is slidably coupled to the housing 38. A portion of the plunger 40 projects from one end of the housing 38. A spacer (not visible in FIG. 2, but see spacer 41 in FIGS. 2A and 2B) and a pair of locking pins 42 project from the opposite end of the housing 38. A spring is contained inside the housing 38. The locking pins 42 are connected to the plunger 40 and displace with the plunger 40 when the plunger 40 is pushed further into the housing 38. The spacer 41 is fixed relative to the housing 38. A portion of the annular flange 35 sits in an arc-shaped retaining groove 33 formed in the fastener retaining block 68 of the C-frame 32. To initially load the pin, the spring is depressed, thereby extending the plunger 40 and locking pins 42, while at the same time "toeing-in" the locking pins 42 through the lower hole in the C-frame 32, during which movement the annular flange 35 snap-fits into the retaining groove 33 of C-frame 32. Although not readily discernible in FIG. 2, the locking pins 42 may have respective half-heads 43 (see FIGS. 2A and 2B) which project laterally outward for latching underneath the peripheral surface surrounding one end of the hole in which the temporary fastener 34 is inserted.

Still referring to FIG. 2, the wire holder 22 includes a mounting plate 44 having a pair of mounting flanges 46 fastened to the upper arm of the C-frame 32 by means of screws 50 (or other type of fasteners). The wire holder 22 further includes a wire parking clip 24 comprising a pair of flexible clip arms 25a and 25b configured to bend resiliently away from each other. In addition, the wire holder 22 includes a pair of gripping pads 26a and 26b made of resilient material (such as rubber or polyurethane) respectively attached to the flexible clip arms 25a and 25b. In accordance with one proposed implementation, the gripping pads 26a and 26b are in contact when the wire holder 22 is closed. The gripper formed by gripping pads 26a and 26b may be opened to receive a portion (e.g., an end) of a wire by pushing down on angled upper (first) left and right arm portions 24a and 24d (identified in FIG. 4A) of the flexible clip arms 25a and 25b, thereby causing the flexible clip arms 25a and 25b to bend outward and away from each other. The wire may then pass through the gap formed between the gripping pads 26a and 26b. The stressed flexible clip arms 25a and 25b move toward each other when the force causing them to bend outward is removed.

Figure 2A:
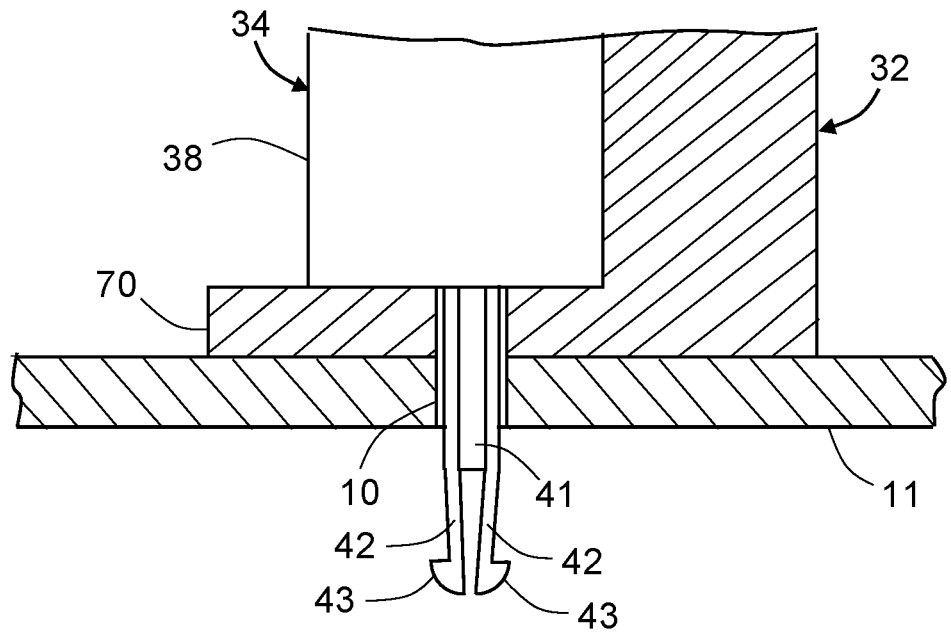
FIG. 2A is a diagram representing a fragmentary side view of the temporary fastener depicted in FIG. 2, showing the fastening mechanism extending through the perforated sheet of a form board in an unclamped position.

A pick-and-place end effector (not shown in the drawings) of a robot carries the wire holding device 8a to a position above a target location (including a target position and a target orientation) on a form board 2. Then the pick-and-place end effector depresses the plunger 40 further into the housing 38, causing the distal ends of locking pins 42 to extend further away from the housing 38 and beyond the spacer 41. As the locking pins 42 are extended beyond the spacer 41, the locking pins 42 come together at their distal ends. The locking pins 42 can then be inserted into a hole 10 in the perforated sheet 11 of the form board 2. FIG. 2A is a diagram representing a fragmentary side view of the temporary fastener 34 depicted in FIG. 2, showing the fastening mechanism extending through the hole 10 in the perforated sheet 11 in an unclamped position.

Figure 2B:
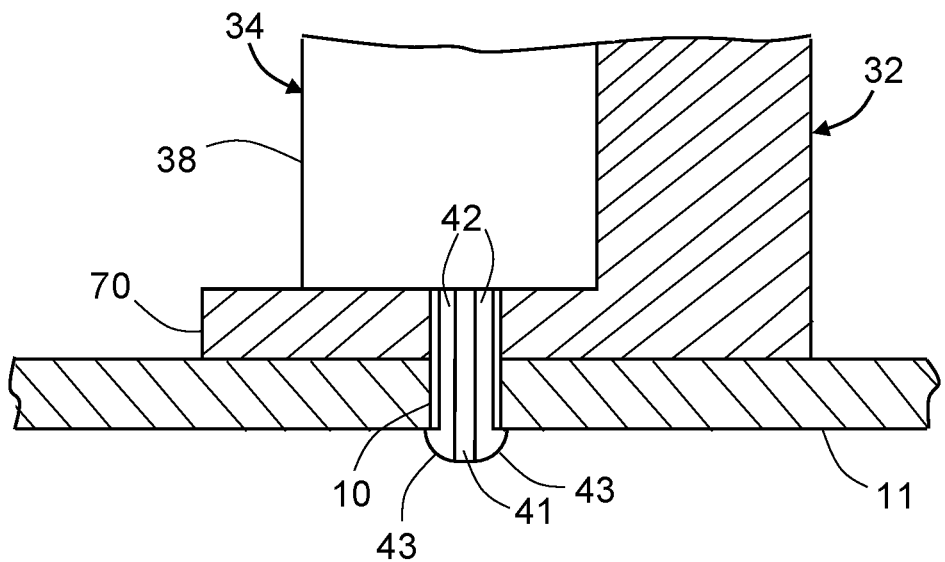
FIG. 2B is a diagram representing a fragmentary side view of the temporary fastener depicted in FIG. 2, showing the fastening mechanism in a clamped position for securing the form board device to the form board.

FIG. 2B is a diagram representing a fragmentary side view of the temporary fastener 34 partly depicted in FIG. 2A, showing the fastening mechanism in a clamped position for securing the wire holding device 8a to the perforated sheet 11 of the form board 2. After the locking pins 42 have been inserted in the hole 10, the pick-and-place end effector releases the plunger 40, causing the distal ends of locking pins 42 to retract back toward the housing 38. The distal ends of the locking pins 42 are again separated from each other by the spacer 41 (which is stationary) as the locking pins 42 retract. As the distal ends of the locking pins 42 separate, the distal ends of the locking pins 42 engage and latch against the opposite side of the perforated sheet 11, thereby locking the form board device to the form board 2. The spring (not shown in the drawings) inside housing 38 pulls the locking pins 42 toward the housing 38, pulling the lower arm 70 of the C-frame 32 tightly against the perforated sheet 11. In the state depicted in FIG. 2B, the distal ends of the locking pins 42 are separated by the spacer and unable to pass through the hole 10. In this way, the temporary fastener 34 depicted in FIG. 2 functions as a temporary rivet capable of holding the wire holding device 8a on the form board 2 during transfer of a wire from a wire-routing end effector 14 to a contact-insertion end effector 18.

Figure 3A:
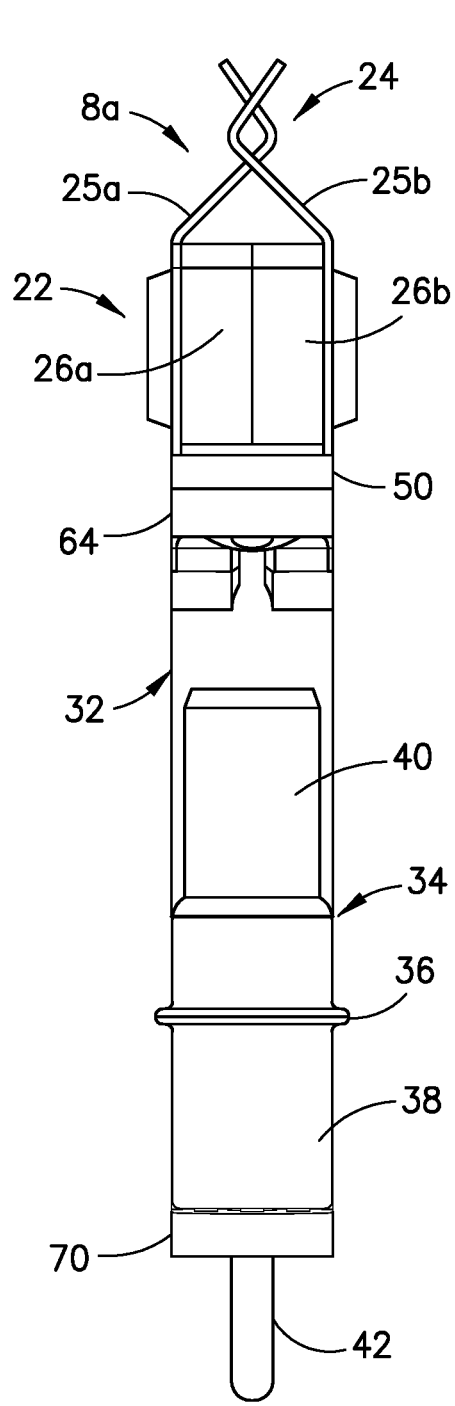
FIG. 3A is a diagram representing an end view of the wire holding device depicted in FIG. 2 in a state wherein the wire holder is closed.
Figure 3B:
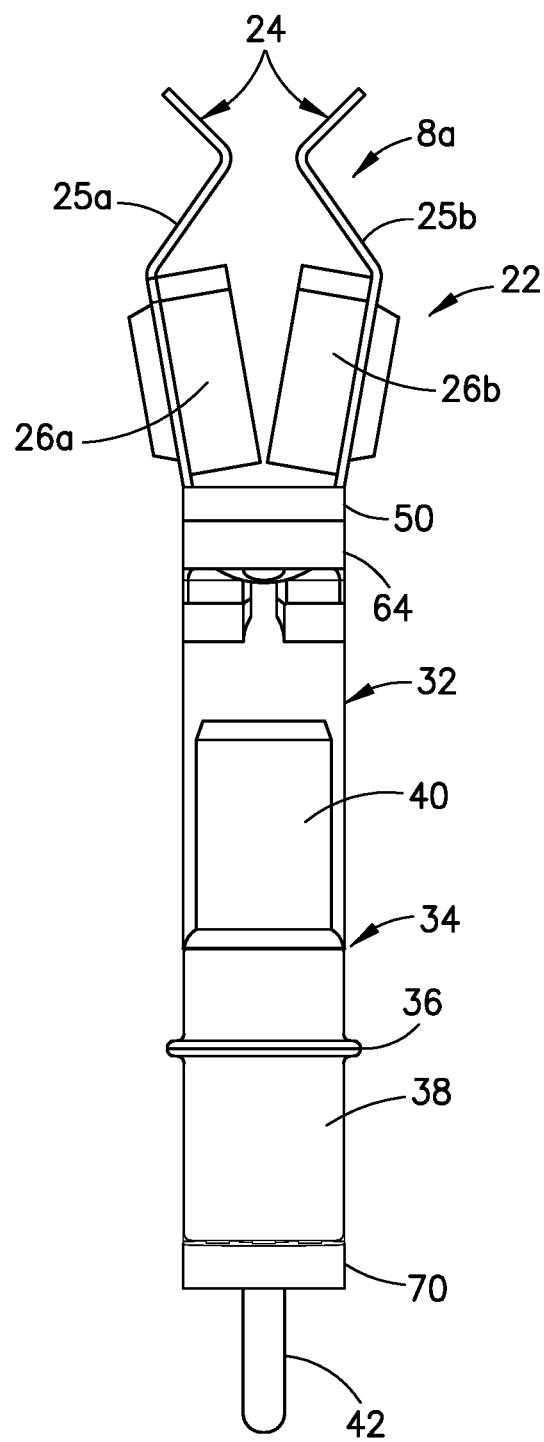
FIG. 3B is a diagram representing an end view of the wire holding device depicted in FIG. 2 in a state wherein the wire holder is open.

FIG. 3A shows an end view of the wire holding device 8a depicted in FIG. 2 in a state wherein the wire holder 22 is closed; FIG. 3B shows an end view of the wire holding device 8a in a state wherein the wire holder 22 is open. In the closed state depicted in FIG. 3A, the flexible clip arms 25a and 25b are unflexed (or slightly flexed) and the gripping pads 26a and 26b are in mutual contact. In the open state depicted in FIG. 3B, the flexible clip arms 25a and 25b are flexed (or flexed to a greater degree) outward in opposite directions and the gripping pads 26a and 26b are thus separated by a gap having a size and shape configured to receive a portion of a wire (not shown in FIG. 3B).

FIG. 4A shows an end view of the wire parking clip 24 when the wire holder 22 is closed, as depicted in FIG. 3A; FIG. 4B shows an end view of the wire parking clip 24 when the wire holder 22 is open, as depicted in FIG. 3B. As seen in FIGS. 4A and 4B, the wire parking clip 24 comprises a base portion 24g, a left clip arm 25a connected at bend line 23a to the base portion 24g, and a right clip arm 25b connected at bend line 23d to the base portion 24g. The left clip arm 25a comprises first, second and third left arm portions 24a-24c; the right clip arm 25b comprises first, second and third right arm portions 24d-24f.

The third left and right arm portions 24c and 24f are connected to the base portion 24g at bend lines 23a and 23d respectively. In accordance with one proposed implementation, the third left and right arm portions 24c and 24f extend generally parallel to each other when the wire parking clip 24 is in the closed state depicted in FIG. 4A and are not parallel when the wire parking clip 24 is in the open state depicted in FIG. 4B. Each of the third left and right arm portions 24c and 24f has a respective vertical slot (not visible in FIGS. 4A and 4B, which slots receive respective portions of the gripping pads 26a and 26b, thereby enabling the attachment of gripping pad 26a to flexible clip arm 25a and the attachment of gripping pad 26b to flexible clip arm 25b, as seen in FIGS. 3A and 3B.

The second left and right arm portions 24b and 24e are respectively connected to the third left and right arm portions 24c and 24f at bend lines 23b and 23e. In the closed state, the second left and right arm portions 24b and 24e are respectively disposed such that the second left and right arm portions 24b and 24e cross at a first crossing X1 at a first elevation above the base portion 24g in the front view of the wire parking clip 24 seen in FIG. 4A.

The first left and right arm portions 24a and 24d are respectively connected to the second left and right arm portions 24b and 24e at bend lines 23c and 23f. In the closed state, the first left and right arm portions 24a and 24d are respectively disposed such that the first left and right arm portions 24a and 24b cross at a second crossing X2 at a second elevation above the base portion in the front view of the wire parking clip 24 seen in FIG. 4A. The second elevation of crossing X2 is higher than the first elevation of crossing X1.

From the viewpoint of FIG. 4A, the first left and right arm portions 24a and 24d form an angle θ above the second crossing X2 when the wire parking clip 24 is in the closed state. In accordance with one proposed implementation, the angle θ is acute (less than 90 degrees). As will be described in more detail below with reference to FIGS. 6A-6D, the first left and right arm portions 24a and 24d are pushed apart (cammed) in opposite directions when contacted by a downwardly moving routing beak 16 of the wire-routing end effector 14 seen in FIG. 1. This camming action causes the wire holder 22 to open to facilitate the receipt of a wire projecting forward from the tip of the routing beak 16. The routing beak 16 is described in more detail below with reference to FIG. 17.

The wire parking clip 24 may be formed by bending a planar substrate along the first through sixth bend lines 23a-23f. As a result, the third left arm portion 24c is connected to the base portion 24g at the first bend line 23a; the second left arm portion 24b is connected to the third left arm portion 24c at the second bend line 23b; the first left arm portion 24a is connected to the second left arm portion 24b at the third bend line 23c; the third right arm portion 24f is connected to the base portion 24g at the fourth bend line 23d; the second right arm portion 24e is connected to the third right arm portion 24f at the fifth bend line 23e; and the first right arm portion 24d is connected to the second right arm portion 24e at the sixth bend line 23f. In accordance with one proposed implementation, the wire parking clip 24 is made of spring steel or polycarbonate and the first and second gripping pads 26a and 26b are made of elastomeric material (e.g., silicone rubber) or foam (e.g., polyurethane).

Figure 5:
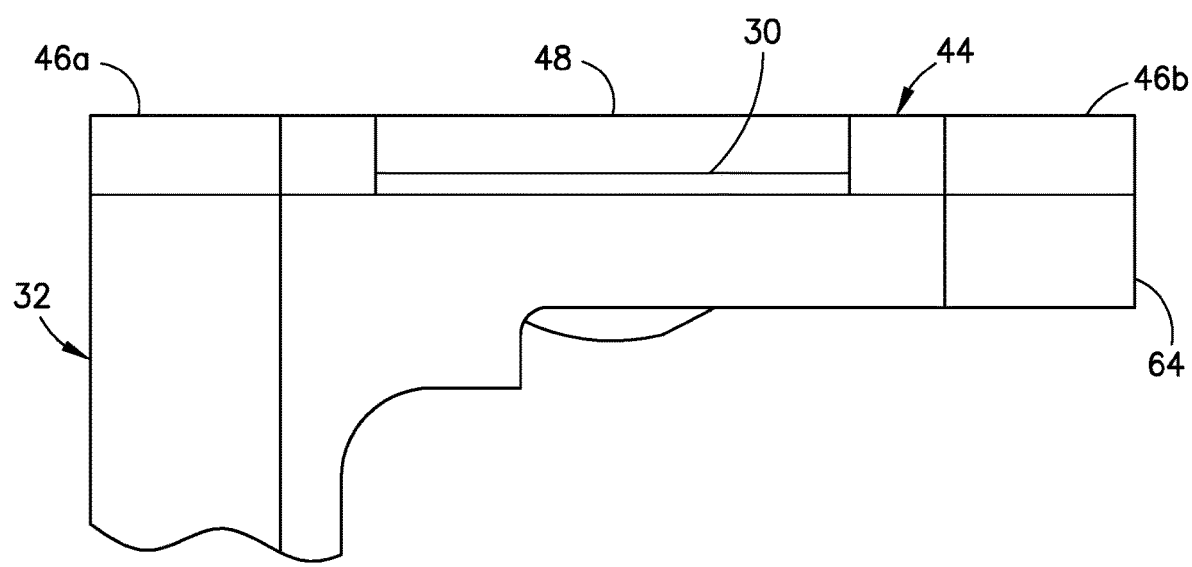
FIG. 5 is a diagram representing a side view of a portion of the wire holding device having a slot which receives a portion of the wire parking clip of the wire holder.

FIG. 5 is a diagram representing a side view of a portion of the wire holding device 8a having a channel 30 which receives the base portion 24g of the wire parking clip 24. The channel 30 is formed by three surfaces of a mounting plate 44 and one surface of the upper arm 64 of the C-frame 32. The mounting plate 44 includes a pair of mounting flanges 46a and 46b having respective counterbored through holes and a bridge plate 48 which is integrally formed with and connects the mounting flanges 46a and 46b. The mounting plate 44 is fastened to the upper arm 64 of the C-frame 32 by respective screws 50 (seen in FIG. 2) to form the channel 30 between the bridge plate 48 and upper arm 64. The channel 30 is occupied by the base portion 24g of the wire parking clip 24. The geometry and dimensions of the channel 30 match the outer geometry and dimensions of the base portion 24g so that the base portion 24g is held securely in place during opening and closing of the wire parking clip 24. For example, the width of the bridge plate 48 may be only slightly less than the distance separating the third left and right arm portions 24c and 24f at the bend lines 23a and 23d, thereby preventing the wire parking clip from sliding left to right or vice versa during opening and closing.

FIGS. 6A through 6D are diagrams representing three-dimensional views of a wire-routing end effector 14 at successive stages of an automated process for placing the end of a wire 1 in a wire holding device 8a of the type depicted in FIG. 2. In this example, the wire holding device 8a is fastened to a perforated plate (the perforations are not shown in FIGS. 6A-6D to avoid clutter) of a form board 2. In this example, the wire 1 is terminated by an electrically conductive contact 3 (hereinafter "contact 3"). In other embodiments, the end of the wire 1 is not terminated by an electrically conductive contact.

The wire-routing end effector 14 (which will be described in more detail later with reference to FIGS. 18A, 18B and 19) includes a mounting plate 88, a lower frame 92 affixed (fixedly coupled) to the mounting plate 88, and a reelette 90 rotatably coupled to the mounting plate 88. The mounting plate 88 is attached to a manipulator arm 112. The wire-routing end effector 14 further includes a wire-dispensing beak 16 (hereinafter "routing beak 16") that is attached to and projects from the lower frame 92.

During an automated wire routing operation, the wire-routing end effector 14 moves the tip of the routing beak 16 along a TCP path as a wire 1 is continuously dispensed from the routing beak 16 and laid on various form board devices (not shown in FIGS. 6A-6D) attached to the form board 2. During an automated wire-end transfer operation (which may occur prior to the start of the automated wire routing operation) involving the wire holding device 8a, the routing beak 16 physically interacts with the wire parking clip 24 to place a portion of the wire 1 (or the contact 3) between the gripping pads 26a and 26b (see FIG. 2) of the wire holder 22, with the contact hanging on the end of the wire 1 beyond the gripping pads. In the embodiment shown in FIGS. 6A-6D, the contact 3 hangs on the end of the wire 1 beyond the gripping pads. In alternative embodiments of the automated wire-end transfer operation, the contact 3 may be placed between the gripping pads.

Figure 6A:
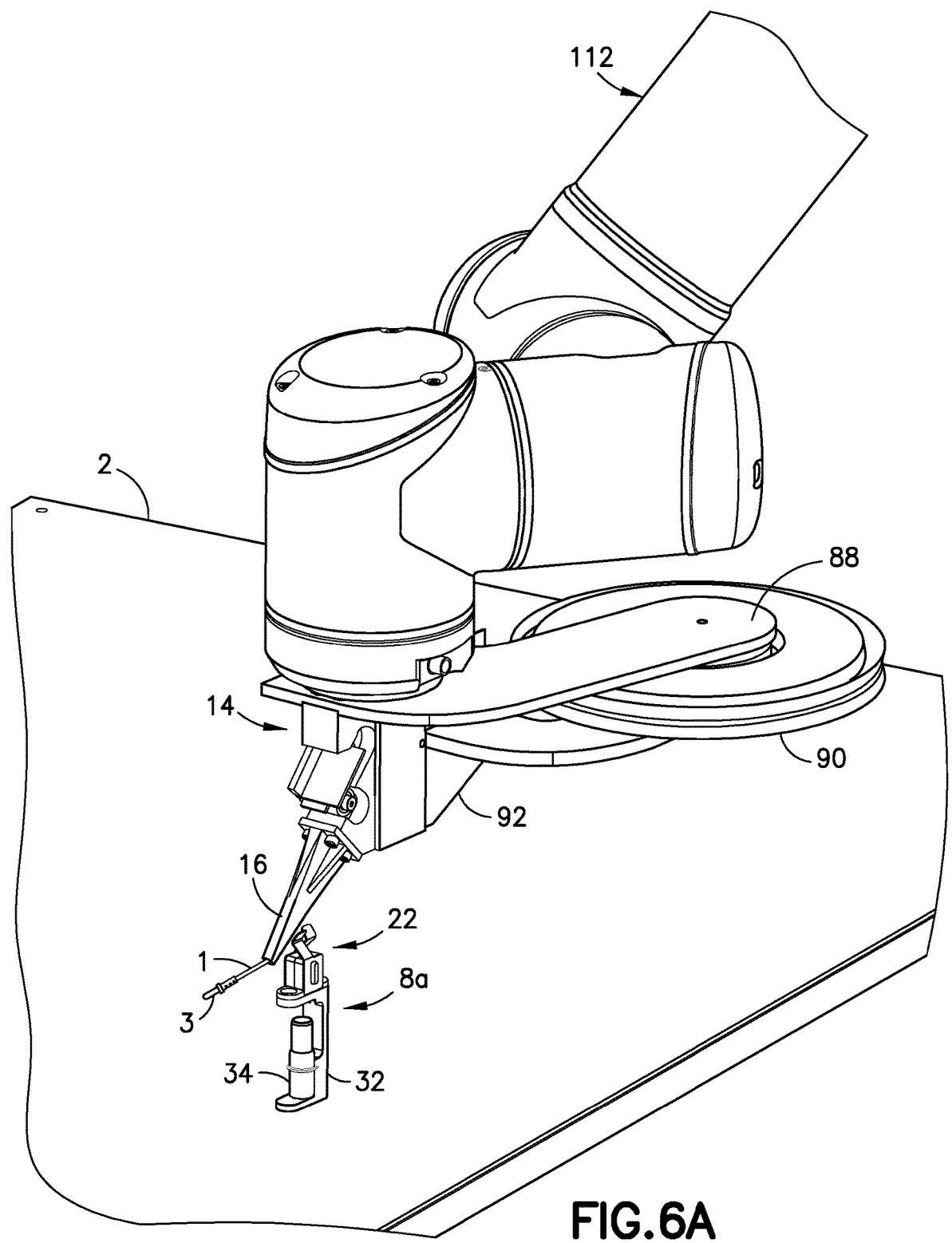
FIGS. 6A through 6D are diagrams representing three-dimensional views of a wire-routing end effector at successive stages of an automated process for placing the end of a wire in a wire holding device of the type depicted in FIG. 2.
Figure 6B:
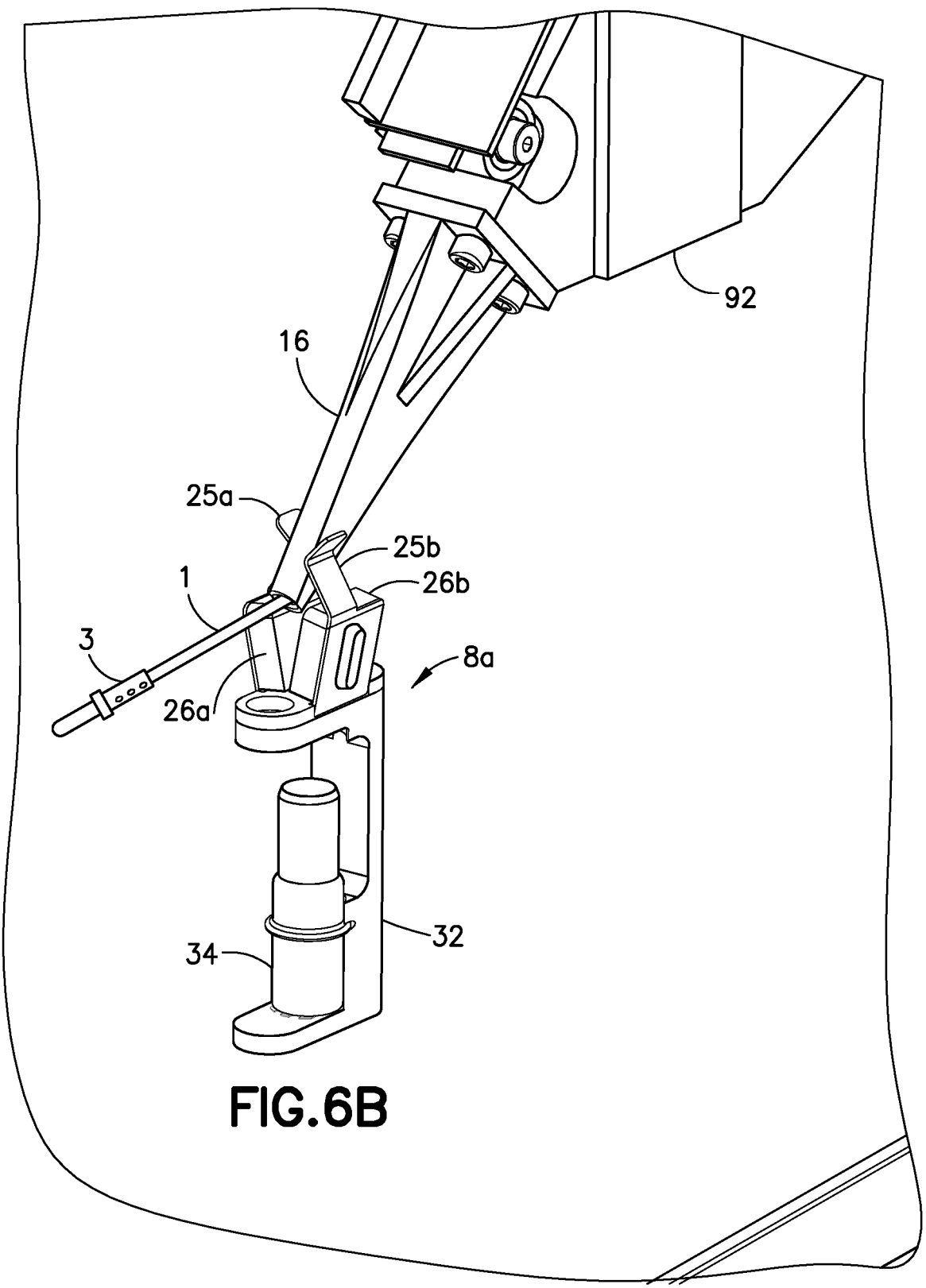
Figure 6C:
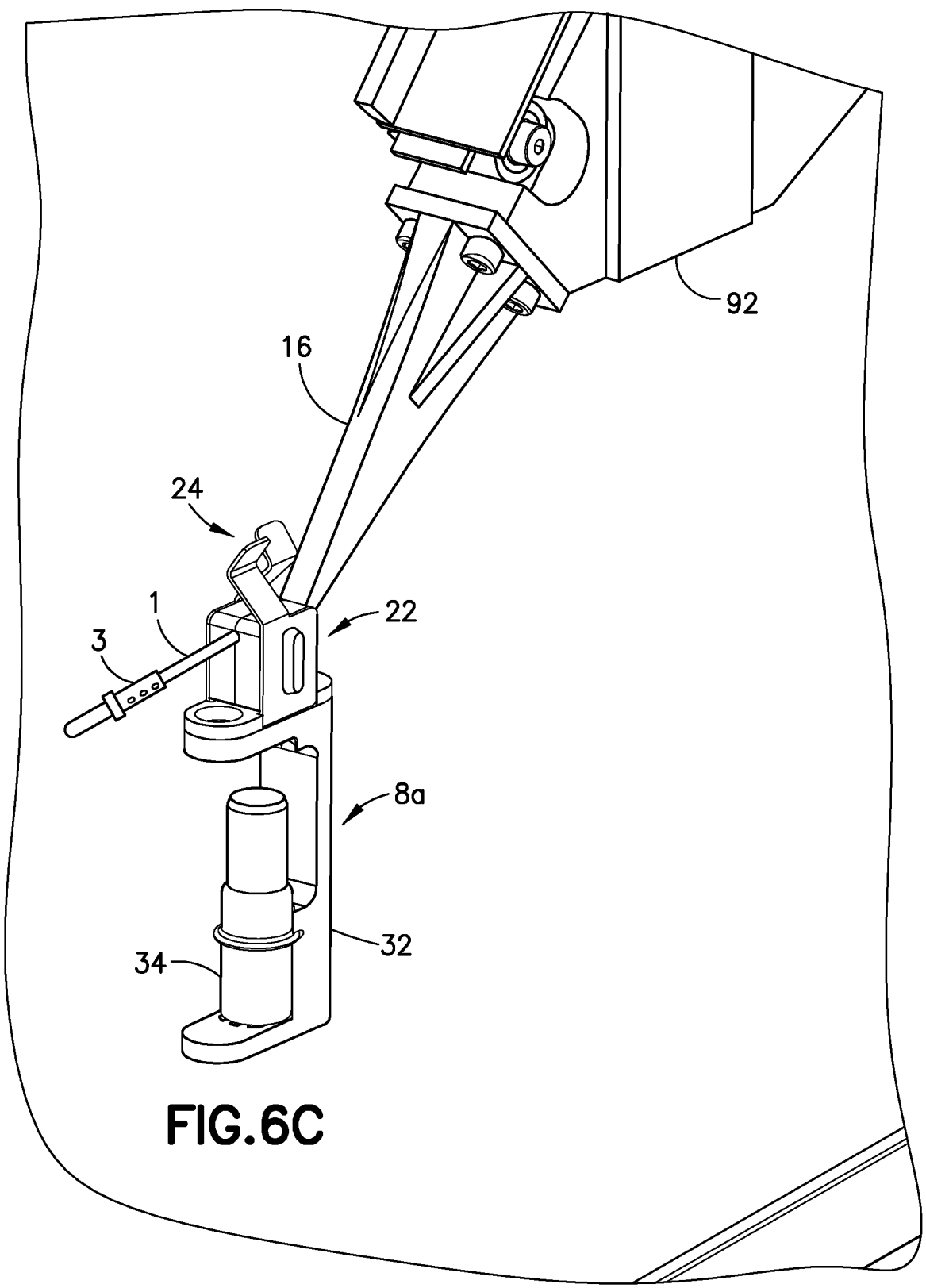

The size and shape of the routing beak 16 are designed to physically interact with the wire parking clip 24 to change the state of the wire parking clip 24 from closed to open and then from open to closed. The state transition from closed to open is achieved by moving the routing beak 16 into contact with the closed wire parking clip 24 as seen in FIG. 6A and then continuing to move the routing beak 16 to open the wire parking clip 24 as seen in FIG. 6B. This may be accomplished by controlling the wire-routing end effector 14 such that the tip of the routing beak 16 follows a TCP path which is parallel to and at an elevation above the plane of the perforated plate of the form board 2. As the routing beak 16 continues to move past the position where the routing beak 16 first contacts the wire parking clip 24, the routing beak 16 deflects the flexible clip arms 25a, 25b (see FIGS. 3A and 3B) of the wire parking clip 24 outward in opposite directions. The state transition from open to closed is achieved by continuing to move the routing beak 16 through the wire parking clip 24 until the routing beak 16 exits the other side of the wire parking clip 24 as seen in FIG. 6C, at which position the routing beak 16 ceases to contact and hold the flexible clip arms 25a, 25b apart. Upon removal of the contact forces holding the flexible clip arms 25a, 25b apart, the flexible clip arms 25a, 25b return to their respective wire parking clip closed positions. At this stage, the gripping pads 26a and 26b are in mutual contact with each other and with the intervening portion of the wire. The flexible clip arms 25a, 25b and gripping pads 26a, 26b are designed such that the wire 1 is held securely as the wire-dispensing routing beak 16 continues to move (shown in FIG. 6D).

Figure 7:
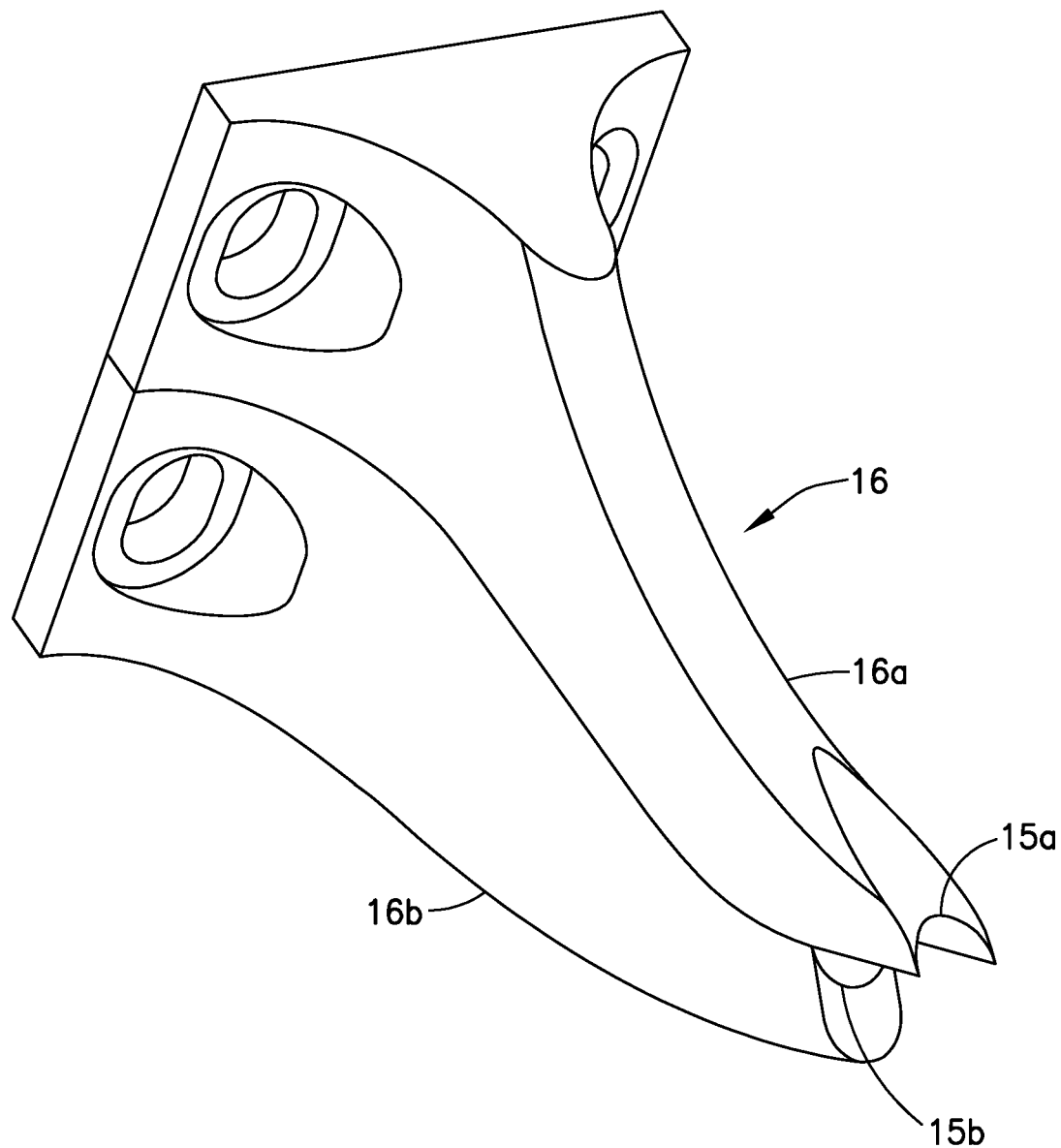
FIG. 7 is a diagram representing a three-dimensional view of a wire-dispensing beak of the wire-routing end effector depicted in FIGS. 6A-6D.

FIG. 7 is a diagram representing a three-dimensional view of a routing beak 16 in accordance with one embodiment.

The routing beak 16 has a height which decreases from a point of attachment to the lower frame 92 to a tip of the routing beak 16. The routing beak 16 includes an upper beak part 16a having a groove 15a and a lower beak part 16b having a groove 15b. The grooves 15a and 15b form the channel which is configured to guide a portion of a wire that is being passed through the routing beak 16. More specifically, the channel is configured to guide the wire along a predetermined path relative to the lower frame 92 as the wire moves through the channel. The upper beak part 16a projects forward beyond the lower beak part 16b, thereby limiting upward movement of the portion of the wire positioned under the overhang. The robot controller may be programmed to treat a selected point underneath the overhang as the tool center point (TCP).

Figure 8:
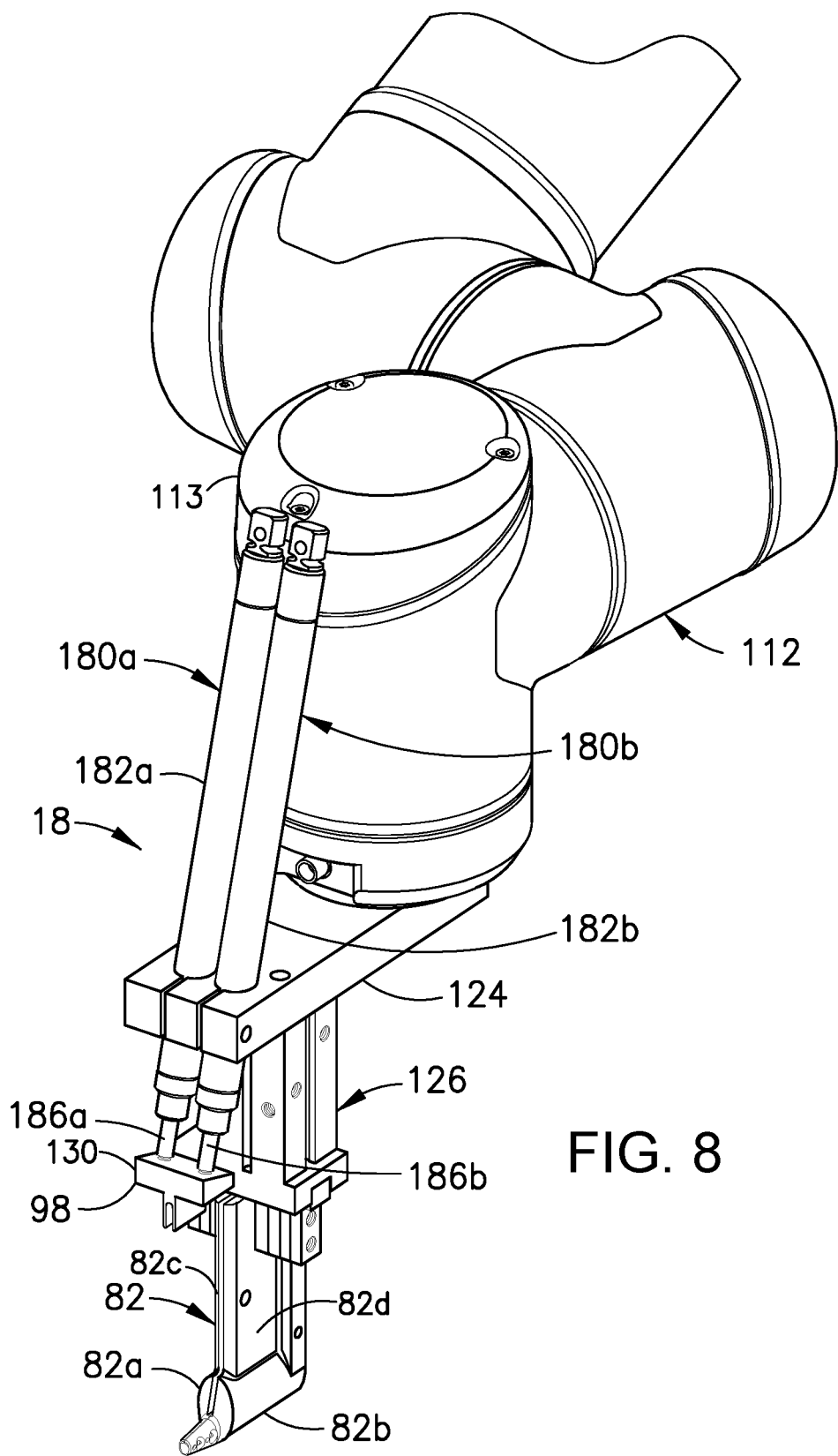
FIG. 8 is a diagram representing a three-dimensional view of a contact-insertion end effector comprising a wire gripper and an extendible clip-opening wedge in accordance with one embodiment.

FIG. 8 is a diagram representing a three-dimensional view of a contact-insertion end effector 18 mounted to a manipulator arm 112. The manipulator arm 112 comprising a plurality of links including a distal link 113, a plurality of joints which couple the links to form a kinematic chain, and motors (not visible in FIG. 8) for driving movement of the plurality of links. in accordance with one embodiment, the contact-insertion end effector 18 comprises a mounting plate 124 and a frame 126 attached to and depending from the mounting plate 124. The mounting plate 124 in turn is mounted to the distal link 113 of the manipulator arm 112. The distal link 113 is rotatable about a vertical axis. Thus, the contact-insertion end effector 18 is rotatable about the same vertical axis.

The contact-insertion end effector 18 further includes a wire gripper 82 (hereinafter "gripper 82") comprising first and second gripper arms 82c and 82d movably coupled to the frame 126 for concurrent movements in opposite directions, and first and second gripper jaws 82a and 82b projecting from the first and second gripper arms 82c and 82d respectively. The first and second gripper jaws 82a and 82b are spreadable by a distance which varies as a function of respective movements of the first and second gripper arms 82c and 82d in opposite directions. The gripper 82 further includes a gripper drive motor and associated gear train (not visible in FIG. 8) for driving movements of the first and second gripper arms 82c and 82d. A robot controller (not shown in FIG. 8) is configured to control operation of the first gripper drive motor for controlling movements of the first and second gripper arms. The gripper jaws 82a and 82b are mechanically linked so that they move in opposite directions in tandem: moving toward each other to close and away from each other to open. The gripper jaws 82a and 82b have respective grooves (not shown in FIG. 8) which are configured to grip a wire when the gripper 82 is closed. In alternative embodiments, the gripper drive device may be formed so as to drive the gripper jaws 82a and 82b by, for example, air pressure. In this instance, the gripper drive device can include a cylinder and an air pump for supplying compressed air to the cylinder.

Figure 6D:
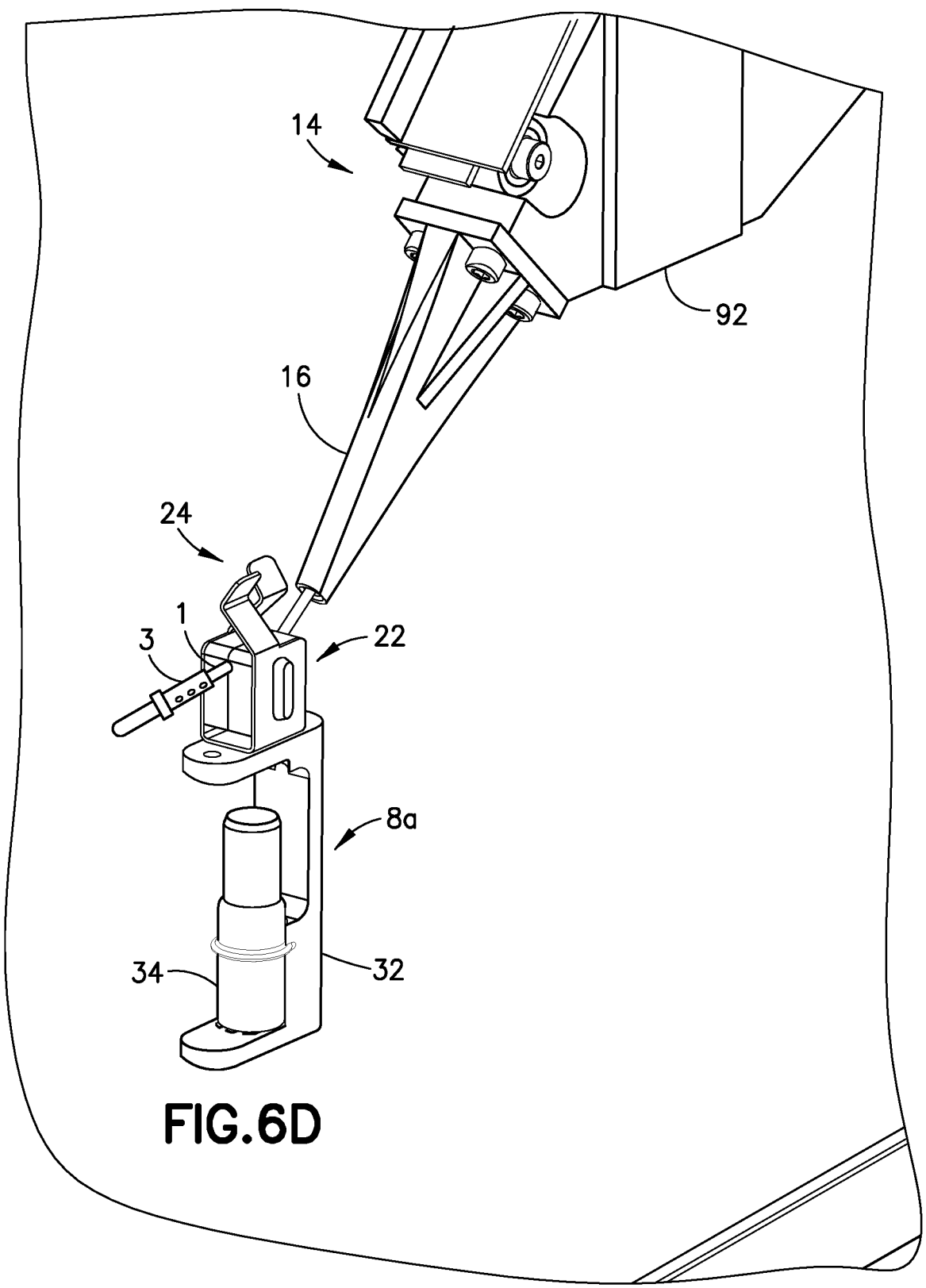

The contact-insertion end effector 18 further includes an extendible clip-opening wedge (hereinafter "wedge 98") that is configured to approach and splay open the flexible clip arms of a wire parking clip 24 of the type depicted in FIG. 6D when a pair of pneumatic cylinders 180a and 180b are actuated. As seen in FIG. 8, pneumatic cylinder 180a includes a cylinder body 182a and a piston rod 186a, whereas pneumatic cylinder 180b includes a cylinder body 182b and a piston rod 186b (the internal pistons are not visible). The upper ends of the cylinder bodies 182a and 182b are fastened to the distal link 113 of the manipulator arm 112. The base 130 of the wedge 98 is attached to the distal ends of the piston rods 186a and 186b. FIG. 8 shows the wedge 98 in a retracted position. When the piston rods 186a and 186b are extended, the wedge 98 will translate to a lower elevation, moving closer to the gripper jaws 82a and 82b (as shown in FIG. 8B). The aforementioned robot controller is configured to control operation of the pneumatic cylinders 180a and 180b for controlling extension and retraction of the wedge 98.

Each pneumatic cylinder 180a and 180b is operatively coupled to a pressure regulator by way of a respective solenoid valve and a respective flexible hose (not shown in FIGS. 8A-8D). The pressure regulator regulates (i.e., reduces) the pressure of the compressed air being supplied by a main air supply. The pneumatic cylinders 180a and 180b are preferably of the double-acting type, meaning that they are capable of moving the piston in either one of opposite directions to produce either an extend stroke or a retract stroke.

Figure 8A:
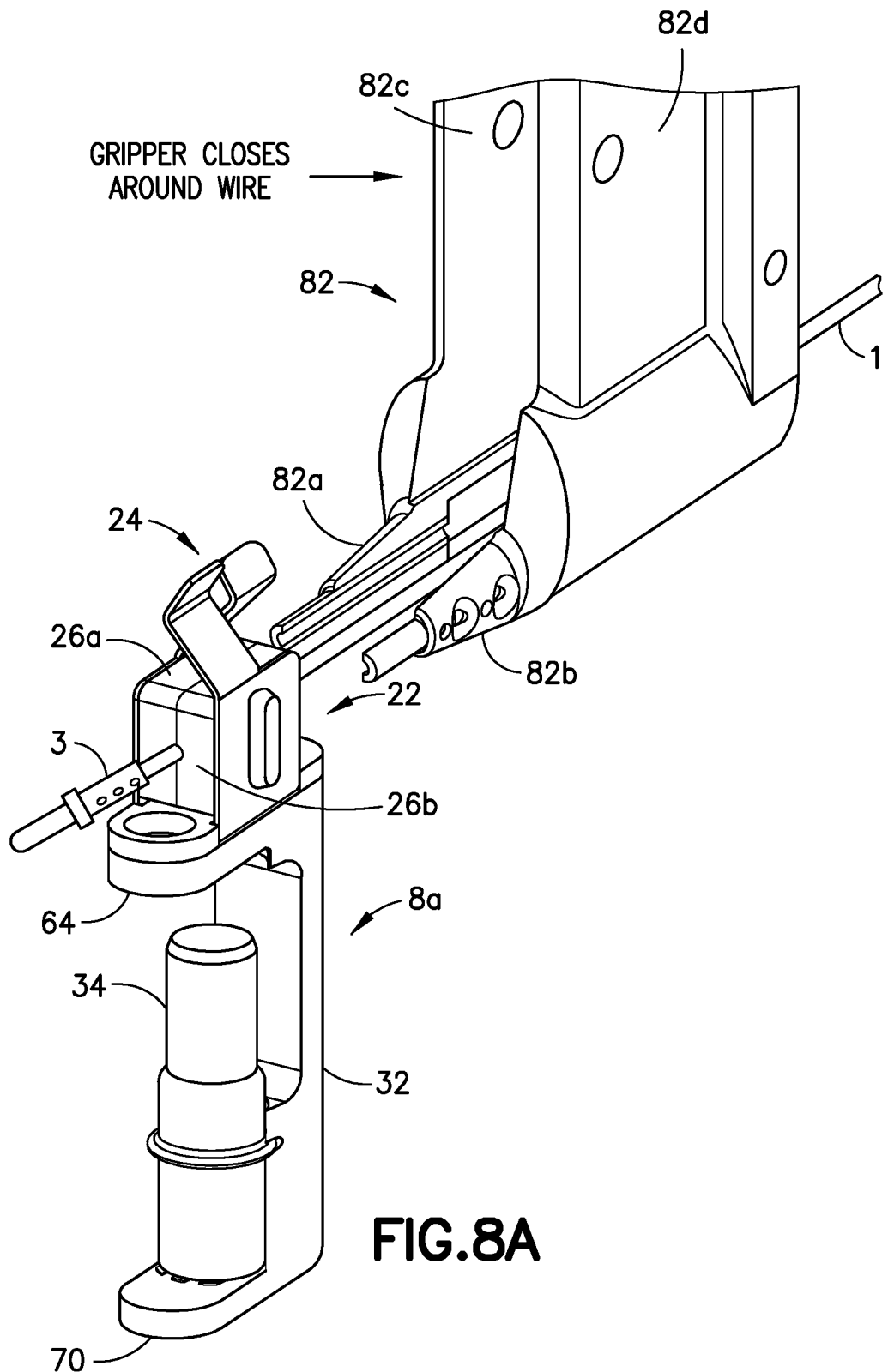

FIGS. 8A through 8D are diagrams representing three-dimensional views of the contact-insertion end effector 18 depicted in FIG. 8 at successive stages of an automated process for removing the end of a wire 1 from a wire holding device 8a of the type depicted in FIG. 2. First, the gripper 82 is opened so that first and second gripper jaws 82a and 82b are separated by a distance greater than a width of the wire 1 being held by the wire holding device 8a. Then the contact-insertion end effector 18 is moved so that the gripper jaws 82a and 82b are disposed on opposite sides of a portion of the wire 1 in proximity to the portion of wire 1 being held by the wire holder 22, as seen in FIG. 9A. Then the gripper 82 is closed. While the gripper 82 is holding the wire 1, the piston rods 186a and 186b are extended to move the wedge 98 along a path that causes the wedge to contact and then splay the flexible clip arms 25a and 25b, as seen in FIG. 8B. This action causes the gripping pads 26a and 26b to separate, thereby releasing the wire 1.

Figure 9:
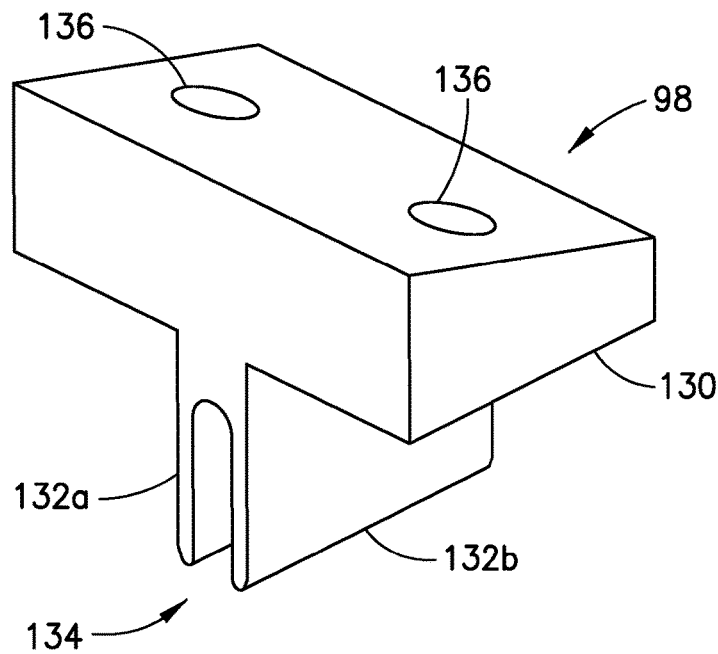
FIG. 9 is a diagram representing a three-dimensional view of the clip-opening wedge depicted in FIG. 8.
Figure 9A:
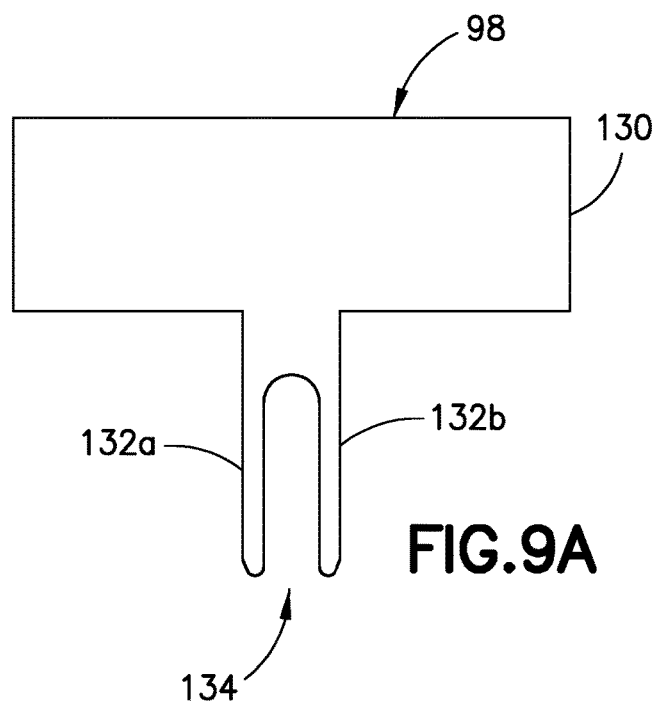
FIGS. 9A and 9B are diagrams representing front and side views of the clip-opening wedge depicted in FIG. 9.
Figure 9B:
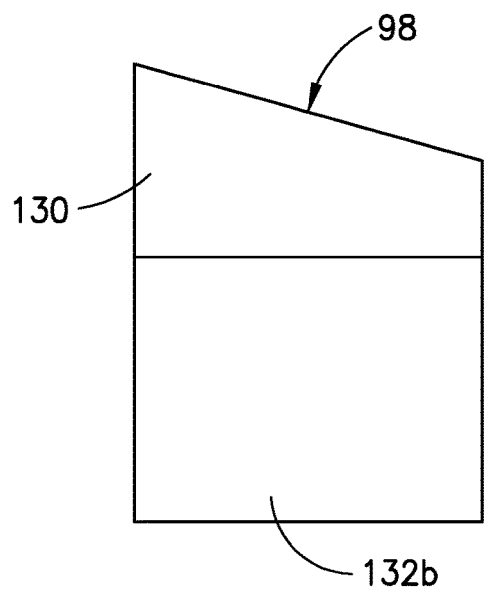

FIGS. 9, 9A and 9B are diagrams representing three-dimensional, front and side views respectively of the clip-opening wedge 98 depicted in FIG. 8B. The wedge 98 comprises a base 130 having a pair of threaded holes 136 which receive threaded ends of the respective piston rods for mounting the wedge 98 to the pneumatic cylinders 180a and 180b. The wedge 98 further comprises a pair of contact blades 132a and 132b which project from a bottom surface of the base 130. The contact blades 132a and 132b have mutually parallel blunt linear edges which push down on the angled upper left and right arm portions 24a and 24d (identified in FIG. 4A) of the flexible clip arms 25a and 25b, thereby causing the flexible clip arms 25a and 25b to bend outward and away from each other as the wedge 98 descends. In addition, the contact blades 132a and 132b form a recess 134 therebetween. The blunt linear edges of the contact blades 132a and 132b define a gap at the mouth of the recess 134, which gap has a width greater than the diameter of the wire 1, thereby allowing the wire 1 to enter the recess 134, as seen in FIG. 8C.

While the wire holder 22 is wedged open (as seen in FIG. 8B), the contact-insertion end effector 18 is moved vertically upward to cause the gripper 82 to adopt the position seen in FIG. 8C. This vertical upward movement removes the wire 1 from the wire holder 22 and places it inside the recess 134. As the contact-insertion end effector 18 is moved vertically upward, the piston rods 186a and 186b extend further (relative to the end effector), thereby maintaining the wire holder 22 open. After the wire 1 is placed within the recess 134 of the wedge 98, the gripper 82 and wedge 98 are raised in tandem to the position shown in FIG. 9D. As the contact blades 132a and 132b of wedge 98 clear the uppermost angled portions of the flexible clip arms 25a and 25b, the spring forces produced by bending return the flexible clip arms 25a and 25b to their respective wire holder closed positions. At this stage the wedge 98 may be retracted and the contact-insertion end effector 18 may be moved toward the final destination of the wire end being held by the gripper 82.

In accordance with one proposed implementation, 22. The apparatus as recited in claim 20, the robot controller is configured to perform operations comprising: (a) generating control signals for activating one motor to cause the gripper jaws 82a and 82b to grip one portion of a wire 1; (b) generating control signals for activating the pneumatic cylinders 180a and 180b (or other linear actuators) to move the wedge 98 (or other clip opening means) into contact with left and right flexible clip arms 25a and 25b of the wire parking clip 24 holding another portion of the wire and then force the wire parking clip open 24; and (c) generating control signals for activating another motor to raise the gripper 82 so that the other portion of the wire 1 is removed from the wire parking clip 24.

FIGS. 10A through 10H are diagrams representing side views of a wire-routing system at successive stages of an automated process for transferring the end of a wire 1 from a wire-routing end effector 14 to a contact-insertion end effector 18 (or other secondary end effector). FIG. 10A shows a routing beak 16 of a wire-routing end effector approaching a wire holding device 8a fastened to a form board 2. The direction of movement is indicated by an arrow. An end section of a wire 1 having a contact 3 crimped thereon trails behind the leftward-moving routing beak 16. FIG. 10B shows the routing beak 16 as it opens the wire parking clip of the wire holding device 8a. FIG. 10C shows the routing beak 16 as it moves toward the first form board device (not shown in FIG. 10C) along the planned route of the wire 1, while the end of the wire is held by the wire holding device 8a. FIG. 10D shows the end of wire 1 still being held while the rest of the wire is being routed by the routing beak, which is now located elsewhere. The gripper 82 of a contact-insertion end effector then descends and grips the wire 1 behind the wire parking clip of the wire holding device 8a, as shown in FIG. 10E. Next a linear actuator 84 of the contact-insertion end effector is extended, causing a wedge 98 (attached to the distal end of the linear actuator 84) to descend in the direction indicated by the arrow in FIG. 10F. During this downward motion, the wedge 98 opens the wire parking clip of the wire holding device 8a. Then the gripper 82 is raised while the wedge 98 maintains the wire parking clip open, as seen in FIG. 10G, thereby removing the wire 1 from the wire parking clip of the wire holding device 8a and placing in a recess of the wedge 98. Lastly, the linear actuator 84 is retracted, as indicated by the upward-pointing arrow in FIG. 10H. This upward movement removes the wedge 98 from the wire holding device 8a, allowing the wire parking clip to close. The gripper 82 may then be moved toward the form board device that is the next or final destination of the end of the wire 1, which was being held by the wire holding device 8a only temporarily.

Figure 11:
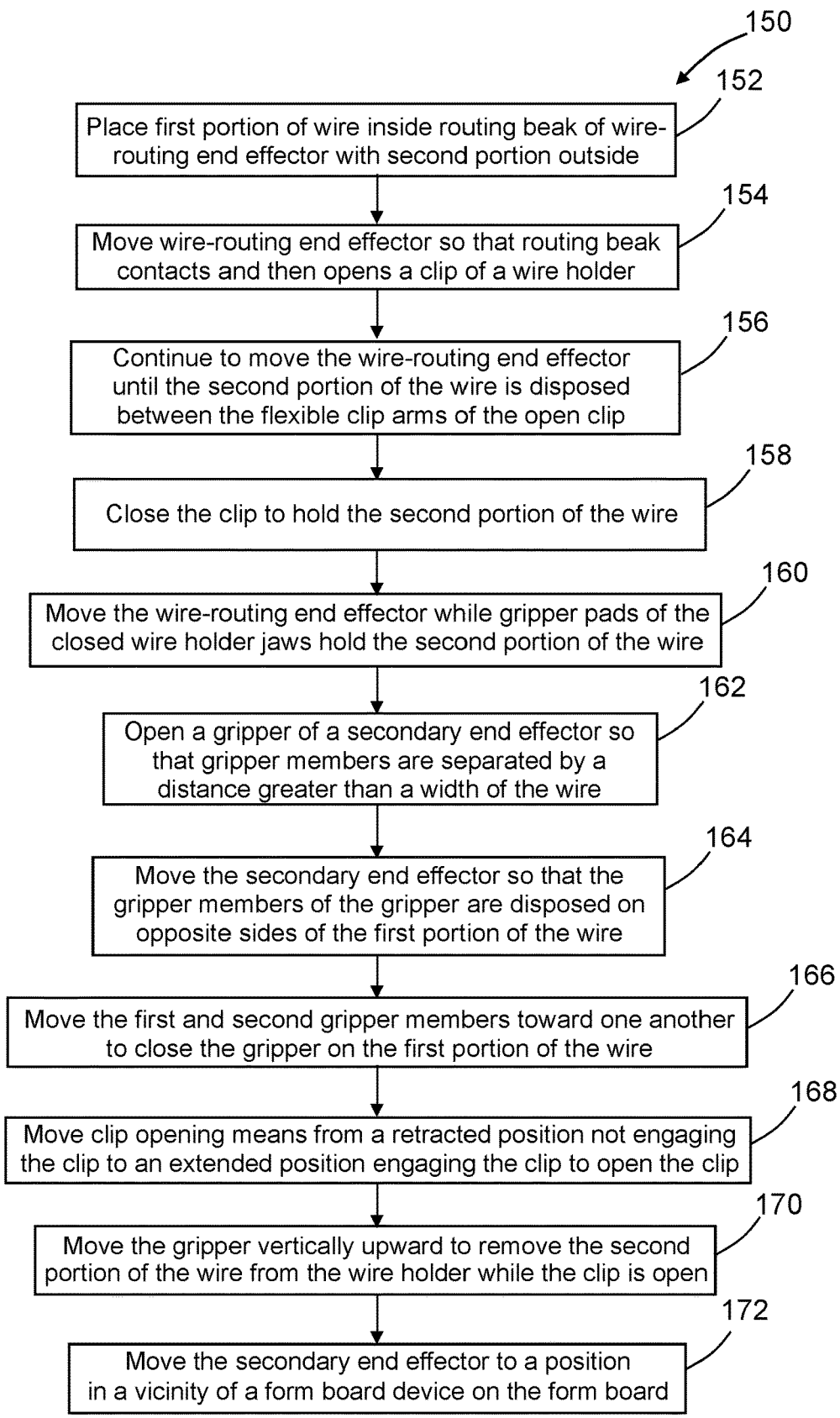
FIG. 11 is a flowchart identifying steps of a method for holding a wire during the transfer of the wire from a wire-routing end effector to a contact-insertion end effector using the wire holding device depicted in FIG. 2.

FIG. 11 is a flowchart identifying steps of a method 150 for transferring a wire 1 from a wire-routing end effector 14 (shown in FIG. 20A) to a secondary end effector (e.g., contact-insertion end effector 18 shown in FIG. 8A) using the wire holding device 8a depicted in FIG. 2. The end effectors may be attached to distal ends of respective manipulator arms 112. In accordance with one embodiment of a wire transfer method, a second portion of the wire 1 is placed inside a channel of a routing beak 16 of the wire-routing end effector 14 while a first portion of the wire 1 (optionally terminated by a contact) projects outside the channel and forward of a tip of the routing beak 16 (step 152). Then the wire-routing end effector 14 is moved so that the routing beak 16 contacts and then opens a wire parking clip 24 of the wire holder 22 (step 154). As the wire-routing end effector 14 moves, the routing beak 16 applies contact forces which cause each of the flexible clip arms 25a and 25b to displace from a respective first position to a respective second position, whereby first and second gripping pads of the wire holding device separate with a gap therebetween. Spring forces in opposition to the contact forces are produced as the flexible clip arms 25a and 25b move apart. As the process continues, the wire-routing end effector 14 continues to move until the first portion of the wire 1 is disposed between the flexible clip arms 25a and 25b of the open wire parking clip 24 (step 156). Then the spring forces produced by the flexed flexible clip arms 25a and 25b close the wire parking clip 24 to hold the first portion of the wire 1 (step 158). Then the wire-routing end effector 14 is moved further away from the wire holding device 8a while the gripping pads 26a and 26b of the closed wire parking clip 24 hold the first portion of the wire 1 (step 160).

In accordance with one embodiment of the method described in the immediately preceding paragraph, the method 150 further comprises automated operations performed by a second end effector for removing the wire 1 from the wire holder 22 to complete the wire transfer from one end effector to another. Referring again to FIG. 11, after the wire-routing end effector has been moved away (step 160) to provide clearance, the gripper 82 of a secondary end effector is opened (step 162) so that first and second gripper jaws 82a and 82b are separated by a distance greater than a width of the wire 1 being held by the wire holding device 8a. Then the secondary end effector is moved so that the gripper jaws 82a and 82b are disposed on opposite sides of the second portion of the wire 1 disposed outside the wire holder 22 (step 164). Then the gripper jaws 82a and 82b are moved toward one another to close the gripper 82 on the second portion of the wire 1 (step 166). A wedge 98 of the secondary end effector is then moved relative to the gripper 82 from a retracted position, where the wedge 98 does not contact the flexible clip arms 25a and 25b, to an extended position, during which movement the wedge 98 applies contact forces which cause the wire parking clip 24 to open and the gripping pads 26a and 26b to separate (step 168). While the wire holder 22 is being wedged open, the gripper 82 is moved vertically upward to remove the first portion of the wire 1 from the wire holder 22 (step 170). Finally, the secondary end effector is moved away from the wire holding device 8a to a position in a vicinity of another form board device (step 172), at which position the secondary end effector performs another operation involving placement of the wire end or insert of a contact crimped on the wire end.

Figure 12:
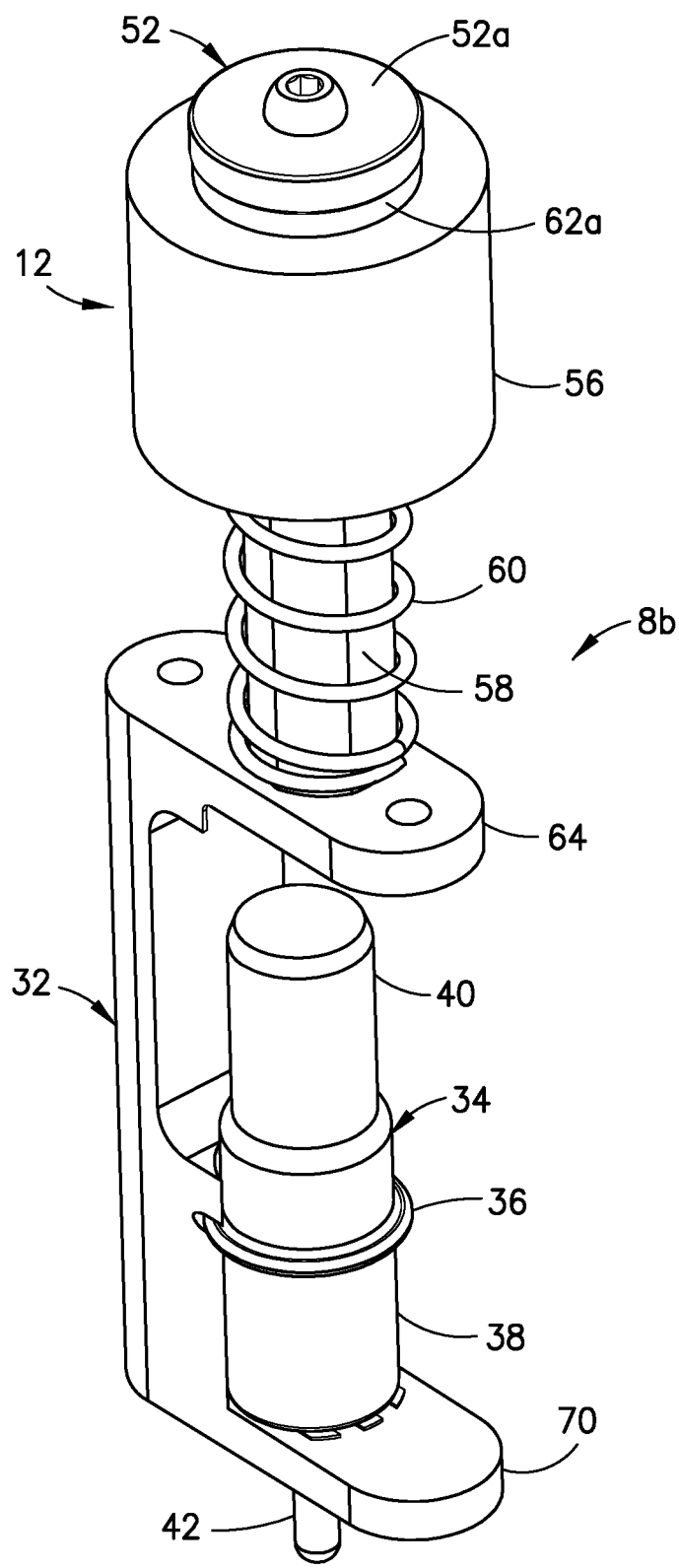
FIG. 12 is a diagram representing a three-dimensional view of a wire holding device comprising a wire holder, a C-frame and a temporary fastener in accordance with a second embodiment.

FIG. 12 is a diagram representing a three-dimensional view of a wire holding device 8b in accordance with a second embodiment that includes a C-frame 32, a temporary fastener 34 fastened to the C-frame 32, and a wire holder 12 supported by the C-frame 32. The C-frame 32 and the temporary fastener 34 are constructed as previously described with reference to FIG. 2.

The wire holder 12 includes a rigid subassembly that is fastened to the upper arm 64 of the C-frame 32. This rigid subassembly includes a flanged button head screw 52, a circular cylindrical sleeve 54 (hereinafter "sleeve 54"), and a male—female threaded standoff 58 (hereinafter "standoff 58"). The standoff 58 is threadably coupled to the upper arm 64 of the C-frame 32. The flanged button head screw 52 threadably coupled to the standoff 58. In the fully assembled state of the wire holding device 8b, a threaded shaft 52b of the flanged button head screw 52 is disposed inside the sleeve 54. In one proposed implementation, the flanged button head screw 52 and standoff 58 are made of aluminum, while the sleeve 54 is made of acrylonitrile butadiene styrene (ABS) or similar material.

The wire holder 12 further includes a clamp body 56 which is slidably coupled to the sleeve 54 for axial displacement relative to flanged button head screw 52. In accordance with the aforementioned implementation, the clamp body 56 is made of ABS or similar material. The ABS will resist damaging any end effector parts that contact the clamp body 56.

The wire holder 12 further includes a compression spring 60 which is configured and arranged to compress as the clamp body 56 is displaced axially toward the upper arm 64 of the C-frame 32 and away from the flanged button head 52a. As seen in FIG. 12, the compression spring 60 is braced by the upper arm 64 of the C-frame. As the clamp body 56 is displaced toward the C-frame 32 by the application of a downward contact force, the compression spring 60 produces an upward spring force that opposes the contact force and that will urge the clamp body back toward the flanged button head 52a when the downward contact force is removed.

Figure 15:
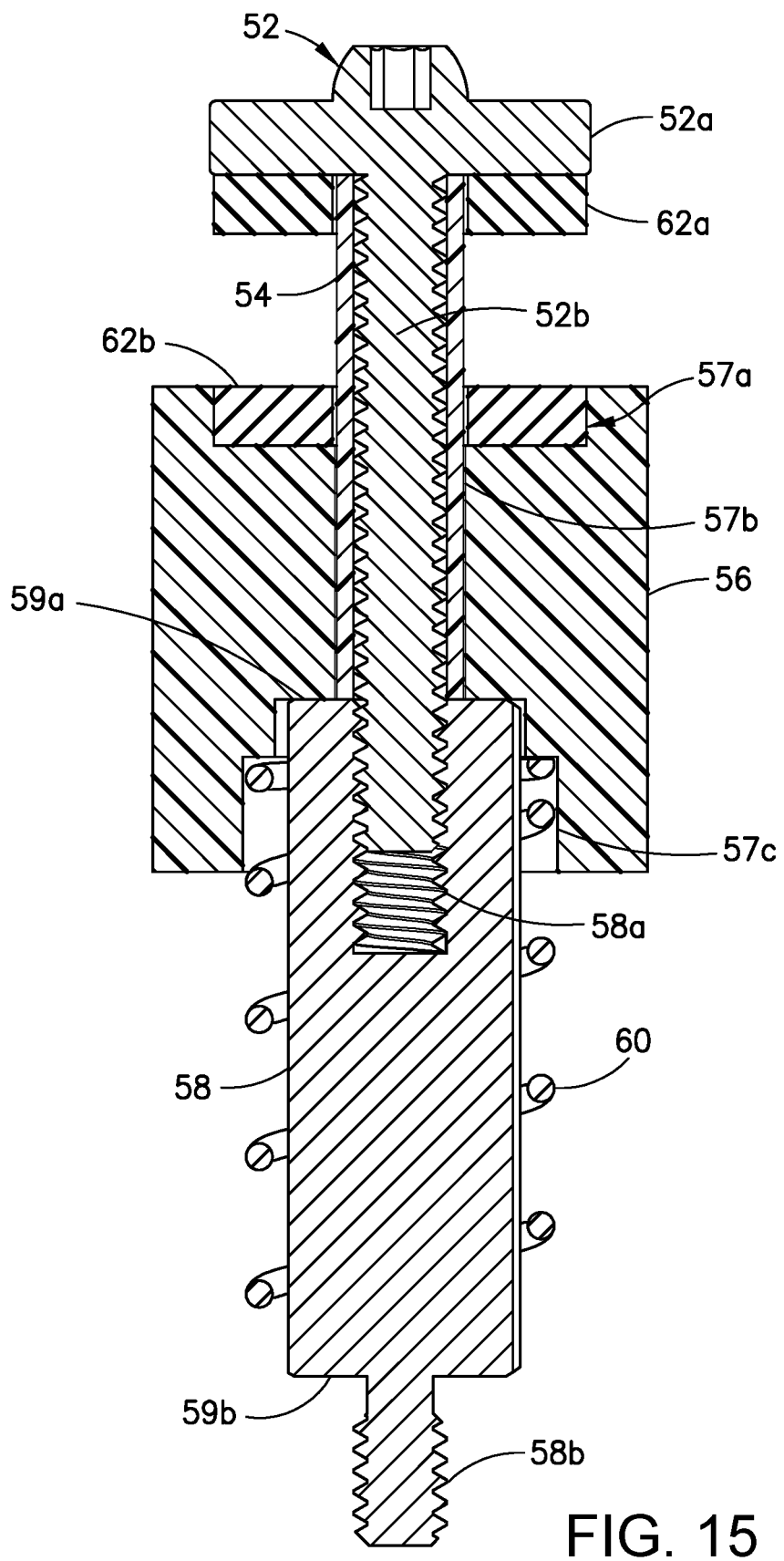
FIG. 15 is a diagram representing a sectional view of the wire holder incorporated in the wire holding device depicted in FIG. 12. The wire holder is shown in a maximally open state.

The wire holder 12 further includes a first rubber pad 62a which is adhered to an undersurface of the flanged button head 52a and a second rubber pad 62b which is seated in a cavity 57a formed in the uppermost portion of the clamp body 56, as seen in the sectional view of FIG. 15. The rubber pad 62b is positioned directly under and covered by the first rubber pad 62a when the wire holder 12 is in the closed state depicted in FIG. 12. As seen in the exploded view of FIG. 13, the first and second rubber pads 62a and 62b are in the form of annular disks having respective circular holes 63a and 63b. Each of the circular holes 63a and 63b of the first and second rubber pads 62a and 62b has an inner diameter slightly greater than the outer diameter of the sleeve 54. The first and second rubber pads 62a and 62b may be made of silicone rubber. In alternative embodiments, the pads may be made of a different sufficiently resilient material. In one proposed implementation, a second rubber pad 62b made of silicone rubber is co-molded into a clamp body 56 made of ABS via injection molding.

Figure 14:
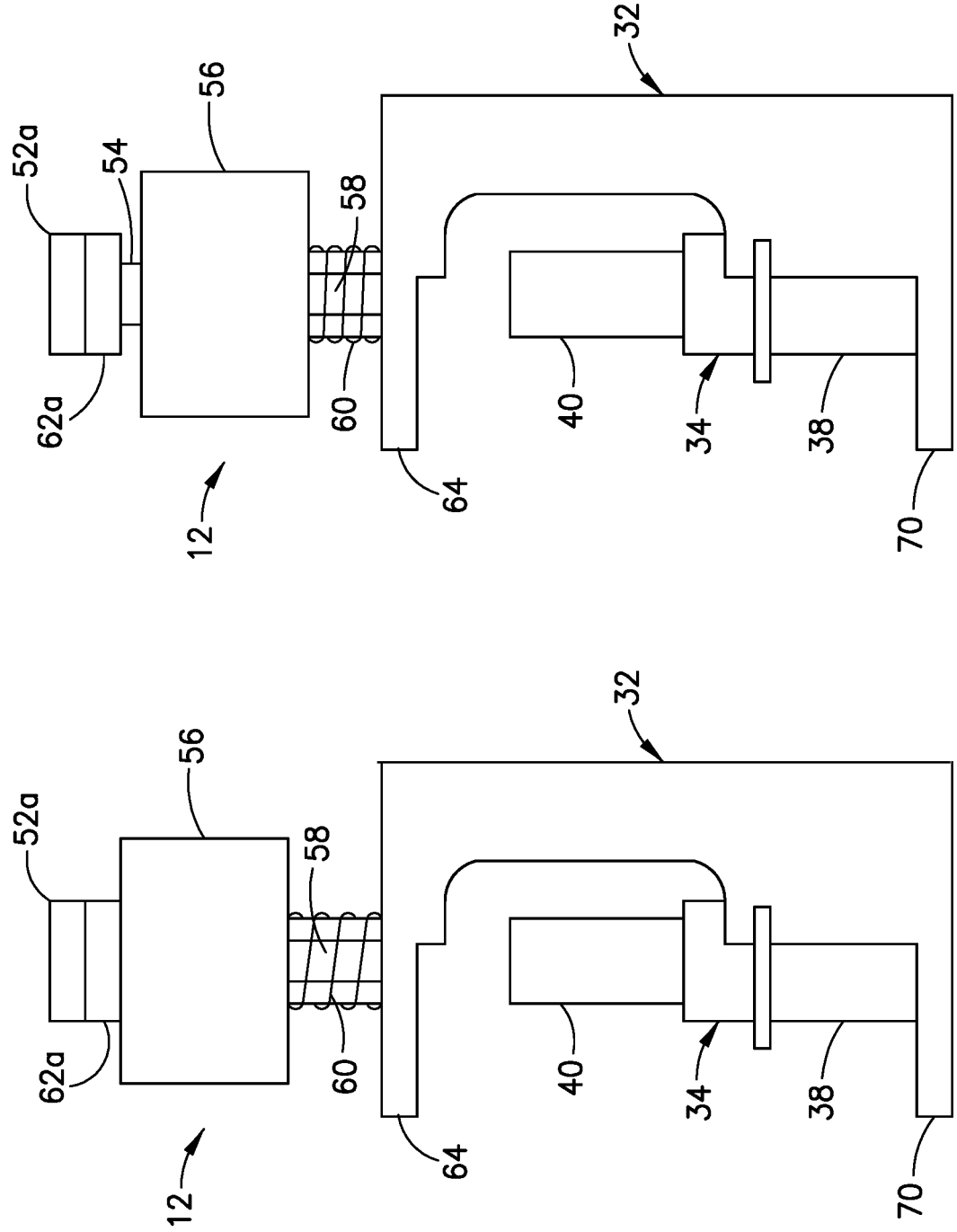
FIGS. 14A and 14B are diagrams representing side views of the wire holding device depicted in FIG. 12 in closed and open states respectively.

FIGS. 14A and 14B are diagrams representing side views of the wire holding device 8b depicted in FIG. 12 in the closed and open states respectively. The clamp body 56 is displaceable between a first axial position in which the first and second rubber pads 62a and 62b are in mutual contact (in which state the wire holder 12 is closed) and a second axial position in which the first and second rubber pads 62a and 62b are separated by a gap having a height greater than the diameter of a wire (in which state the wire holder 12 is open).

FIG. 15 is a diagram representing a sectional view of the wire holder 12 incorporated in the wire holding device 8c depicted in FIG. 12. The wire holder 12 is shown in a maximally open state. When the components depicted in FIG. 13 are assembled (as shown in FIG. 15): the sleeve 54 is disposed between end face 59a of standoff 58 and the undersurface of the flanged button head 52a; the sleeve 54 circumscribes (surrounds) a portion of the threaded shaft 52b; and one end of sleeve 54 is in contact with the one end face of the standoff 58.

Figure 13:
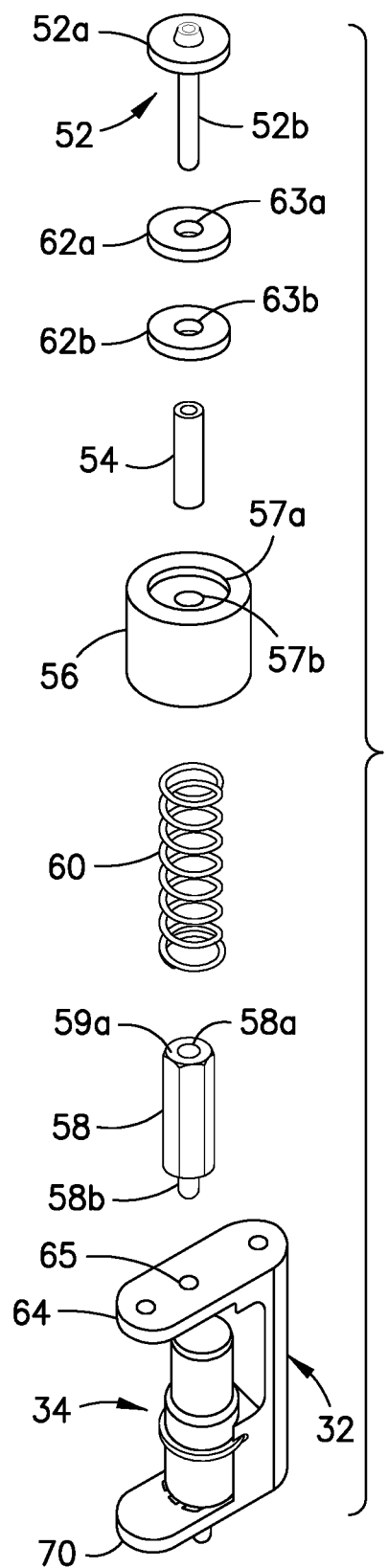
FIG. 13 is a diagram representing an exploded view showing separate components of the wire holding device depicted in FIG. 12.

As seen in FIGS. 13 and 15, the cavity 57a of the clamp body 56 is configured to receive the second rubber pad 62b. The clamp body 56 also has a circular cylindrical bore 57b that is configured to receive both the threaded shaft 52b and the surrounding sleeve 54. The diameter of the circular cylindrical bore 57b is also slightly greater than the outer diameter of sleeve 54. The sleeve 54 passes through the clamp body 56 (see in FIG. 15) and abuts end face 59a of standoff 58.

As best seen in FIG. 15, the standoff 58 has a threaded hole 58a extending axially from end face 59a of standoff 58. The end of the threaded shaft 52b of the flanged button head screw 52 is threadably coupled to the threaded hole 58a of the standoff 58. The standoff 58 includes a threaded shaft 58b extending axially from the other end face 59b. The threaded shaft 58b of standoff 58 is threadably coupled to a threaded hole 65 (see FIG. 13) formed in the upper arm 64 of the C-frame 32. As seen in the example implementation depicted in FIG. 13, the body of the standoff 58 has a hexagonal cross section. However, the body of the standoff may be in the form of a cylinder having a cross-sectional geometry different than a hexagon provided that the outer circumferential surface of the standoff body prevents excessive lateral movement of the compression spring 60.

Figure 15A:
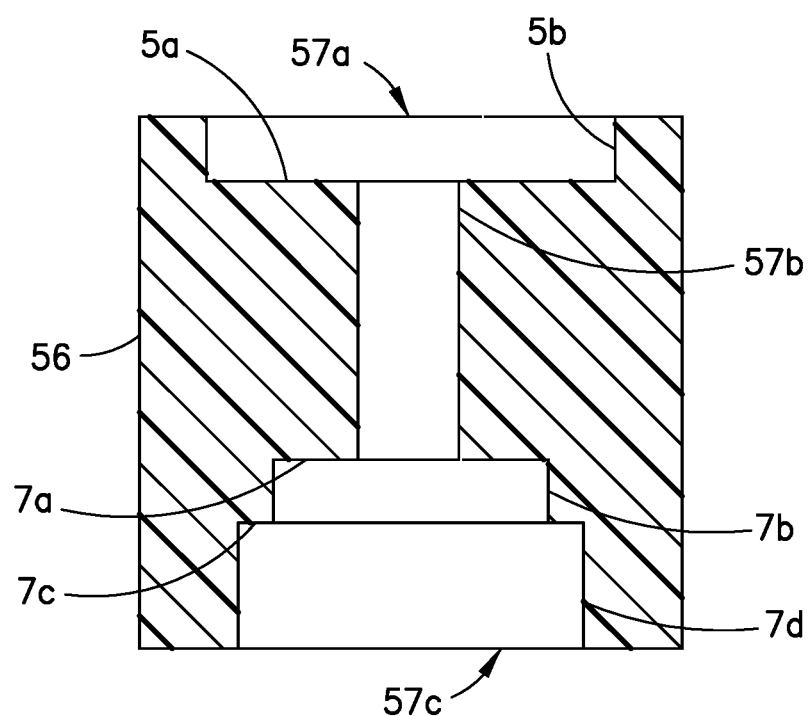
FIG. 15A is a diagram representing a sectional view of the clamp body in isolation.

FIG. 15A is a diagram representing a sectional view of the clamp body 56 in isolation. The cavity 57a is formed by a first annular surface 5a and a first circular cylindrical surface 5b of the clamp body 56. The first annular surface 5a surrounds a first opening formed by the bore 57b, intersecting the first opening at an inner circumference of the first annular surface 5a. The first circular cylindrical surface 5b connects the outer circumference of the first annular surface 5a to the upper end face of the clamp body 56. The height of the first circular cylindrical surface 5b may be approximately equal to or slightly less than the height of the second rubber pad 62b. The diameter of the first circular cylindrical surface 5b is slightly greater than the outer diameter of the second rubber pad 62b. When the wire holding device 8b is fully assembled, the first annular surface 5a of the first cavity 57a is in contact with the second rubber pad 62b.

Still referring to FIG. 15A, the cavity 57c is formed by a second annular surface 7a, a second circular cylindrical surface 7b, a third annular surface 7c, and a third circular cylindrical surface 7d of the clamp body 56. The inner diameter of the third annular surface 7c is equal to the outer diameter of the second annular surface 7a. The second annular surface 7a surrounds a second opening formed by the bore 57b, intersecting the second opening at an inner circumference of the second annular surface 7a. The second circular cylindrical surface 7b connects the outer circumference of the second annular surface 7a to the inner circumference of the third annular surface 7c. The second and third annular surfaces 7a and 7c are mutually parallel and separated by a distance equal to the height of the second circular cylindrical surface 7b. The inner diameter of the inner circumference of the third annular surface 7c is equal to the outer diameter of the outer circumference of the second annular surface 7a. The third circular cylindrical surface 7d connects the outer circumference of the third annular surface 7c to the lower end face of the clamp body 56. When the wire holding device 8b is fully assembled, the second annular surface 7a of the second cavity 57c is in contact with end face 59a of standoff 58 and the third annular surface 7c of the second cavity 57c is in contact with the compression spring 60.

During assembly of the components of the wire holding device 8b depicted in FIG. 13, the following steps are performed. (a) The C-frame 32 is fastened to a form board 2 using the temporary fastener 34. (b) The standoff 58 is threadably coupled to the C-frame 32. (c) The compression spring 60 is placed around the body of the standoff 58. (d) The threaded shaft 52b of the flanged button head screw 52 is passed through the sleeve 54. (e) The threaded shaft 52b and surrounding sleeve 54 are passed through hole 63a in rubber pad 62a. (f) The second rubber pad 62b is seated in the first cavity 57a of the clamp body 56. (g) The clamp body 56 is placed on the compression spring/standoff sub-assembly such that respective upper portions of the standoff 58 and compression spring 60 are disposed in a second cavity 57c (seen in FIG. 14) formed in the clamp body 56. (h) The threaded shaft 52b and surrounding sleeve 54 are passed through hole 63b in rubber pad 62b and inserted in bore 57b in clamp body 56. (i) The end of the threaded shaft 52b of flanged button head screw 52 is threadably coupled to the threaded hole 58a of standoff 58 until the sleeve 54 is tightly disposed between the flanged button head 52a and the end face 59a of standoff 58.

The result of the above-described assembly process is a stationary and substantially rigid assembly formed by the C-frame 32, standoff 58, flanged button head screw 52, and sleeve 54. The spring-loaded clamp body 56 is axially translatable up or down, relative to that rigid assembly, between a wire holder closed position and a wire holder open position.

The transfer of a wire from a wire-routing end effector 14 to a contact-insertion end effector 18 (see FIG. 1) may be initiated by first controlling the wire-routing end effector 14 to place the tip of the routing beak 16 in contact with the upper surface of the clamp body 56 and then move the routing beak 16 downward to displace the clamp body 56 downward, thereby opening the wire holder 12. Then the wire-routing end effector 14 is controlled to move the routing beak 16 laterally (sideways) such that the portion of the wire 1 extending forward of the tip of the routing beak 16 is placed in the gap between the first and second rubber pads 62a and 62b. Then the wire-routing end effector 14 is controlled to move the routing beak 16 upward, which enables the compression spring 60 to displace the clamp body 56 upward into the wire holder closed position. In the wire holder closed position, the first and second rubber pads 62a and 62b hold the wire 1 in place. More specifically, the spring force exerted by the compression spring 60 presses the second rubber pad 62b against the first rubber pad 62a with the wire 1 trapped therebetween.

While the wire 1 is being held by the wire holder 12, the wire-routing end effector 14 (with attached reelette storing wire) is moved away from the wire holding device 8b to provide clearance for the contact-insertion end effector 18 to approach the wire holding device 8b for the purpose of picking up the wire 1. Because the wire-routing end effector 14 is moving relative to the clamped (stationary) portion of the wire 1, an additional length of wire 1 is pulled out of the routing beak 16. Later the remainder of the wire 1 is routed through a multiplicity of form board devices (not shown in FIG. 1) attached to the form board 2 using the wire-routing end effector 14. Execution of the wire routing plan depends on controlling the position of the TCP of the wire-routing end effector 14.

The clamped portion of the wire 1 may be subsequently gripped by a gripper 82 of a contact-insertion end effector 18 and released by the wire holding device 8b (seen in FIG. 12). The gripper 82 may be of the type comprising a pair of gripper jaws 128a and 128b as depicted in FIG. 8A. The gripping action may occur either immediately before or immediately after the release of the wire. The release of the wire 1 may be initiated by first controlling the contact-insertion end effector 18 to place the gripper 82 in contact with the upper surface of the clamp body 56 and then move the gripper 82 downward to displace the clamp body 56 downward, thereby opening the wire holder 12. Then the contact-insertion end effector 18 is controlled to move the gripper 82 laterally such that the portion of the wire 1 is moved out of the gap between the first and second rubber pads 62a and 62b. Then the contact-insertion end effector 18 is controlled to move the gripper 82 upward, which enables the compression spring 60 to displace the clamp body 56 upward into the wire holder closed position, thereby closing the wire holder 12 which no longer holds the wire 1.

FIG. 16A is a diagram representing a side view of a downwardly moving wire gripper 82 (e.g., comprising a pair of gripper jaws) at a first instant in time prior to contacting a clamp body 56 of a wire holder 12 of the type depicted in FIG. 12. During the downward movement, the gripper 82 is in an open state (e.g., the gripper jaws are separated by a gap greater than the diameter of the wire 1). At the same time, the wire holder 12 is in a closed state such that a portion of the wire 1 is being held by the first and second rubber pads 62a and 62b. In this example, the wire 1 is terminated by an electrically conductive contact 3.

The arrow in FIG. 16A indicates that the gripper 82 is moving downward. During this downward movement, an end portion of the gripper 82 (e.g., respective end portions of a pair of gripper jaws) overlies and eventually contacts a portion of the clamp body 56 on which the wire 1 is lying. More specifically, the open gripper 82 is centered over the underlying portion of wire 1, so that when the gripper is lowered further, the respective gripper jaws will be positioned on opposite sides of the wire 1.

As previously disclosed, the clamp body 56 is vertically displaceable relative to the rigid assembly 61 (which in accordance with one embodiment, includes C-frame 32, standoff 58, sleeve 54, and flanged button head screw 52). Following the initial contact, the gripper 82 continues to move downward, which additional downward movement causes the clamp body 56 to displace downward to the vertical position seen in FIG. 16B, with the gripper jaws disposed on opposite sides of the wire 1. The magnitude of the additional downward displacement during gripper/clamp body contact is sufficient to release the wire 1. Then the gripper 82 is closed, meaning that the gripper jaws (only one gripper jaw is visible in FIGS. 16A and 16B) are moved toward each other until a portion of the wire 1 is captured between the respective mutually opposing grooves 83 of the gripper jaws (one groove 83 is indicated by a pair of dashed lines in FIGS. 16A and 16B).

Following closure, gripper 82 is moved laterally (sideways) to displace the wire 1 out of the gap between the first and second rubber pads 62a and 62b. Thereafter, the contact-insertion end effector 18 is controlled such that the gripper 82 is moved upward from the position seen in FIG. 16B, thereby closing the wire holder 12. The contact-insertion end effector 18 may then be further controlled to carry the end of the wire 1 to a position in proximity to another form board device. For example, the contact-insertion end effector 18 may be controlled to carry the end of the wire 1 to a position in proximity to a wire connector and then insert the contact 3 into a hole in a grommet of the wire connector. Or the contact-insertion end effector 18 may be controlled to carry the end of the wire 1 to a position overlying a multi-wire end holder (such as an elastic retainer) and then lower the end of the wire into the multi-wire end holder.

In accordance with an alternative embodiment of the wire holder 12, the clamp body 56 is formed with a recessed landing area 55, as seen in FIG. 17A. This improvement allows the gripper 82 of the contact-insertion end effector 18 to grip onto the wire 1 before pressing the wire holder 12 open. Thus, the wire 1 does not have an opportunity to move during the interval between the instant in time when the wire holder 12 loosens its grip of the wire 1 and the instant in time when the gripper 82 grips the wire 1.

FIG. 17A is a diagram representing a side view of a downwardly moving wire gripper 82 at a first instant in time prior to contacting clamp body 56 of the wire holder 12. During the downward movement, gripper 82 is open and the wire holder 12 is closed. The arrow in FIG. 17A indicates that the gripper 82 is moving downward. During the downward movement, an end portion of the gripper 82 is centered over a portion of wire 1 overlying recessed landing area 55. When the gripper 82 is lowered further, the respective gripper jaws contact the recessed landing area 55 as seen in FIG. 17B. In this vertical position, the gripper jaws of gripper 82 are disposed on opposite sides of the wire 1 with the respective grooves 83 being aligned with the wire 1.

Following the initial contact, the gripper 82 continues to move downward, which additional downward movement causes the clamp body 56 to displace downward to the vertical position seen in FIG. 17C. The magnitude of the additional downward displacement during gripper/clamp body contact is sufficient to release the wire 1. Then the gripper 82 is closed so that the portion of wire 1 between the gripper jaws is held securely.

Following closure, the gripper 82 is moved laterally (sideways) to displace the wire 1 out of the gap between the first and second rubber pads 62a and 62b. Thereafter, the contact-insertion end effector 18 is controlled such that the gripper 82 is moved upward from the position seen in FIG. 17C, thereby closing the wire holder 12. The contact-insertion end effector 18 may then be further controlled to place the end of the wire 1 in some other form board device which is fastened to the same form board to which wire holding device 8b is fastened.

Figure 18B:
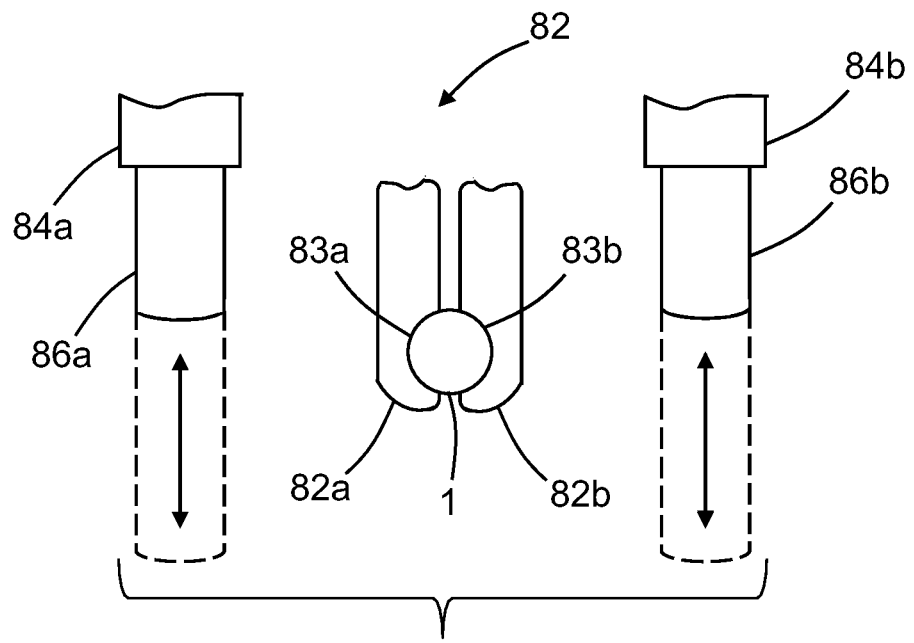
FIG. 18B is a diagram representing an end view of a gripper and a pair of linear actuators incorporated in an end effector configured to either insert a wire in or remove a wire from the wire holding device depicted in FIG. 18A.
Figure 18A:
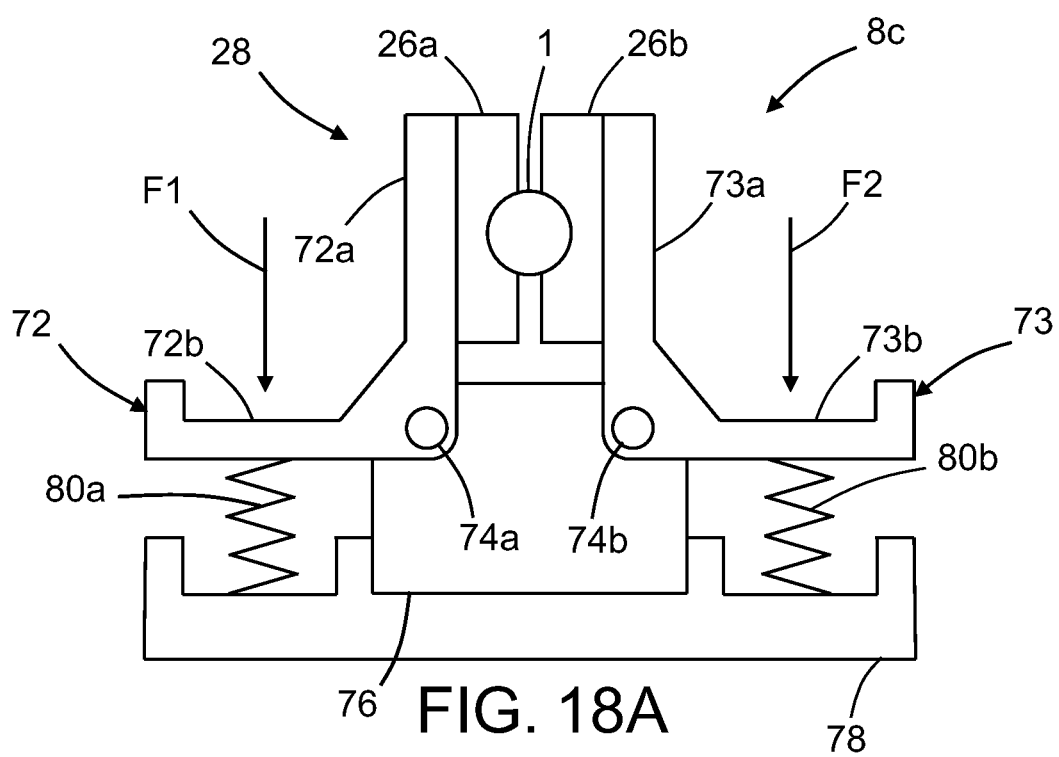
FIG. 18A is a diagram representing an end view of portions of a wire holding device comprising a pair of pivotable arms with gripping pads in accordance with a third embodiment.

FIG. 18A is a diagram representing an end view of portions of a wire holding device 8c in accordance with a third embodiment that includes a C-frame and a temporary fastener (not shown in FIG. 18A) as previously described as well as a wire holder 28 which is supported by the C-frame. The wire holder 28 includes a mounting plate 78, which is fastened to the upper arm of the C-frame in a manner previously described, and a pivot support block 76, which may be attached to or integrally formed with the mounting plate 78. In FIG. 18A the wire holder 28 is shown in a closed state with a wire 1 being held by a pair of mutually opposed gripping pads 26a and 26b. The gripping pads 26a and 26b may be identical or similar to the gripping pads previously described with reference to FIG. 2.

The wire holder 28 further includes a pair of pivotable arms 72 and 73. The gripping pads 26a and 26b are respectively attached to the pivotable arms 72 and 73. The pivotable arm 72 is pivotably coupled to the pivot support block 76 by means of a pivot pin 74a; the pivotable arm 73 is pivotably coupled to the pivot support block 76 by means of a pivot pin 74b.

In accordance with the embodiment depicted in FIG. 18A, pivotable arm 72 comprises a straight member (hereinafter "first gripping pad support member 72a") to which the first gripping pad 26a is attached and a straight member (hereinafter "first wing 72b") which extends generally perpendicular to the first gripping pad support member 72a. Similarly, pivotable arm 73 comprises a straight member (hereinafter "second gripping pad support member 73a") to which the second gripping pad 26b is attached and a straight member (hereinafter "second wing 73b") which extends generally perpendicular to the second gripping pad support member 73a.

When the wire holder 28 is in the closed state depicted in FIG. 18A, the first and second gripping pad support members 72a and 73a are oriented generally vertically, while the first and second wings 72b and 73b are oriented generally horizontally. The pivotable arms 72, 73 and gripping pads 26a, 26b are designed such that the wire 1 is held securely by the wire holder 28 when the pivotable arms 72 and 73 are urged toward their respective wire holder closed positions (e.g., when the first and second gripping pad support members 72a and 73a are vertical). The pivotable arms 72 and 73 are urged toward their respective wire holder closed positions by respective compression springs 80a and 80b. The compression spring 80a is disposed between the mounting plate 78 and the first wing 72b, whereas the compression spring 80b is disposed between the mounting plate 78 and the second wing 73b. The compression springs 80a and 80b produce spring forces which urge the gripping pads 26a and 26b toward each other.

To open the wire holder 28, respective downwardly directed contact forces F1 and F2 may be respectively applied to the first and second wings 72b and 73b which overcome the respective upwardly directed spring forces exerted by the compression springs 80a and 80b, thereby causing pivotable arm 72 to rotate in a counterclockwise direction and pivotable arm 73 to rotate in a clockwise direction (as viewed in FIG. 18A). These rotations in opposite directions cause the gripping pads to separate or separate further (depending on whether the gripping pads are in contact or separated by a gap in the closed state), thereby opening the wire holder 28 to a degree sufficient to receive a portion of the wire 1.

FIG. 18B is a diagram representing an end view of a gripper 82 and a pair of linear actuators 84a and 84b incorporated in an end effector which is configured to either insert wire 1 in or remove wire 1 from the wire holder 28 depicted in FIG. 18A. Although the frame of the end effector is not shown in FIG. 18B, in accordance with the embodiment depicted, the gripper 82 includes a pair of gripper arms (also not shown in FIG. 18B) which are pivotably coupled to the end effector frame. The gripper arms terminate at gripper jaws 82a and 82b. In addition, the linear actuators 84a and 84b have proximal ends which are fixedly coupled to the end effector frame. Thus, the distal ends of the linear actuators 84a and 84b are translatable and not pivotable relative to the end effector frame, whereas the gripper jaws 82a and 82b are pivotable and not translatable relative to the end effector frame.

More specifically, the gripper jaws 82a and 82b are movable toward each other when gripping a wire 1 or away from each other when releasing a wire 1. The gripper jaws 82a and 82b are configured for gripping a wire 1 when the gripper jaws are moved to respective gripper closed positions. In the implementation depicted in FIG. 18B, the gripper jaws 82a and 82b have respective grooves 83 which bear against opposing areas on the surface of wire 1, thereby gripping the wire 1 and holding it securely during movements of the end effector.

The aforementioned contact forces F1 and F2 (see FIG. 18A) are applied by contact pins 86a and 86b (see FIG. 18B) attached to the distal ends of the extendible elements of the linear actuators 84a and 84b respectively. The linear actuators 84a and 84b may be pneumatic cylinders of the type previously described herein, in which case the contact pins 86a and 86b are respectively mounted to the distal ends of respective piston rods. The double-headed arrows in FIG. 18B represent the movements of the contact pins 86a and 86b as the linear actuators 84a and 84b are respectively extended or retracted. The respective positions of the contact pins 86a and 86b when the linear actuators 84a and 84b are retracted are indicated by solid lines in FIG. 18B; the respective positions of the contact pins 86a and 86b when the linear actuators 84a and 84b are extended are indicated by dashed lines in FIG. 18B. The aforementioned spring forces (for closing the wire holder 28) are applied by the compression springs 80a and 80b.

During an automated operation for inserting a wire 1 in the wire holder 28 depicted in FIG. 18A using the apparatus partly depicted in FIG. 18B, the following steps are performed in sequence. First, a wire 1 is placed between the gripper jaws 82a and 82b and then the gripper 82 is closed. Then the linear actuators 84a and 84b are fully extended. Then the end effector is positioned so that the contact pins 86a and 86b are vertically aligned with the first and second wings 72b and 73b respectively. While the contact pins 86a and 86b are vertically aligned with the first and second wings 72b and 73b, the end effector is continuously lowered to a height where the wire 1 is disposed between the gripping pads 26a and 26b. During this downward movement, the contact pins 86a and 86b respectively first contact the first and second wings 72b and 73b and then push the first and second wings 72b and 73b to their respective limit angular positions (corresponding to the respective wire holder open positions of the pivotable arms 72 and 73). As the end effector continues to move lower, the contact pins stay in contact with the first and second wings (maintaining the wire holder 28 open), but retract against the pneumatic air supply pressure. As the end effector continues to move downward, a portion of the wire 1 not gripped by the gripper 82 enters the gap between the gripping pads 26a and 26b. The contact pins 86a and 86b are then retracted, thereby allowing the compression springs 80a and 80b to urge the pivotable arms 72 and 73 to their respective wire holder closed positions, where the gripping pads 26a and 26b grip the wire 1. Then the gripper 82 is opened to release the wire 1 and the end effector is raised while the wire holder 28 continues to hold the wire 1.

During an automated operation for retrieving (removing) a wire 1 from the wire holder 28 depicted in FIG. 18A using the apparatus partly depicted in FIG. 18B, the following steps are performed in sequence. First, the end effector is configured so that the gripper 82 is open and the contact pins 86a and 86b are in their respective retracted positions. The contact pins 86a and 86b could be retracted by pneumatic pressure, or may be naturally spring loaded in the retracted position when pneumatic air pressure is absent. Then the end effector is positioned so that the open gripper 82 is vertically aligned with a portion of the wire 1 that is adjacent to and not gripped by the wire holder 28. When the open gripper 82 is aligned with the wire 1, the end effector is moved downward to a position where the gripper jaws 82a and 82b are on opposite sides of the wire 1. The retracted contact pins 86a and 86b have not yet made contact with the first and second wings 72b and 73b of the wire holder 28. In this position, the gripper 82 is closed and the gripper jaws 82a and 82b grip the wire 1. Then the contact pins 86a and 86b are extended to press down onto the first and second wings 72b and 73b with contact forces sufficient to overcome the spring forces and then push the first and second wings 72b and 73b to their respective limit angular positions, thereby causing the pivotable arms 72 and 73 to rotate in opposite directions, which in turn results in the release of the wire 1 by the separated gripping pads 26a and 26b. At this juncture, the contact pins 86a and 86b are not yet fully extended because the first and second wings 72b and 73b have bottomed out on the mounting plate 78. Then the end effector is moved vertically upward so that the closed gripper 82 raises the wire 1 out of the wire holder 28, which upward movement allows the contact pins 86a and 86b to continue extending and maintaining the wire holder 28 in an open state. Finally, when the end effector rises to a sufficient elevation (i.e., the wire 1 has been completely cleared out of the wire holder 28), the contact pins 86a and 86b move away from the wire holder 28, thus letting the compression springs 80a and 80b urge the pivotable arms 72 and 73 to their respective wire holder closed positions.

Figure 19A:
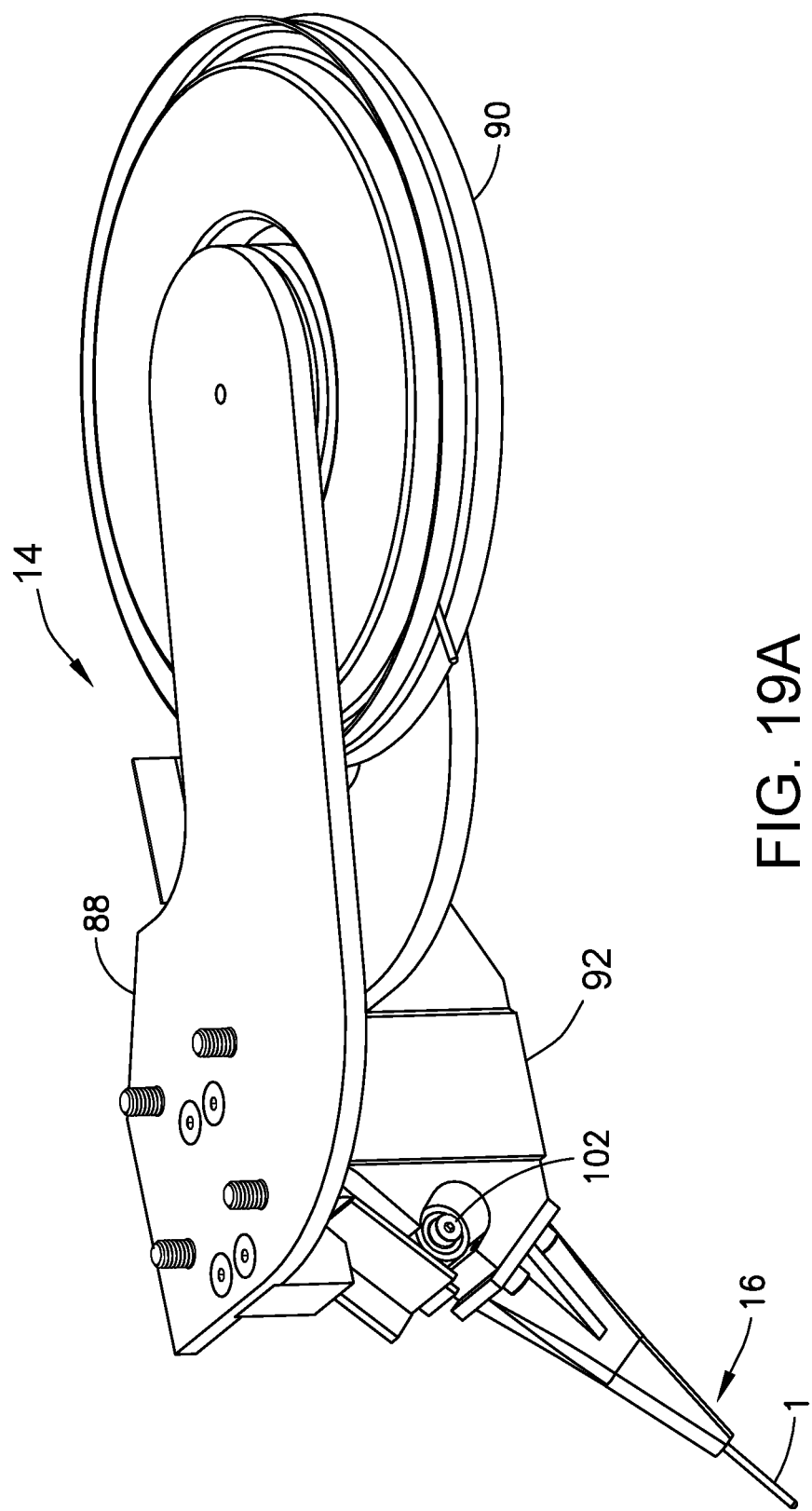
FIGS. 19A and 19B are diagrams representing respective three-dimensional views of a passive (unpowered) wire-routing end effector in accordance with one embodiment.
Figure 19B:
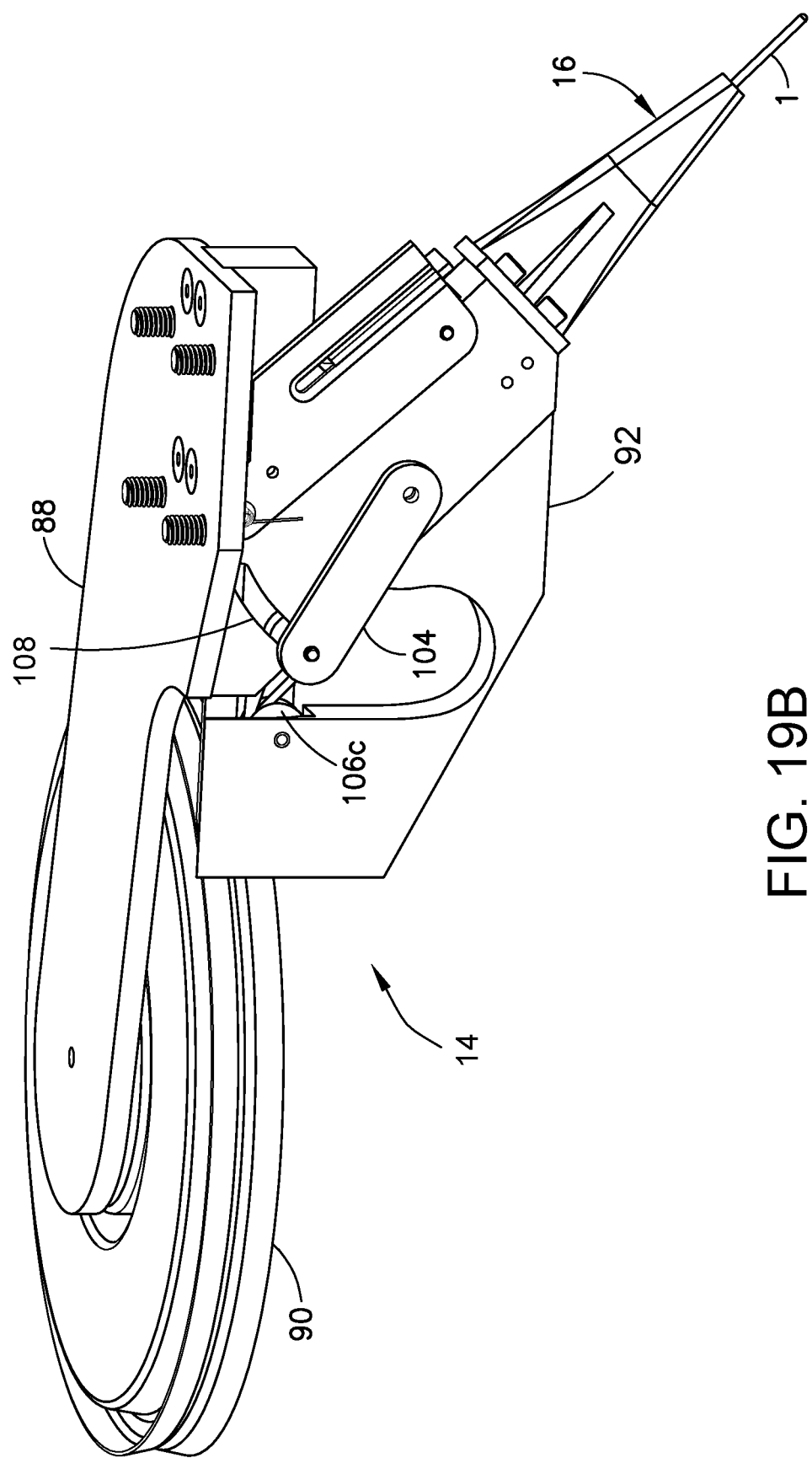
Figure 20:
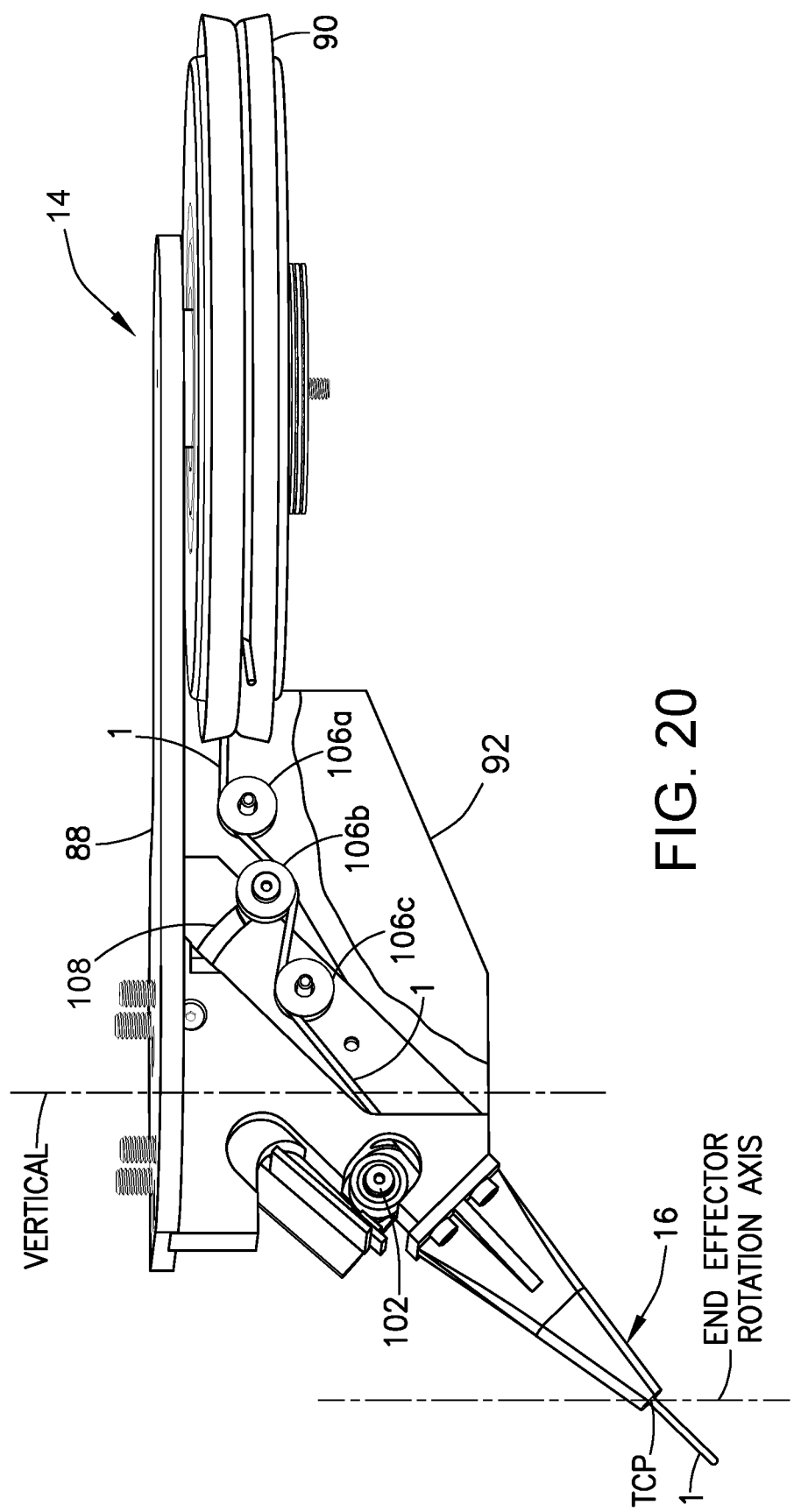
FIG. 20 is a diagram representing a side view of the passive wire-routing end effector depicted in FIGS. 19A and 19B.

For the sake of completeness, one embodiment of a wire-routing end effector 14 capable of automatically opening a wire holder of the types depicted in FIGS. 2 and 12 and placing a wire end inside the wire holder will now be described with reference to FIGS. 19A, 19B, and 20. FIGS. 19A and 19B are diagrams representing respective three-dimensional views of a passive (unpowered) wire-routing end effector 14 in accordance with one embodiment. FIG. 20 is a diagram representing a side view of the wire-routing end effector 14 depicted in FIGS. 19A and 19B.

The wire-routing end effector 14 depicted in FIG. 19A includes a mounting plate 88, a lower frame 92 affixed (fixedly coupled) to the mounting plate 88, and a reelette 90 rotatably coupled to the mounting plate 88. In an alternative embodiment, the frame 92 may be mounted to the bottom of a force/torque sensor (not shown in FIG. 19A). Prior to the start of a wire routing operation, the majority of the wire 1 is contained within the reelette 90. The wire-routing end effector 14 further includes a routing beak 16 (previously described with reference to FIG. 7) having a channel through which a wire 1 is dispensed. A wire holder of the types depicted in FIGS. 2 and 12 may be opened by executing prescribed movements of the wire-routing end effector 14 after the routing beak 16 has come into contact with the wire holder. While maintaining that contact, the routing beak 16 is then moved again in a manner to place a portion of the dispensed wire in the open wire holder. Lastly, the routing beak is moved in a manner that allows spring forces to close the wire holder and thus grip the intervening wire portion.

Referring to FIGS. 19A and 20, the wire-routing end effector 14 further includes a wire length measurement encoder roller 102 which is rotatably coupled to the lower frame 92. The wire length measurement encoder roller 102 is operatively coupled to a rotary encoder (not shown). The rotary encoder is configured to convert each incremental rotation of the wire length measurement encoder roller 102 into a signal representing encoder data indicating each incremental rotation of the wire length measurement encoder roller 102. Each incremental rotation of the wire length measurement encoder roller 102 corresponds to an incremental advancement of the wire 1. A computer may be programmed to calculate the wire length based on the stored encoder data. Thus, assuming that there is no slippage between the wire 1 and the wire length measurement encoder roller 102, the length of wire 1 dispensed during a routing operation may be measured.

The wire-routing end effector 14 further includes a passive tensioner arm 104 (shown in FIG. 19B) and three passive tension rollers 106a-c (shown in FIG. 20). One end of passive tensioner arm 104 is rotatably coupled to the lower frame 92. Passive tension rollers 106a and 106c are also rotatably coupled to lower frame 92. Passive tension roller 106b is rotatably coupled to a shaft connected to the other end of the passive tensioner arm 104. That shaft moves in an arcuate slot 108 formed in the lower frame 92 as the passive tensioner arm 104 swings between two limit angular positions dictated by the opposing ends of the arcuate slot 108.

As seen in FIG. 20, the wire 1 is passed over passive tension roller 106a, under passive tension roller 106b and over passive tension roller 106c. The passive tensioner arm 104 is spring-loaded. The spring urges the passive tensioner arm 104 to rotate in a clockwise direction as seen from the vantage point of FIG. 20. The passive tension roller 106b converts the spring force into increased tension in the wire 1.

As the wire-routing end effector 14 moves in the volume of space above the form board 2, the vertical axis indicated in FIG. 20 (which is perpendicular to the horizontal mounting plate 88) is maintained vertical relative to the horizontal plane of the form board 2. In addition, when the TCP of the wire-routing end effector 14 is being moved along an arcuate TCP path, the wire-routing end effector 14 is rotated about an end effector rotation axis which intersects the TCP and is parallel to the vertical axis. In accordance with one proposed implementation, as the wire-routing end effector 14 moves, the mounting plate 88 is maintained perpendicular to the vertical axis at all times.

The wire-routing end effector 14 may be coupled to the distal end of a manipulator arm of a robot. The robot may include either a mobile pedestal or a gantry which carries the manipulator arm. The robot further includes a robot controller configured to control movement of the mobile pedestal or gantry relative to ground, movement of the manipulator arm relative to the mobile pedestal or gantry, and rotation of the wire-routing end effector 14 relative to the manipulator arm. Optionally, the wire-routing end effector 14 is mounted to the manipulator arm by way of a force/torque sensor—in which case the robot controller is communicatively coupled to receive sensor data from the force/torque sensor. The robot controller is further configured to control movement of the manipulator arm taking into account the sensor data received from the force/torque sensor. This enables the robot controller to control tension during routing. The sensor data may also be used to detect wire snags or end effector collisions during routing.

Figure 21:
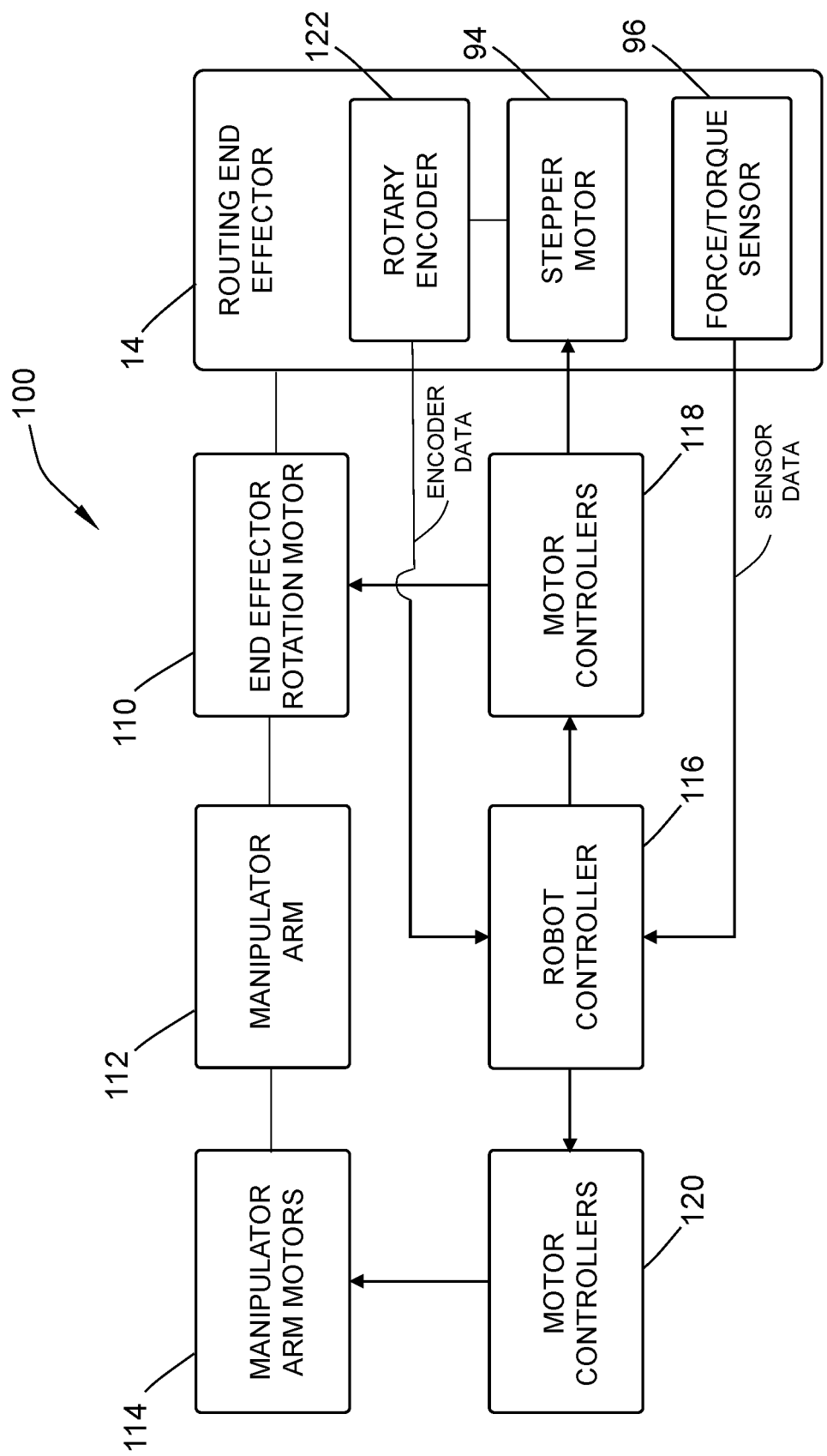
FIG. 21 is a block diagram identifying components of a robotic system for routing a wire through form board devices attached to a form board in accordance with one embodiment.

Although an unpowered (passive) wire-routing end effector 14 has been disclosed in some detail, alternative embodiments may employ a powered wire-routing end effector having a wire-dispensing drive roller mechanically coupled to an output shaft of a motor by way of a gear train. FIG. 21 is a block diagram identifying components of an automated (robotic) system 100 for routing a wire through form board devices attached to a form board in accordance with one embodiment having a powered wire-routing end effector. The robotic system 100 includes a robot controller 116 (e.g., a computer or processor) that is configured (e.g., programmed) to coordinate the operation of all motors. The robotic system 100 further includes a manipulator arm 112 and a wire-routing end effector 14 which is rotatably coupled to a distal end of the manipulator arm 112. The wire-routing end effector 14 is rotated relative to the distal end of the manipulator arm 112 by an end effector rotation motor 110. The manipulator arm 112 further includes a plurality of links coupled by joints. The distal end of the manipulator arm 112 may be moved by activating one or more of a plurality of manipulator arm motors 114. For example, a manipulator arm motor 114 is configured to cause one link to rotate about an axis of the joint that couples the one link to another link. The robot controller 116 sends commands to motor controllers 120 which in turn control operation of the manipulator arm motors 114. Similarly, the robot controller 116 sends commands to motor controllers 118 which in turn control operation of the end effector rotation motor 110 and a stepper motor 94 of the wire-routing end effector 14. In one proposed implementation, the robot controller 116 receives encoder data from a rotary encoder 122 and sensor data from a force/torque sensor 96, both of which are incorporated in the wire-routing end effector 14. The robot controller 116 is capable of controlling the position and orientation of the wire-routing end effector 14 in dependence on the wire tension as measured by the force/torque sensor 96. The robot controller 116 may be configured to store the encoder data in a non-transitory tangible computer-readable storage medium for post-processing by a different computer.

The robotic system may be in the form of a pedestal robot or a gantry robot. A gantry robot consists of a manipulator mounted onto an overhead system that allows movement across a horizontal plane. Gantry robots are also called Cartesian or linear robots. The pedestal robot may have multi-axis movement capabilities. An example of a robot that could be employed with the wire-routing end effector is robot Model KR-150 manufactured by Kuka Roboter GmbH (Augsburg, Germany), although any robot or other manipulator capable of controlling the location of the routing beak 16 in the manner disclosed herein.

Figure 22:
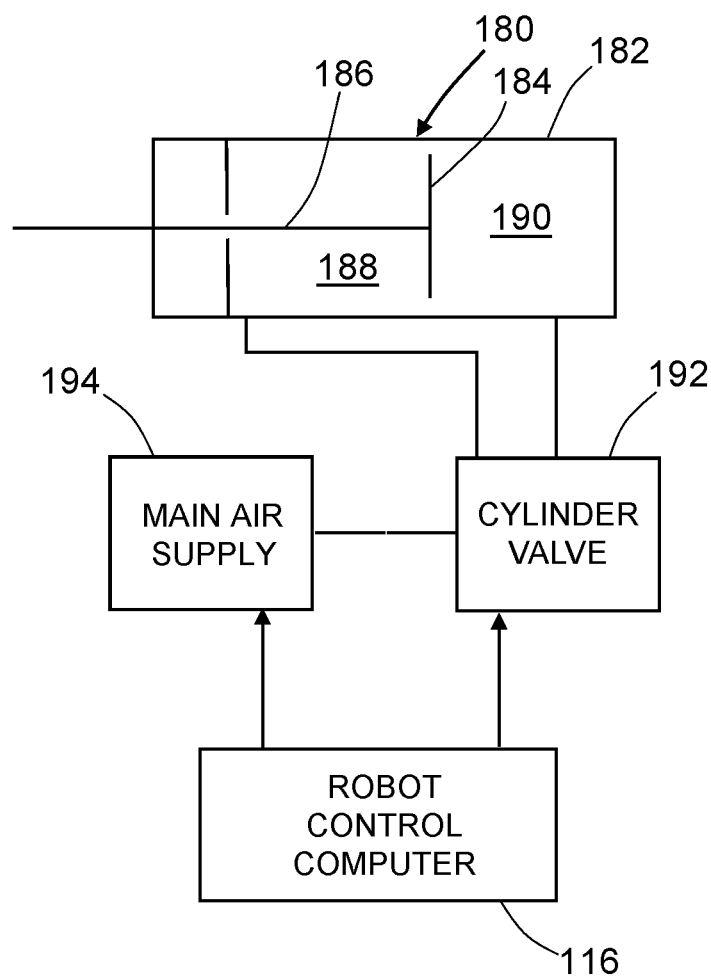
FIG. 22 is a diagram identifying some components of a pneumatic system for extending a wedge of a contact-insertion end effector using pneumatic cylinders.

FIG. 22 is a diagram identifying some components of a pneumatic system for extending a wedge 98 of a contact-insertion end effector 18 using a pair of pneumatic cylinders. The system includes a robot control computer 116 (hereinafter "robot controller 116") that is configured to cause the pneumatic cylinders 180a and 180b (seen in FIG. 8A) to extend in unison in response to a command from the system operator or in response to a self-generated control signal when the desired location has been achieved. Although robot controller 116 controls the states of both cylinders 180a and 180b, FIG. 22 only shows the components of one pneumatic cylinder 180 for the sake of simplicity.

More specifically, each pneumatic cylinder 180 comprises a base cylinder 182, a piston (not visible in FIG. 22) that is slidable inside the base cylinder 182, and a piston rod 186 connected to the piston and extending outside of the base cylinder 182. The wedge 98 (not shown in FIG. 22) is attached to a distal end of the piston rod 186. The piston rod 186 is alternately extended or retracted by operation of a cylinder valve 192 (e.g., a solenoid valve) which controls the supply of compressed air from the main air supply 194 to the internal volumes 188 and 190 of the base cylinder 182. The state of the cylinder valve 192 is controlled by the robot controller 116, which is configured to activate extension of the piston rods 186 by opening the cylinder valve 192, thereby causing the wedge 98 to move from the retracted position depicted in FIG. 8A to the extended position depicted in FIG. 8B.

The double-acting pneumatic cylinder 182 has two ports to allow compressed air into either the internal volume 190 behind the piston 184 (for the extend stroke of the piston rod 186) or the internal volume 188 in front of the piston 184 (for the retract stroke of the piston rod 186). Which internal volume is filled with compressed air from a main air supply 194 is dependent on the state of a cylinder valve 192, which state in turn is controlled by the robot controller 116. The cylinder valve 192 must be energized during extension and retraction of the piston rod 186. It should also be energized at the end of each stroke until a change of direction is required.

While methods and apparatus for holding one end of a wire on a form board during automated transfer between end effectors have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

As used herein, the term "robot controller" means a computer system programmed to control the robotic operations described in detail herein. As used herein, the term "computer system" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit) and some form of memory (i.e., a non-transitory tangible computer-readable storage medium) for storing a program which is readable by the processing unit.

The methods described herein may be encoded as executable instructions embodied in a non-transitory tangible computer-readable storage medium, including, without limitation, a storage device and/or a memory device. Such instructions, when executed by a computer system, cause the tool-equipped unmanned aerial vehicle to perform at least a portion of the methods described herein.

As used in the claims, the term "linear actuator" includes mechanical actuators, pneumatic actuators, hydraulic actuators, electromechanical actuators and structural equivalents thereof. As used in the claims, the term "gripping pad support structures" encompasses the flexible clip arms 25*a* and 25*b* of the wire parking clip 24 of wire holding device 8*a*, the flanged button head 52*a* and clamp body 56 of wire holding device 8*b*, the pivotable arms 72 and 73 of wire holding device 8*c*, and structural equivalents thereof.

The invention claimed is:

1. A wire holding device comprising:
a frame having a hole;
a fastener fastened to the hole in the frame;
a wire parking clip comprising a base portion, left and right clip arms respectively connected to opposite sides of the base portion, and first and second gripping pads respectively attached to the left and right clip arms in a mutually confronting relationship; and
a mounting plate fastened to the frame to form a channel occupied by the base portion of the wire parking clip,
wherein the left clip arm comprises first, second and third left arm portions and the right clip arm comprises first, second and third right arm portions, the third left and right arm portions being connected to the base portion and extending generally parallel to each other when the wire parking clip is in a closed state and being not parallel when the wire parking clip is in an open state, the second left and right arm portions being respectively connected to the third left and right arm portions and respectively disposed such that the second left and right arm portions cross at a first crossing at a first elevation above the base portion when viewed from a position in front of the wire parking clip in the closed state, and the first left and right arm portions being respectively connected to the second left and right arm portions and respectively disposed such that the first left and right arm portions cross at a second crossing at a second elevation above the base portion when viewed from in front of the wire parking clip in the closed state, the second elevation being higher than the first elevation;
wherein the first left and right arm portions form an acute angle above the second crossing when the wire parking clip is in the closed state while being viewed from the front of the wire holding device; and
wherein the first gripping pad is attached to the third left arm portion and the second gripping pad is attached to the third right arm portion.

2. The wire holding device as recited in claim 1, wherein the wire parking clip is formed by bending a planar substrate along first through sixth bend lines, the third left arm portion being connected to the base portion at the first bend line, the second left arm portion being connected to the third left arm portion at the second bend line, the first left arm portion being connected to the second left arm portion at the third bend line, the third right arm portion being connected to the base portion at the fourth bend line, the second right arm portion being connected to the third right arm portion at the fifth bend line, and the first right arm portion being connected to the second right arm portion at the sixth bend line.

3. The wire holding device as recited in claim 1, wherein the wire parking clip is made of spring steel or polycarbonate and the first and second gripping pads are made of elastomeric material or foam.

4. The wire holding device as recited in claim 1, wherein the first and second gripping pads are in contact with each other when the wire parking clip is in the closed state and not in contact with each other when the wire parking clip is in the open state.

5. The wire holding device as recited in claim 1, wherein the fastener comprises a cylindrical housing, a plunger which is slidably coupled to the cylindrical housing, first and second locking pins formed with laterally outward projected latching half-heads, wherein the first and second locking pins having respective proximal ends connected to the plunger and respective distal ends extending through the hole in the frame, and a spacer affixed to the cylindrical housing and disposed between respective portions of the first and second locking pins.

6. The wire holding device as recited in claim 1, wherein the frame comprises upper and lower arms which are mutually parallel, and the lower arm of the frame has the hole.

7. The wire holding device as recited in claim 6, wherein the mounting plate comprises:
first and second mounting flanges having respective through holes; and
a bridge plate which is integrally formed with and connects the first and second mounting flanges; and
wherein the channel is formed by a surface of the bridge plate, a surface of the first mounting flange, a surface of the second mounting flange, and a surface of the upper arm.

8. The wire holding device as recited in claim 7, further comprising first and second screws which fasten the mounting plate to the upper arm.

9. The wire holding device as recited in claim 8, wherein a geometry and dimensions of the channel match with an outer geometry and dimensions of the base portion so that the base portion of the wire parking clip is held securely in place during opening and closing of the wire parking clip.

10. The wire holding device as recited in claim 9, wherein a width of the bridge plate is slightly less than a distance separating the third left and right arm portions at respective bend lines, thereby preventing the wire parking clip from sliding left to right or vice versa during opening and closing.

11. A wire holding device comprising: a frame having a hole;
a fastener which extends through the hole in a lower arm of the frame;
a wire parking clip comprising a base portion, left and right clip arms respectively connected to opposite sides of the base portion, and first and second gripping pads respectively attached to the left and right clip arms in a mutually confronting relationship; and
a mounting plate fastened to the frame to form a channel occupied by the base portion of the wire parking clip,
wherein the left clip arm comprises first, second and third left arm portions and the right clip arm comprises first, second and third right arm portions, the third left and right arm portions being connected to the base portion and extending generally parallel to each other when the wire parking clip is in a closed state and being not parallel when the wire parking clip is in an open state, the second left and right arm portions being respectively connected to the third left and right arm portions and respectively disposed such that the second left and right arm portions cross at a first crossing at a first elevation above the base portion when viewed from a position in front of the wire parking clip in the closed state, and the first left and right arm portions being respectively connected to the second left and right arm portions and respectively disposed such that the first left and right arm portions cross at a second crossing at a second elevation above the base portion when viewed from in front of the wire parking clip in the closed state, the second elevation being higher than the first elevation;
wherein the first left and right arm portions form an acute angle above the second crossing when the wire parking clip is in the closed state while being viewed from the front of the wire holding device; and
wherein the first gripping pad is attached to the third left arm portion and the second gripping pad is attached to the third right arm portion.

12. The wire holding device as recited in claim 11, wherein the wire parking clip is formed by bending a planar substrate along first through sixth bend lines, the third left arm portion being connected to the base portion at the first bend line, the second left arm portion being connected to the third left arm portion at the second bend line, the first left arm portion being connected to the second left arm portion at the third bend line, the third right arm portion being connected to the base portion at the fourth bend line, the second right arm portion being connected to the third right arm portion at the fifth bend line, and the first right arm portion being connected to the second right arm portion at the sixth bend line.

13. The wire holding device as recited in claim 11, wherein the first and second gripping pads are in contact with each other when the wire parking clip is in the closed state and not in contact with each other when the wire parking clip is in the open state.

14. The wire holding device as recited in claim 11, wherein the frame comprises upper and lower arms which are mutually parallel, and the lower arm of the frame has the hole.

15. The wire holding device as recited in claim 14, wherein the mounting plate comprises:
first and second mounting flanges having respective through holes; and
a bridge plate which is integrally formed with and connects the first and second mounting flanges; and
wherein the channel is formed by a surface of the bridge plate, a surface of the first mounting flange, a surface of the second mounting flange, and a surface of the upper arm.

16. The wire holding device as recited in claim 15, wherein a geometry and dimensions of the channel match with an outer geometry and dimensions of the base portion so that the base portion of the wire parking clip is held securely in place during opening and closing of the wire parking clip.

17. The wire holding device as recited in claim 16, wherein a width of the bridge plate is slightly less than a distance separating the third left and right arm portions at respective bend lines, thereby preventing the wire parking clip from sliding left to right or vice versa during opening and closing.

18. A wire holding device comprising:
a frame that comprises upper and lower arms which are mutually parallel;
a wire parking clip comprising a base portion, left and right clip arms respectively connected to opposite sides of the base portion, and first and second gripping pads respectively attached to the left and right clip arms in a mutually confronting relationship; and
a mounting plate fastened to the frame to form a channel occupied by the base portion of the wire parking clip, wherein:
the left clip arm comprises first, second and third left arm portions and the right clip arm comprises first, second and third right arm portions, the third left and right arm portions being connected to the base portion and extending generally parallel to each other when the wire parking clip is in a closed state and being not parallel when the wire parking clip is in an open state, the second left and right arm portions being respectively connected to the third left and right arm portions and respectively disposed such that the second left and right arm portions cross at a first crossing at a first elevation above the base portion when viewed from a position in front of the wire parking clip in the closed state, and the first left and right arm portions being respectively connected to the second left and right arm portions and respectively disposed such that the first left and right arm portions cross at a second crossing that forms an acute angle above the second crossing at a second elevation above the base portion when viewed from in front of the wire parking clip in the closed state, the second elevation being higher than the first elevation;
the first gripping pad is attached to the third left arm portion and the second gripping pad is attached to the third right arm portion; and
the mounting plate comprises first and second mounting flanges having respective through holes, and a bridge plate which is integrally formed with and connects the first and second mounting flanges; and the channel is formed by a surface of the bridge plate, a surface of the first mounting flange, a surface of the second mounting flange, and a surface of the upper arm.

\* \* \* \* \*